(12) United States Patent
Miyachi et al.

(10) Patent No.: US 7,307,685 B2
(45) Date of Patent: Dec. 11, 2007

(54) DISPLAY ELEMENT AND DISPLAY DEVICE

(75) Inventors: Koichi Miyachi, Soraku-gun (JP); Iichiro Inoue, Tenri (JP); Seiji Shibahara, Tenri (JP); Shoichi Ishihara, Katano (JP)

(73) Assignee: Sharp Kabushiki Kaisha, Osaka (JP)

( * ) Notice: Subject to any disclaimer, the term of this patent is extended or adjusted under 35 U.S.C. 154(b) by 458 days.

(21) Appl. No.: 11/035,400

(22) Filed: Jan. 14, 2005

(65) Prior Publication Data

US 2005/0162607 A1 Jul. 28, 2005

(30) Foreign Application Priority Data

| Jan. 15, 2004 | (JP) | ............................. 2004-008471 |
| Aug. 31, 2004 | (JP) | ............................. 2004-253607 |
| Jan. 13, 2005 | (JP) | ............................. 2005-006865 |

(51) Int. Cl.
*C09K 19/02* (2006.01)
*G02F 1/141* (2006.01)

(52) U.S. Cl. ................. 349/170; 349/179; 349/172; 349/133

(58) Field of Classification Search ............... 349/170, 349/172, 179, 133
See application file for complete search history.

(56) References Cited

U.S. PATENT DOCUMENTS 4,009,934 A * 3/1977 Goodwin et al. ............. 349/36
6,266,109 B1 * 7/2001 Yamaguchi et al. .......... 349/86
2002/0196404 A1 * 12/2002 Ueda et al. .................. 349/177

FOREIGN PATENT DOCUMENTS

| JP | 61-256324 A | 11/1986 |
| JP | 2001-249363 A | 9/2001 |
| JP | 2003-098522 A | 4/2003 |
| KR | 0163944 B1 | 1/1999 |

OTHER PUBLICATIONS

Saito et al, "Thermodynamics of a Unique Thermo-Tropic Liquid Crystal Having Optical Isotropy", Ekisho, Vo. 5, No. 1, 2001, pp. 20-27 w/partial English Translation.
Yamamoto, "Liquid Crystal Micro Emulsion", Ekisho, vol. 4, No. 3, 2000, pp. 248-254 (partial English Translation).
Shiraishi et al, "Kobunshi Ronbunshu", vol. 59, No. 12, Dec. 2002, pp. 753-759 (partial English Translation).
Yoneya, "Examining Nano-Structured Liquid Crystal Phase by Molecule Simulator", Ekisho, vol. 7, No. 3, 2003, pp. 238-245 (partial English Translation).

(Continued)

*Primary Examiner*—Mike Qi
(74) *Attorney, Agent, or Firm*—Nixon & Vanderhye, P.C.

(57) ABSTRACT

An electrode is provided on one surface of each of a pair of substrates. On the other surface of each of the substrates, a polarizer is provided. The substrates are assembled together so that their surfaces on which the electrodes are formed face each other. Then, a medium is introduced between the substrates, to form a dielectric material layer. The medium is prepared by mixing a chiral agent in a negative type liquid crystalline compound.

43 Claims, 14 Drawing Sheets

OTHER PUBLICATIONS

Yamamoto, "First Lecture of Liquid Crystal Science Experiment: Identification of Liquid Crystal Phase", Lyotropic Liquid Crystal, Ekisho, vol. 6, No. 1, 2002, pp. 72-83 (partial English Translation).

Chandrasekhal, Liquid Crystals second edition, Chapters 4, 8, Sep. 25, 1995, pp. 330-335 (partial English Translation).

Baifukan, "Dictionary of Physics" edited by the Dictionary of Physics Editors Commission, 1986, pp. 633-635 (partial English Translation).

Yamamoto et al, "Organic Electrooptic Materials", National Technical Report, vol. 22, No. 6, Dec. 1976, pp. 826-834 (partial English Translation).

Demus et al, Handbook of Liquid Crystals, vol. 1: Fundamentals, 1998, pp. 484-485.

Diele et al, "Chapter XIII Thermotropic Cubic Phases", Handbook of Liquid Crystals, Demus et al, WILEY-VCH, vvol. 2B, 1998, pp. 887-900.

Grelet et al, "Structural Investigations on Smectic Blue Phases", Physical Review Letters, vol. 86, No. 17, pp. 3791-3794.

Matsumoto et al, Fine Droplets of Liquid Crystals in a Transparent Polymer and Their Response, Appl. Phys. Lett., 69, 1996, pp. 1044-1046.

Mizoshita et al, "Fast and High-Contrast Electro-Optical Switching of Liquid-Crystalline Physical Gels Formation of Oriented Microphase-Separated Structures", Adv. Funct. Mater., vol. 13, No. 4, Apr. 2003, pp. 313-317.

* cited by examiner

12: CLUSTER

12:CLUSTER

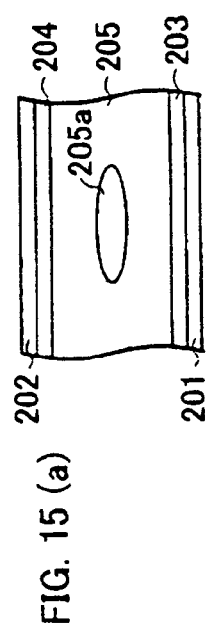
FIG. 15 (a)
FIG. 15 (b)
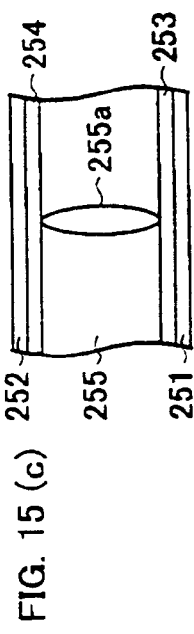
FIG. 15 (c)
FIG. 15 (d)
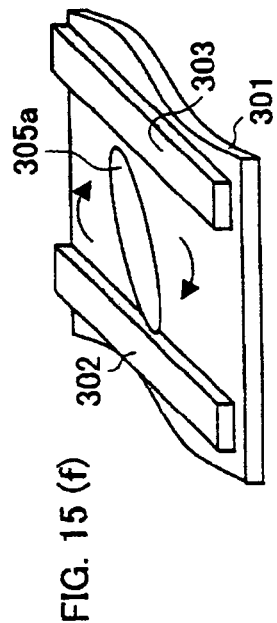
FIG. 15 (e)
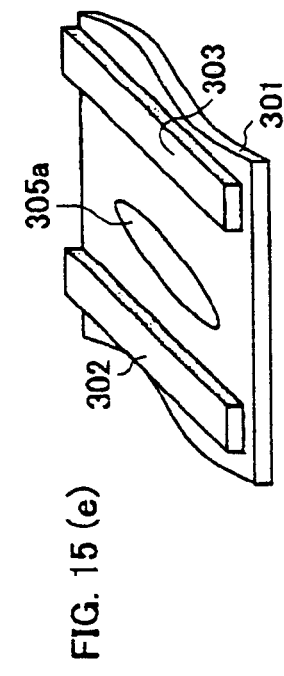
FIG. 15 (f)
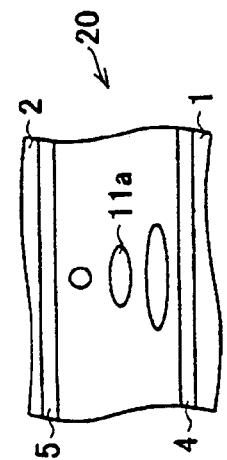
FIG. 15 (g)
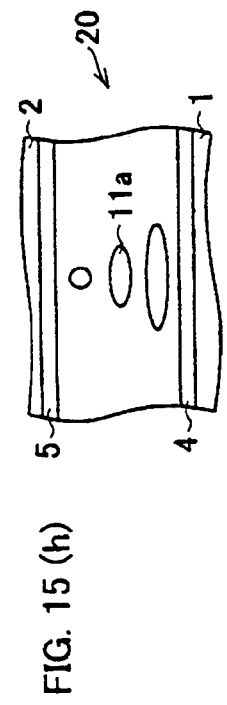
FIG. 15 (h)

DISPLAY ELEMENT AND DISPLAY DEVICE

This Nonprovisional application claims priority under 35 U.S.C. § 119(a) on Patent Applications Nos. 2004/8471, 2004/253607, and 2005/6865 filed in Japan respectively on Jan. 15, 2004, Aug. 31, 2004 and on Jan. 13, 2005, the entire contents of which are hereby incorporated by reference.

FIELD OF THE INVENTION

The present invention relates to a display element and display device having excellent display properties, including, e.g., high-speed response and wide-viewing angle.

BACKGROUND OF THE INVENTION

Liquid crystal display elements are advantaged over other display elements in terms of its thin thickness, light weight, and low power consumption. The liquid crystal display elements are widely used in image display apparatuses such as televisions, video cassette recorders, and the like, and OA (Office Automation) apparatuses such as monitors, word processors, personal computers, and the like.

Conventionally known liquid crystal display methods of the liquid crystal display elements include, for example, a TN (Twisted Nematic) mode in which a nematic liquid crystal is used, display modes in which FLC (Ferroelectric Liquid crystal) or AFLC (Antiferroelectric Liquid crystal) is used, a polymer dispersion type liquid crystal display mode, and other modes.

Among the liquid crystal display methods, for example, the TN (Twisted Nematic) mode in which the nematic liquid crystal is used is conventionally adopted in the liquid crystal display elements in practical use. The liquid crystal display elements using the TN mode have disadvantages of slow response, narrow viewing angle, and the other drawbacks. Those disadvantages are large hindrances for the TN mode to take over CRT (Cathode Ray Tube).

Moreover, the display modes in which the FLC or AFLC is used, are advantageous in their fast response and wide viewing angles, but significantly poor in anti-shock property and temperature characteristics. Therefore, the display modes in which the FLC or AFLC is used have not been widely used.

Further, the polymer dispersion type liquid crystal display mode, which utilizes scattering of light, does not need a polarizer and is capable of providing a very bright display. However, in principle, the polymer dispersion type liquid crystal display mode cannot control the viewing angle by using a phase plate (retardation film). Further, the polymer dispersion type liquid crystal display mode has a problem in terms of its response property. Thus, the polymer dispersion type liquid crystal display mode is generally not as advantageous as the TN mode.

In all the foregoing display methods, liquid crystal molecules are oriented in a certain direction, and thus a displayed image looks differently depending on an angle between a line of vision and the liquid crystal molecules. On this account, all these display methods have viewing angle limits. Moreover, all the display methods utilize rotation of the liquid crystal molecules, the rotation caused by application of an electric field on the liquid crystal molecules. Because the liquid crystal molecules are rotated in alignment all together, responses take time in all the display methods. The display modes in which the FLC and the AFLC are used[ ] are advantageous in terms of response speed and viewing angle, but have a problem in that their alignment can be irreversibly destroyed by an external force.

In contrast to those display methods in which rotation of molecules by the application of the electric field is utilized, there is also a display method in which the secondary electro-optical effect is utilized.

The electro-optical effect is a phenomenon in which a refractive index of a material is changed by an external electric field. There are two types of electro-optical effects: one is an effect proportional to the electric field and the other is an effect proportional to the square of the electric field. The former is called the Pockels effect; the latter is called the Kerr effect. The Kerr effect was adopted early on in high-speed optical shutters, and has been practically used in special measurement instruments. The Kerr effect was discovered by J. Kerr in 1875. So far, organic liquids such as nitrobenzene, carbon disulfide, and the like, are known as materials showing the Kerr effect. These materials are used, for example, in the aforementioned optical shutters, and the similar devices. Further, these materials are used, e.g., for measuring the strength of high electric fields for power cables and the like, and similar uses.

Later on, it was found that liquid crystal materials have a large Kerr constant. Research has been conducted to utilize the large Kerr constant of the liquid crystal materials for use in light modulation devices, light deflection devices, and optical integrated circuits. It has been reported that some liquid crystal compounds have a Kerr constant more than 200 times higher than that of nitrobenzene.

Under these circumstances, studies for using the Kerr effect in display apparatuses has begun. It is expected that use of the Kerr effect attains a relatively low voltage driving because the Kerr effect is proportional to the square of the electric field. Further, it is expected that the utilization of the Kerr effect attains a high-response display apparatus (because, e.g., the Kerr effect shows a response property of several μ seconds to several m seconds, as its basic nature).

A significant practical problem to be overcome for utilizing the Kerr effect in display elements is that utilization of the Kerr effect requires a larger driving voltage compared with conventional liquid crystal display elements. To solve this problem, Publication of Japanese Patent Application, publication No. 2001-249363 (Tokukai 2001-249363; published on Sep. 14, 2001) (hereinafter, referred to as Patent publication 1) teaches a display element in which orientation of negative type liquid crystalline molecules is carried out, with substrates having a surface that have been subjected to alignment treatment, in order that the Kerr effect may be easily generated in the display element.

In the display element described in Patent Document 1, negative type liquid crystalline molecules are provided between a pair of substrates. Here, the wording "negative type" indicates that the liquid crystalline molecules show negative dielectric anisotropy. Moreover, electrodes are provided respectively on inner sides of the substrates. Alignment films which have been treated with rubbing process are provided on the electrodes. Moreover, on outer sides of the substrates, polarizers are so provided that their absorption axes cross each other perpendicularly. Moreover, rubbing directions of the alignment films provided on the electrodes are parallel and directed in the same or opposite directions. Further, the rubbing directions make 45 degrees with the absorption axes of the polarizers.

In the display element of Patent Document 1, having the above arrangement, an electric field (voltage) is applied between the electrodes so as to generate the electric field along a normal direction of the substrates. When the electric field is applied, the polarized negative type liquid crystalline molecules are oriented along an electric field direction in such a manner that the molecules are so directed that their major axial directions are parallel to the rubbing direction (the electric field direction is a direction in which an electric field is applied). With this arrangement, the display element of Patent Document 1 attains an optical response property in which its transmittance is increased by the electric field (voltage) application.

However, the art disclosed in Patent Document 1 has a problem in that the region in which the Kerr effect can be easily generated is limited to a vicinity of surfaces of the substrates. More specifically, in the art of Patent Document 1, only the molecules near the aligned surface of the substrates can be oriented. Therefore, the art of Patent Document 1 provides only little reduction of the driving voltage.

The small reduction in driving voltage occurs because the molecular orientation caused by the electric field application, i.e., the molecular orientation caused by the Kerr effect, has a short long-range order. That is, for example, in liquid crystal display devices such as those of the TN mode, orientational directions of the liquid crystal molecules are changed along substantially a whole range in the normal direction of the substrates, whereas in the liquid crystal display device using the Kerr effect, it is difficult to pass on molecular orientational order occurred in the vicinity of the substrates to a cell interior (bulk region). Because of this, the art of Patent Document 1 cannot significantly reduce the driving voltage to overcome the practical problem.

Further, in applying the art of Patent Document 1 in the display element in which the negative type liquid crystalline molecules are oriented by generation of the electric field along the normal direction of the substrates, there is a problem in that the major axes of the molecules in the bulk region are not aligned in one direction. In the vicinity of the rubbed surfaces (alignment films) of substrates, the electric field application causes the liquid crystal molecules to be oriented along the rubbing direction, whereas in the bulk region far from the substrates, the major axes of the molecules are directed randomly in all directions in a plane of the substrates. This is because the polarization of the molecules exist substantially along a minor axial direction of the molecules even though the polarization of the molecule are oriented. That is, even if the polarization is oriented (that is, orientational polarization occurs) by the electric field application, the bulk region is optically isotropic when viewed from a front direction (a direction along the normal direction of the substrates). Thus, the bulk region makes no contribution to the optical response.

Therefore, even if the art of Patent Document 1 is applied in a display element, a practical level of applied voltage can cause the optical response only in the vicinity of the substrates. A driving voltage much higher than a practical level is required to cause the optical response in the bulk regions.

Moreover, the display element disclosed in Patent Document 1 has a problem in that light leakage occurs when no electric field is applied. This light leakage causes low contrast. Further, the display element disclosed in Patent Document 1 has a problem in that a coloring phenomenon (e.g., a displayed image appears yellowish when the electric field is applied) occurs.

SUMMARY

An object of the present invention is to attain a low driving voltage as low as a practical level, improved contrast, and alleviation in coloring phenomenon in a display element and a display device in which transmittance (transmissivity) is changed by controlling orientational order of molecules.

A display element has a pair of substrates, at least one of which is transparent; and a material layer between the substrates. The display element performs a display operation by applying a field (preferably electric field) between the substrates. The material layer includes a medium whose optical anisotropy magnitude is changeable by and according to the field, and in which a unique twisted chiral structure is formed when optical anisotropy occurs. The unique twisted structure has only one chiral configuration and is structured with molecules of the medium oriented only in one twisting direction.

In the state in which the unique twisted chiral structure is formed when optical anisotropy occurs the molecules in the medium are oriented to form a twisted structure that causes an optical activity that allows light to travel along only one twisting direction (that is, the twisted structure being either dextrorotatory or levorotatory (twisted rightward or leftward) (more specifically, the molecules are oriented to form cluster (molecular agglomerations) having the twisted structure), thereby causing the medium to be optically active.

Moreover, changing the magnitude of the optical anisotropy of the medium by and according to the field (e.g., electric field) applied on the medium changes the refractive index ellipsoid by and according to the field applied on the medium. More specifically, it changes the shape of a refractive index ellipsoid by and according to the field application. That is, the display element utilizes the change of the shape of the refractive index ellipsoid to change the display state depending on whether the field is applied or not.

The refractive index in materials is not isotropic in general and differs depending on directions. This anisotropy in the refractive index, that is, optical anisotropy of the material is generally due to the refractive index ellipsoid. According to general convention, a plane passing the origin and perpendicularly to the traveling direction of the light wave is the cross section of the refractive index ellipsoid with respect to the light traveling in a certain direction. The major axial direction of the ellipsoid is the polarization component direction of the polarized light of the light wave. The half length of the major axis corresponds to the refractive index of that polarization component direction. When optical anisotropy is discussed in terms of a refractive index ellipsoid, the different display states are realized in a conventional liquid crystal device by changing (rotating) a direction of a major axial direction of the refractive index ellipsoid of a liquid crystal molecule by application of field (in the conventional liquid crystal device, by application of electric field). The shape (shape of cross section of the refractive index ellipsoid) of the refractive index ellipsoid is not changed (i.e., remains constantly ellipsoidal).

By contrast, in the display elements described herein, the different display states are realized by changing the shape (shape of cross section of the refractive index ellipsoid) of the refractive index ellipsoid formed from molecules constituting the medium by application of field.

As described above, in the conventional liquid crystal display element, the display operation is carried out by utilizing only the change in the orientational direction of the liquid crystal molecules due to rotation thereof caused by the electric field application. The liquid crystal molecules in alignment are rotated together in one direction. Thus, inherent viscosity of the liquid crystal largely affects response speed. On the other hand, unlike the conventional liquid crystal display element, when the display uses the change in modulation of the optical anisotropy in the medium, the inherent viscosity of the liquid crystal does not significantly affect response speed. Thus, it is possible to obtain a high-speed response. Moreover, the high-speed response allows the display element to be used, for example, in a display device of the field sequential color mode.

Moreover, the conventional liquid crystal display element has a problem in that its driving temperature range is limited to temperatures near a phase transition point of a liquid crystal phase, and thus it requires a highly accurate temperature control. On the other hand, the embodiments of display elements as provided herein only require that the medium be kept at temperatures at which the magnitude of the optical anisotropy is changeable by the application of the electric field. Thus, it is possible to easily perform the temperature control.

Moreover, it is possible to realize a wider viewing angle property than in the conventional liquid crystal display element by using, for performing the display operation, a change in the magnitude of the optical anisotropy of the medium. By contrast, the conventional liquid crystal display element utilizes, for performing the display operation, a change in the orientational direction of the liquid crystal.

Further, in this arrangement, the molecules are oriented to form the twisted structure having only one chiral configuration, that is, the structure twisted only rightward or leftward (dextrorotatory or levorotatory). In other words, the twisted structures have a certain optical activity in common even though each twisted structure is directed randomly. Hence, the material layer as a whole attains a large optical activity. With this, it becomes possible to attain a maximum transmittance with low voltage and to reduce the driving voltage to be as low as the practical level (that allows the element to be used practically).

Moreover, because this arrangement needs no alignment film, the display element of this arrangement is free from the phase difference caused between the rubbed alignment films, and the light leakage due to phase difference caused by molecules adsorbed on the alignment films. Thus, the display element of this arrangement attains high contrast. Moreover, this arrangement is free from a problem wherein the transmittance is low on a boundary between domains in the case where there are plural domains (which respectively have, for example, leftward twisted structure and rightward twisted structure). Thus, according to this arrangement, it is possible to improve the transmittance, and thereby possible to attain high contrast.

Moreover, because the molecules are oriented into the twisted structure, influence of the wavelength dispersion becomes smaller. This alleviates the coloring phenomenon.

The field (or force), that is, the means for generating the optical anisotropy in the display element, is not particularly limited. Thus, use of electric field, magnetic field, light or the like, may be adopted, for example. Among them, the use of the electric field is preferable for the sake of easy design and driving control of the display element. The display element may be preferably provided with an electrode on each substrate, for applying an electric field between the substrates. In the field of electronics, electric field driving (addressing) is a most widely used method of driving (addressing). Thus, multi-purpose ICs (Integrated circuits), LSI (Large-Scale Integrated circuit), driving circuits, electronic devices are applicable in the arrangement where the driving is carried out by the electric field driving. This is a significant advantage in terms of production cost.

With the arrangement in which an electrode on each substrate, it is possible to generate an electric field along the normal direction of the substrates. In this arrangement in which the electric field is generated along the normal direction of the substrates, the whole area of a top surface of the substrate can be utilized as the display region. Thus, this improves the aperture ratio and transmittance, and allows the display element to be driven with a lower voltage. Further, with this arrangement, it is possible to promote the occurrence of the optical anisotropy not only in that part of the medium which is in the vicinity of the substrates but also in that part of the medium which is far from the substrates. Moreover, in terms of a gap across which the driving voltage is applied, it is possible to attain a narrower gap compared with an arrangement in which the driving voltage is applied between tooth portions of interleave electrodes.

It is preferable that the material layer be a dielectric material layer containing a dielectric material. Moreover, the medium may be optically isotropic when the field (e.g., electric field) is applied, or when no field (e.g., no electric field) is applied. For the sake of longer life and better reliability of the display element, it is preferable that a dielectric material, for example, a liquid crystal, be used and its electro-optical effect be utilized for the display operation in the arrangement in which the driving of the display element is carried out by using the electric field.

Therefore, a display element according to the preset invention may be so arranged as to include a pair of substrates, at least one of which is transparent; a material layer (more specifically, a dielectric material layer) between the substrates; and an electrode on each substrate, for applying an electric field on the dielectric material layer, the display element performing display operation by applying a field on the material layer (e.g., dielectric material layer) between the substrates, and the material layer including a medium (more specifically, a dielectric material) whose optical anisotropy magnitude is changeable by and according to the field, and in which a twisted chiral structure is formed when optical anisotropy occurs, the twisted structure having only one chiral configuration and being structured with molecules of the medium (dielectric material) oriented only in one twisting direction.

In order to attain the object, a display device is provided with a display element having any one of the arrangements mentioned above.

With this arrangement, it is possible to attain wide driving (operable) temperature range, wide viewing angle property, and high-speed response property in a display device in which the transmittance is changed by controlling the orientational order of the molecules. Further, the arrangement realizes a display device in which contrast is improved and the coloring phenomenon is alleviated.

Because the display element according to the present invention has a high speed response property, the display device is applicable as a display device of field sequential color mode owing to the high-speed response property.

BRIEF DESCRIPTION OF THE DRAWINGS

For a fuller understanding of the nature and advantages of embodiments herein provided, reference should be made to the ensuing detailed description taken in conjunction with the accompanying drawings.

FIG. 15(a) is a cross sectional view schematically illustrating a shape of an average refractive index ellipsoid in a medium in a conventional display element of TN mode when no voltage is applied.

FIG. 15(b) is a cross sectional view schematically illustrating a shape of an average refractive index ellipsoid in a medium in a conventional display element of TN mode when no voltage is applied.

FIG. 15(c) is a cross sectional view schematically illustrating a shape of an average refractive index ellipsoid in a medium in a conventional display element of VA mode when no voltage is applied.

FIG. 15(d) is a cross sectional view schematically illustrating a shape of an average refractive index ellipsoid in a medium in a conventional display element of VA mode when no voltage is applied.

FIG. 15(e) is a cross sectional view schematically illustrating a shape of an average refractive index ellipsoid in a medium in a conventional display element of IPS mode when no voltage is applied.

FIG. 15(f) is a cross sectional view schematically illustrating a shape of an average refractive index ellipsoid in a medium in a conventional display element of IPS mode when a voltage is applied.

FIG. 15(g) is a cross sectional view schematically illustrating a shape of an average refractive index ellipsoid in the medium when no voltage is applied in the display element according to an example embodiment.

FIG. 15(h) is a cross sectional view schematically illustrating a shape of an average refractive index ellipsoid in the medium when a voltage is applied in the display element according to an example embodiment.

DESCRIPTION OF THE EMBODIMENTS

Figure 1:
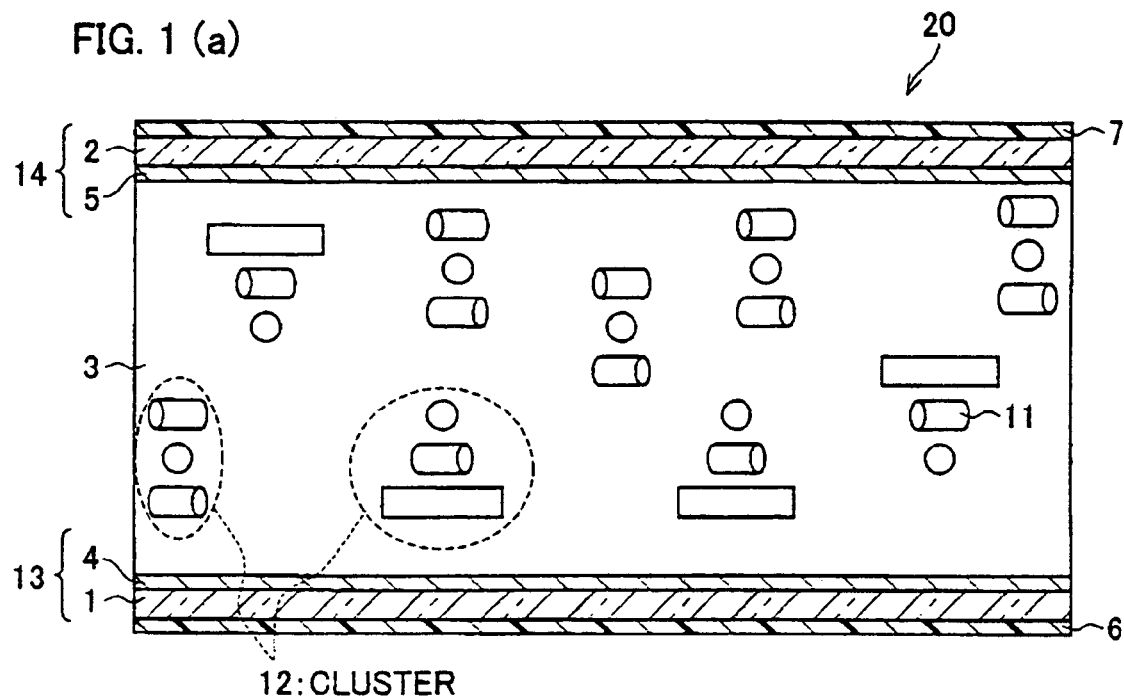
FIG. 1(a) is a schematic cross sectional view for explaining orientation of molecules in a display element according to one example embodiment of a display element when an electric field is applied.
FIG. 1(b) is a schematic cross sectional view for explaining orientation of molecules in the display element according to the embodiment of FIG. 1(a) when no electric field is applied.
Figure 1:
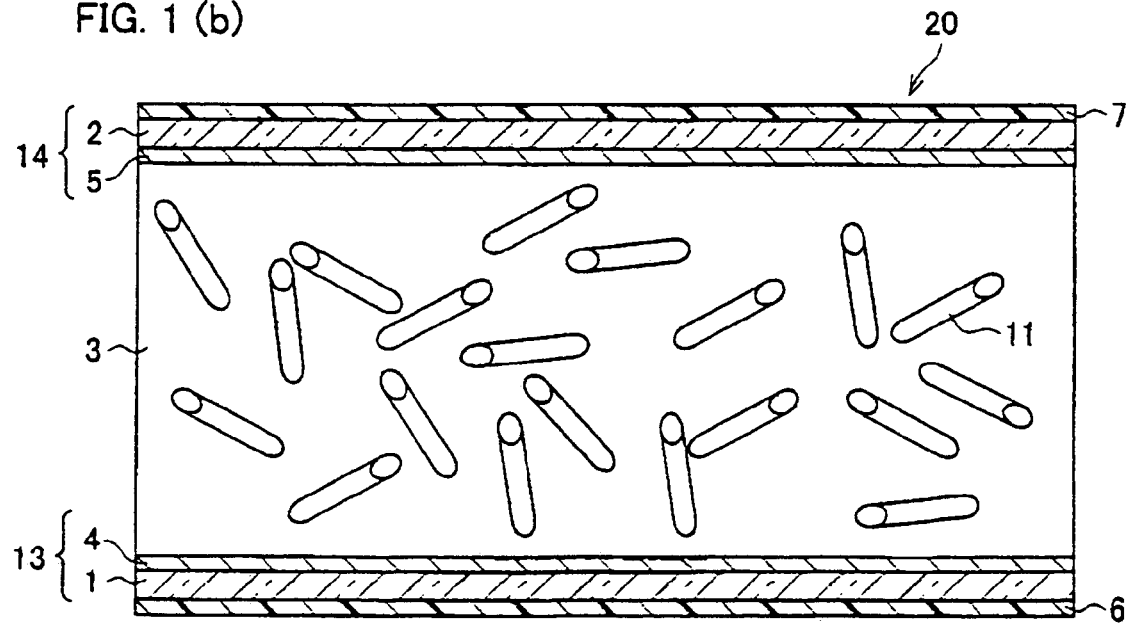
Figure 5:
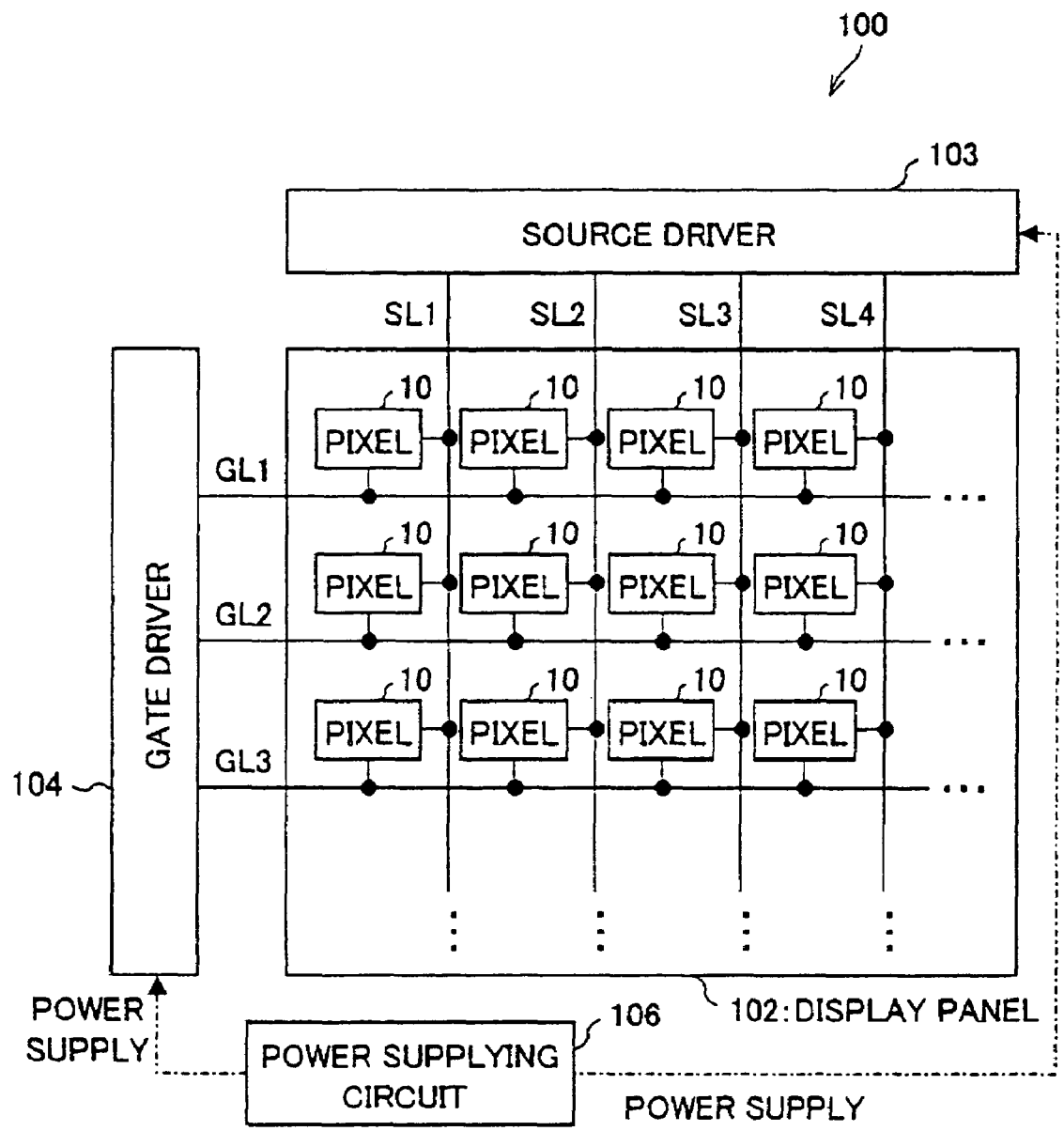
FIG. 5 is a block diagram for schematically illustrating an arrangement of parts of a display device in which the display element according to the display device is used.
Figure 6:
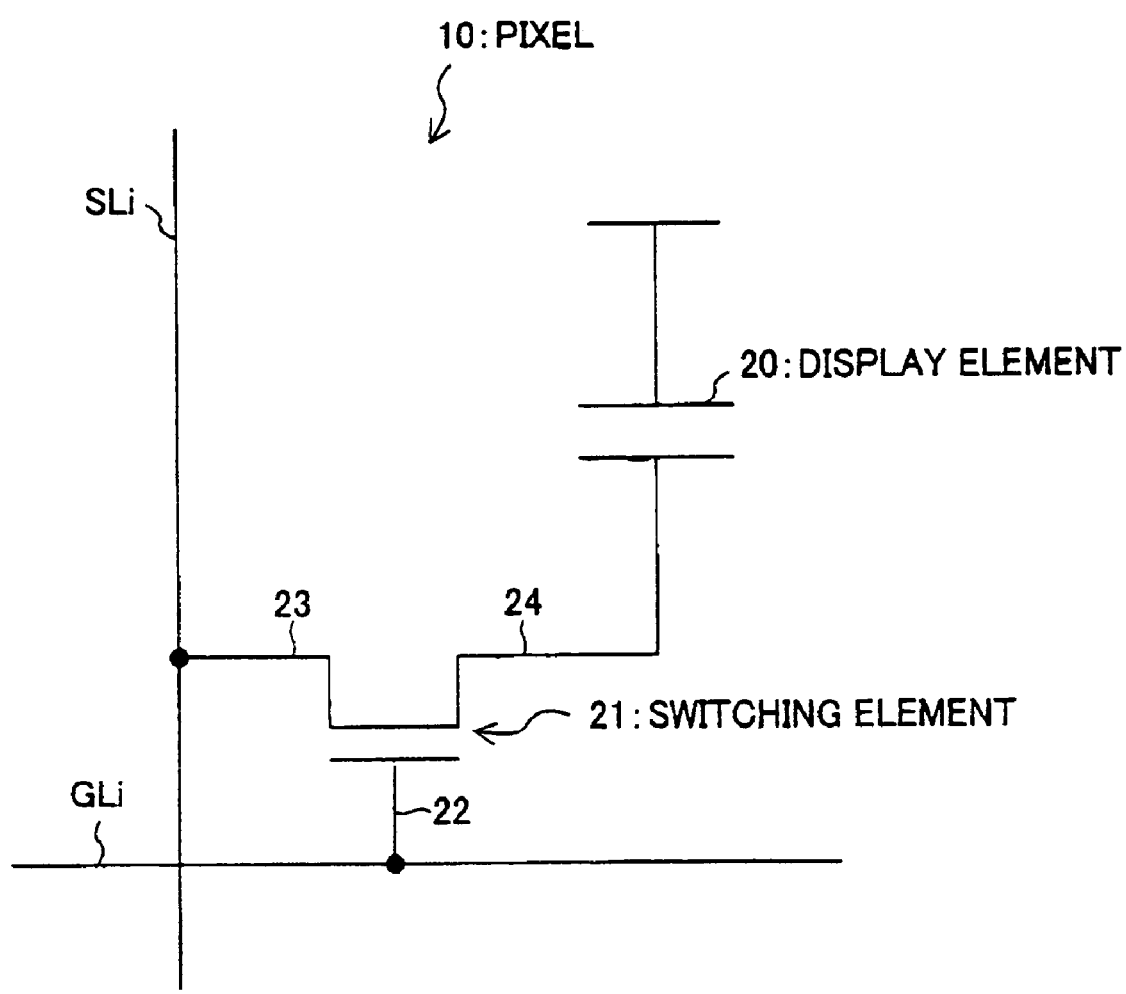
FIG. 6 is a view schematically illustrating an arrangement of a display element for use in a display device illustrated in FIG. 5.

A non-limiting, example embodiment is described with reference to FIGS. 1 to 17. FIGS. 1(a) and 1(b) are schematic cross sectional views schematically illustrating an arrangement of a display element according to an example implementation of the present embodiment. FIG. 1(a) illustrates the display element when an electric field is applied between the substrates and FIG. 1(b) illustrates the display element when no electric field is applied. Moreover, FIG. 5 schematically illustrates an arrangement of various parts of a display device in which the display element according to the present embodiment is used. FIG. 6 schematically illustrates an arrangement of a periphery of the display element used in the display device illustrated in FIG. 5.

The display element according to the present embodiment can be used in a display device. A driving circuit, signal lines (e.g., data signal lines), scanning lines (e.g., scanning signal lines), switching elements or the like are also provided in the display device.

As illustrated in FIG. 5, a display device 100 according to the present embodiment is provided, e.g., with (a) a display panel 102 in which pixels 10 are arranged in matrix, (b) a source driver 103 and gate driver 104, which function as driving circuits, and (c) a power supplying circuit 106.

Each pixel 10 is, as illustrated in FIG. 6, provided with a display element 20 and a switching element 21. The display element 20 is the display element according to the present embodiment and will be described later.

Moreover, the display panel 102 is provided with a plurality of data signal lines SL1 to SLn (n is an arbitral integer not less than 2) and a plurality of scanning lines GL1 to GLm (m is an arbitral integer not less than 2), which respectively cross the data signal lines SL1 to SLn. A pixel 10 is provided at each intersection of one of the data signal lines SL1 to SLn and one of the scanning signal lines GL1 to GLm.

The power supplying circuit 106 supplies a voltage to the source driver 103 and the gate driver 104 in order to cause the display panel 102 to perform a display operation. When the voltage is supplied, the source driver 103 drives the data signal lines SL1 to SLn of the display panel 102 and the gate driver 104 drives the scanning signal lines GL1 to GLm of the display panel 102.

The switching element 21 may be, for example, an FET (Field Effect Transistor), a TFT (Thin Film Transistor), or the like. In FIG. 6, the switching element 21 is connected to the scanning signal line GLi via its gate electrode 22, and to data signal line SLi via its source electrode 23. Further, the switching element 21 is connected to the display element 20 via its drain electrode 24. Moreover, another terminal of the display element 20 is connected to a common electrode line (not illustrated), which is commonly connected to all the pixels 10. With this arrangement, the switching element 21 is turned ON so as to supply a signal voltage to the display element 20 via the data signal line SLi (i is an integer not less than 1) from the source driver 103 when the scanning signal line GLi (i is an integer not less than 1) is selected, the signal voltage determined in accordance with a display data signal inputted from a controller (not illustrated). During a period in which the switching element 21 is turned OFF after an end of a period in which the scanning signal line GLi is selected, the display element 20 ideally keeps the voltage that it holds when the turning-OFF of the display element 20 is carried out.

In the present embodiment, the display operation of the display element 20 is carried out by using a medium which is optically isotropic in dependence upon application of an electric field (e.g., voltage), e.g., being isotropic either when the electric field is applied or is not applied. The term "medium" encompasses a liquid crystalline medium, a liquid crystal material, a liquid crystal mixture, and a dielectric material or layer, or any similar terms or derivations thereof, all such terms being used essentially interchangeably but more often simply referred to as "medium". In being "optically isotropic" is meant that the medium is at least macroscopically isotropic in the visible light wavelength region (i.e., in a scale equal to or larger than a wavelength scale of the visible light).

An example of the arrangement of the display element 20 according to the present embodiment is described referring to FIGS. 1(a) and 1(b).

As illustrated in FIGS. 1(a) and 1(b), the display element 20 according to the present embodiment is provided with a pair of substrates 13 and 14 (e.g., electrode substrates facing each other). At least one of the substrates 13 and 14 is transparent. Between the substrates 13 and 14, a dielectric material layer (dielectric liquid layer) 3 is sandwiched, which is an optical modulation layer (material layer). As illustrated in FIGS. 1(a) and 1(b), the substrates 13 and 14 are respectively provided with, for example, substrates 1 and 2 (transparent substrates) which are transparent and are, for example, glass substrates. On facing surfaces (internal surfaces) of the substrates 1 and 2, electrodes (transparent electrodes) 4 and 5 are provided respectively. The electrodes 4 and 5 are electric field applying means for applying an electric field on the dielectric material layer 3. Moreover, on outer surfaces (which are opposite to the facing surfaces) of the substrates 1 and 2, polarizers 6 and 7 are respectively provided.

Figure 7:
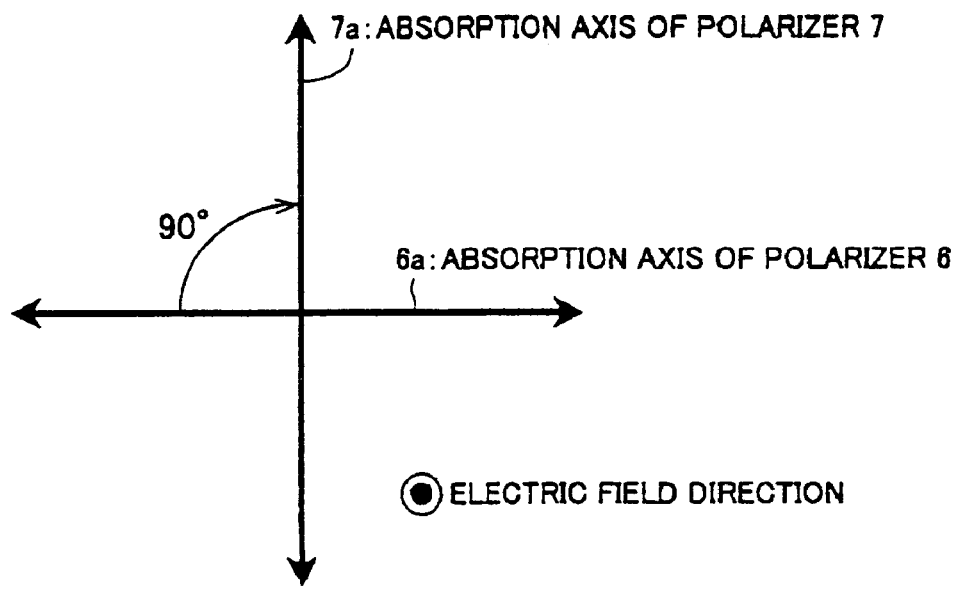
FIG. 7 is a view for explaining relationship between the absorption axial directions of the polarizers and electric field application.

In the present embodiment, a gap between the substrates 13 and 14 of the display element 20 is 5 μm. Accordingly, a thickness of the dielectric material layer 3 between the substrate 1 and 2, on which the electrodes 4 and 5 are respectively provided, is 5 μm. Moreover, in the present embodiment, the electrodes 4 and 5 are transparent electrodes made of ITO (Indium Tin Oxide). Moreover, the polarizers 6 and 7 are arranged such that their absorption axes 6a and 7a cross each other perpendicularly, as illustrated in FIG. 7.

The dielectric material layer 3 is formed by sealing a material between the substrates 13 and 14. In the present embodiment, the material sealed between the substrates 13 and 14 is a negative type liquid crystalline mixture. A chiral agent is added to the negative type liquid crystalline mixture. The negative type liquid crystalline mixture contains a compound 1-3 (30 wt %), a compound 1-2 (40 wt %) and a compound (30 wt %). The compound 1-1 is represented by the following Structural Formula (1):

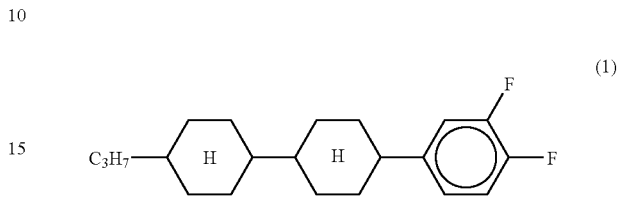

The compound 1-2 is represented by Structural Formula (2):

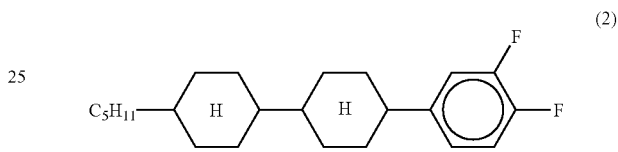

The compound 1-3 is represented by Structural Formula (3):

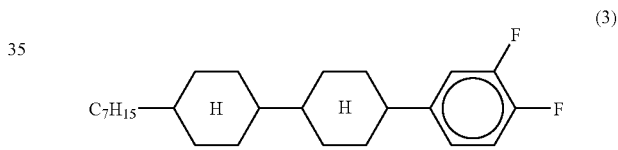

How to manufacture the display element 20 according to the present embodiment is understood with reference to FIGS. 1(a) and 1(b).

To begin, the electrodes 4 and 5 are respectively formed on surfaces of the substrates 1 and 2. In this way, the substrates 13 and 14 (electrodes substrates) on which the electrodes 4 and 5 are respectively formed on the substrates 1 and 2 are prepared. The formation of the electrodes 4 and 5 may be carried out in the same manner as conventional manufacturing method of liquid crystal display element.

Next, the substrates 13 and 14 are assembled together with a gap (thickness of the dielectric material layer 3) of 5 μm therebetween formed by interposing a spacer (not illustrated) therebetween. The spacer can be, for example, plastic beads or the like. A sealing material (not illustrated) is applied around the edges of the assembled substrates, thereby sealing off the edges and fixing the assembling. In applying the sealing material, a portion that will be an inlet (not illustrated) for injecting the dielectric material (dielectric liquid) is not sealed off but kept open. The spacer and the sealing material are not limited to any particular materials. Materials that are conventionally used for the liquid crystal display element may be used as the materials of the spacer and the sealing material.

After assembling the substrates 13 and 14 as such, the medium is injected into the gap between the substrates 13 and 14 (that is between the substrates 1 and 2 on which the electrodes 4 and 5 are respectively formed). The medium is a mixture of the negative type liquid crystalline mixture (negative type liquid crystalline mixture (1)) and the chiral agent. The negative type liquid crystalline mixture contains the compound 1-1 (30 wt %), the compound 1-2 (40 wt %), and the compound 1-3 (30 wt %). By injecting the medium into the gap as such, the dielectric material layer 3 containing the medium (negative type liquid crystalline mixture (1)) is formed.

After that, the inlet is sealed off. Then, the polarizers 6 and 7 are respectively bonded onto the surfaces (outer surfaces) of the substrates 1 and 2 which are opposite to the surfaces on which the electrodes 4 and 5 are formed. The polarizers 6 and 7 are so provided that their absorption axes 6a and 7a cross each other perpendicularly, as illustrated in FIG. 7.

The negative type liquid crystalline mixture (1) is in a negative type nematic liquid crystal phase at temperature less than 113° C., and is isotropic at temperatures at or above 113° C.

In an example embodiment, a product designated as "ZLI-4572" by Merck Ltd. is used in the chiral agent. The chiral agent is added by 30 wt % with respect to a sum of the negative type liquid crystalline mixture (1) and the chiral agent. That is, in the present embodiment, the dielectric material (dielectric liquid) which the dielectric material layer 3 comprises is a chiral-agent-added liquid crystal material (chiral-agent-added liquid crystal material (1)) prepared by added the chiral agent "ZLI-4572" to the negative type liquid crystalline mixture (1).

Transmittance of the display element 20 thus prepared could be changed by applying an electric field (voltage) between the electrodes 4 and 5, while the display element 20 being kept at a temperature just above a nematic phase-isotropic phase transition point (phase transition temperature, $T_{ni}$). For example, the display element 20 could be kept at a temperature slightly above $T_{ni}$ (for example, at $T_{ni}$+0.1K) by using an externally provided heating device. That is, the transmittance of the dielectric material layer 3 could be changed by and according to electric field (voltage) application between the electrodes 4 and 5 when the medium of the dielectric material layer 3 was caused to be isotropic by keeping the temperature of the medium slightly above the liquid crystal phase-isotropic phase transition point ($T_{ni}$) of the medium. Note that maximum transmittance of the display element 20 of this arrangement (hereinafter, referred to as the present display element 20) was obtained when a voltage of 70V was applied. Moreover, a maximum contrast of the present display element 20 was 500. The maximum contrast is a value obtained by dividing the maximum transmittance by a minimum transmittance (transmittance attained when no electric field is applied). That is, the maximum contrast=the maximum transmittance/minimum transmittance. Moreover, coloring phenomenon occurred in the present display element 20 was almost unnoticeable.

Figure 2:
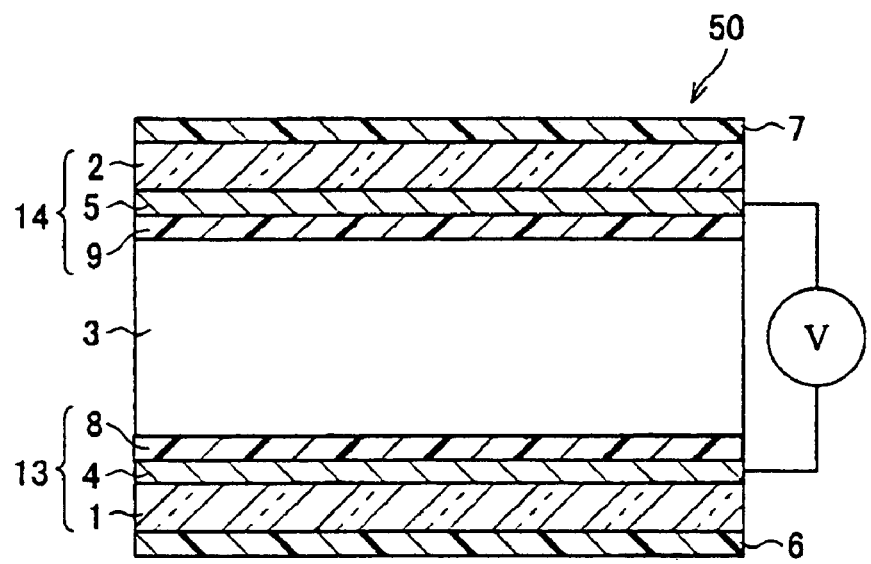
FIG. 2 is a cross sectional view schematically illustrating an arrangement of a comparative display element.

For making a comparison with the present display element 20, a comparative display element 50 as illustrated in FIG. 2 was prepared. In the comparative display element 50, each of substrates 13 and 14 (electrode substrates) was provided with an alignment film 8 or 9 on an electrode 4 or 5 on a surface of a substrate 1 or 2, the alignment film 8 or 9 having been rubbed.

Figure 3:
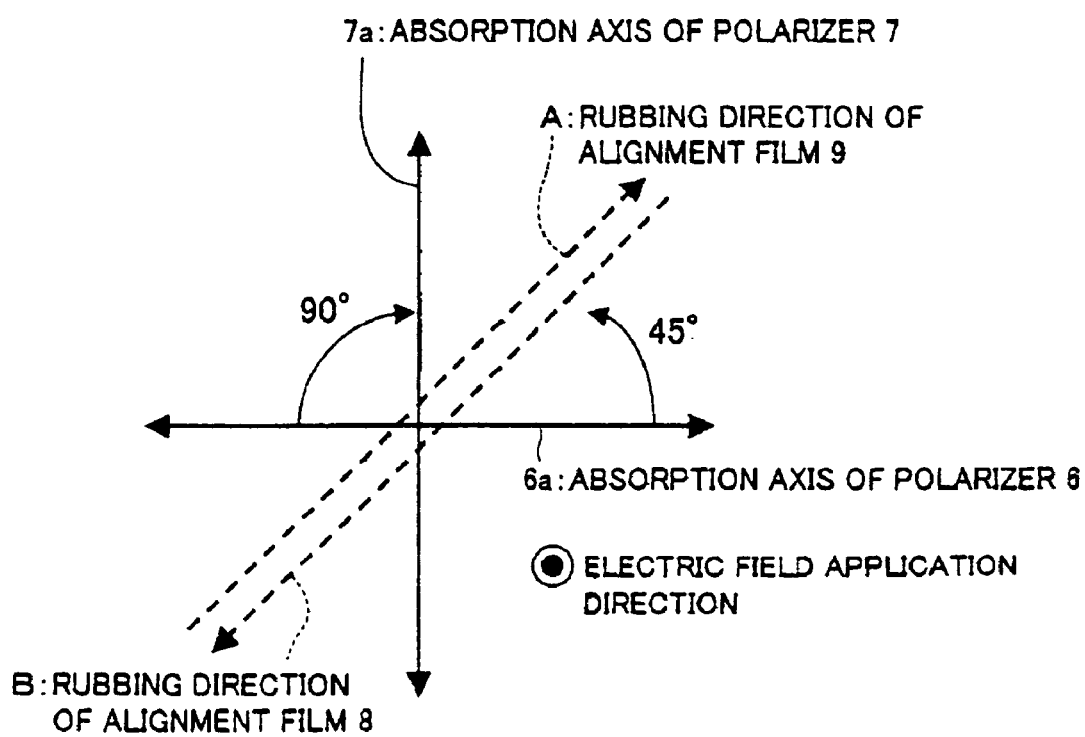
FIG. 3 is a view for explaining rubbing directions of alignment films and absorption axial directions of polarizers.

FIG. 3 is a view explaining a relationship among a rubbing direction A of the alignment film 8, a rubbing direction B of the alignment film 9, absorption axial directions of polarizers 6 and 7, and directions along which electric fields are applied respectively by the electrodes 4 and 5. The electrodes 4 and 5 located to generate the electric fields along a normal direction of the substrates 1 and 2 as illustrated in FIGS. 2 and 3. Moreover, the polarizers 6 and 7 have their absorption axes 6a and 7a crossing each other perpendicularly as illustrated in FIG. 3. Moreover, the alignment films 8 and 9 are so provided that, as illustrated in FIGS. 2 and 3, the rubbing directions A and B are parallel but opposite to each other and respectively make an angle of 45 degrees with respect to the absorption axes 6a and 7a (absorption axial directions) of the polarizers 6 and 7.

Moreover, the dielectric material layer 3 of the comparative display element 50 is made of a negative type liquid crystalline mixture (1) to which no chiral agent is added.

A maximum transmittance of the comparative display element thus prepared was obtained by applying a voltage of 110V between the electrodes 4 and 5 while keeping the comparative display element at the temperature just above the nematic phase-isotropic phase transition point ($T_{ni}$) (that is, at a temperature slightly above $T_{ni}$, for example, at $T_{ni}$+0.1K) by using an externally provided heating device. A maximum contrast of the comparative display element 50 was 200. Moreover, a yellowish coloring phenomenon was observed on a display surface of the comparative display element 50 when the electric field (voltage) was applied.

As described above, the display element 20 according to the present embodiment could obtain the maximum transmittance with a lower driving voltage than the comparative display element 50. This is because, as later described, molecules near the rubbed surfaces of the substrates 13 and 14 could be oriented with a low voltage but molecules in a region (bulk region) far from the substrates 13 and 14 could not be oriented with such low voltage.

Figure 4:
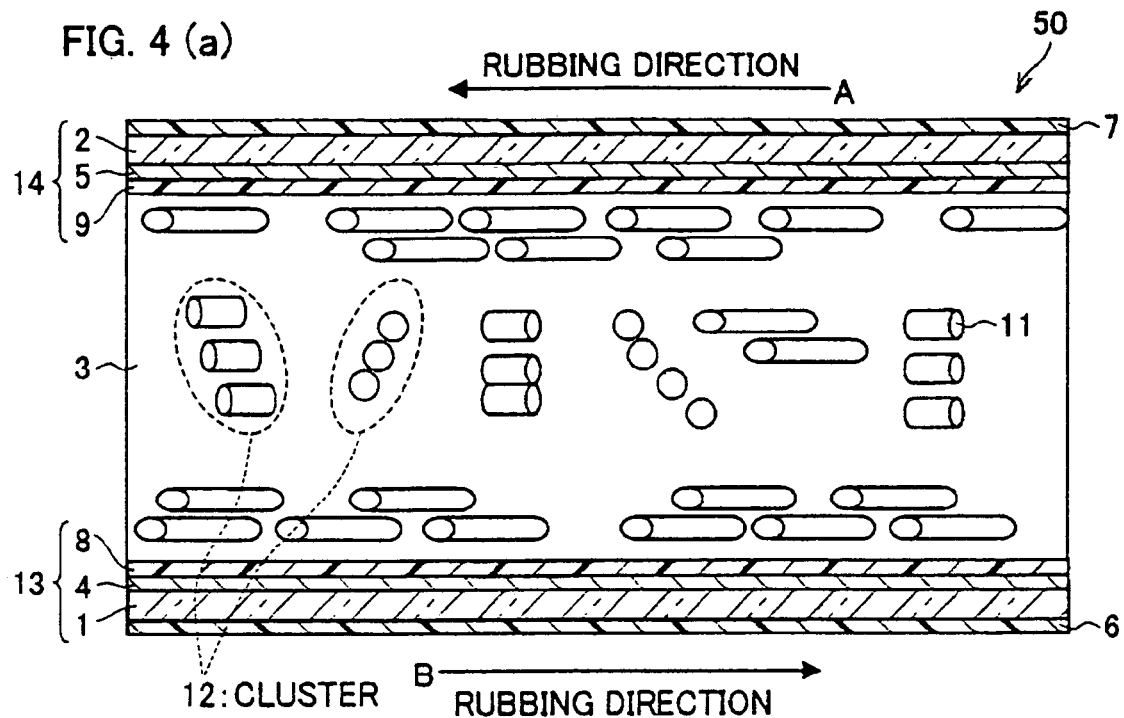
FIG. 4(a) is a schematic cross sectional view for explaining orientation of molecules in the comparative display element when the electric field is applied.
FIG. 4(b) is a schematic cross sectional view for explaining orientation of molecules in the comparative display element when no electric field is applied.
Figure 4:
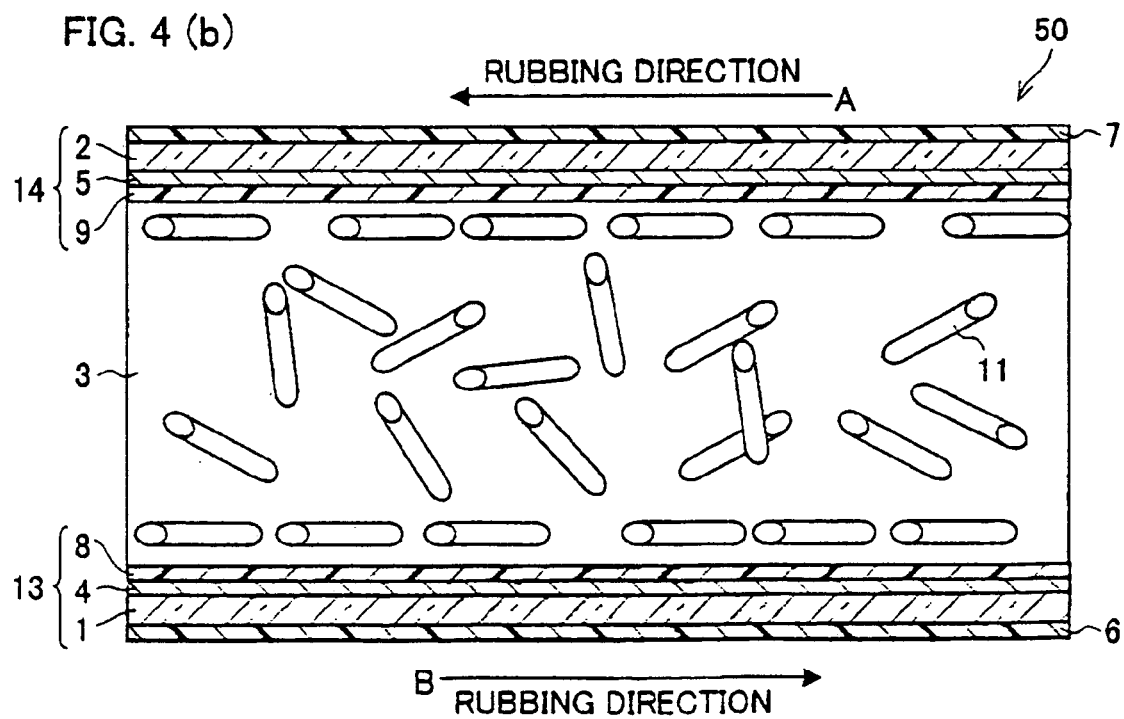

FIGS. 4(*a*) and 4(*b*) are cross sectional views schematically illustrating orientations of molecules 11, e.g., molecules such as liquid crystal molecules, for example, of the negative type liquid crystalline mixture (1). FIG. 4(*a*) shows the molecules 11 when the electric field is applied; FIG. 4(*b*) shows the molecules 11 when no electric field is applied. Respective liquid crystal molecules that constitute the medium to be sealed as the dielectric material layer 3 are represented as molecules 11 in FIGS. 4(*a*) and 4(*b*). As illustrated in FIG. 4(*b*), when no electric field is applied, the molecules 11 in the vicinities of the surfaces of the substrates 13 and 14 are oriented along the rubbing directions A and B (alignment directions) by the rubbing treatment given to the alignment films 8 and 9. Specifically, due to the alignment films 8 and 9 formed such that the rubbing directions A and B are parallel but in opposite directions, the molecules 11 near the surfaces of the substrates 13 and 14 are oriented in one direction, thereby causing a homogeneous structure. However, in the bulk region far from the vicinities of the surfaces of the substrates 13 and 14, the molecules 11 are directed in many directions as illustrated in FIG. 4(*b*), thereby attaining isotropy.

When an electric field is applied between the electrodes 4 and 5 of the comparative display element 50, the molecules 11 in the vicinities of the surfaces of the substrates 13 and 14 are oriented along the rubbing direction as illustrated in FIG. 4(*a*). The molecules 11 in the vicinities of the substrate surfaces are oriented (aligned) as such due to intermolecular effects between them, and the molecules 11 are aligned as a result of the rubbing treatment. Meanwhile, the molecules 11 in the bulk region are polarized orientationally by the electric field applied thereto. As a result, the molecules 11 in the bulk region are directed in many directions within planes parallel to the substrates 13 and 14, even though major axial directions of the molecules 11 in the bulk region are oriented parallel to the surface of the substrates 13 and 14.

The orientation of FIG. 4(a) occurs because the molecules 11 in the comparative display element 50 do not have a long-distance order, unlike the liquid crystal of the conventional liquid crystal display. The fact that the comparative display element 50 does not have such long-distance order that allows the molecules 11 to orient along a predetermined direction when no electric field is applied, and to change their orientation direction together without losing the orientational order, when the electric field is applied. Because of this, the molecules 11 of the comparative display element 50 which are in the vicinities of the surfaces of the substrates 13 and 14 (that have been subjected to the alignment treatment (rubbing treatment)) are oriented with a low voltage. However, the molecular orientational order in the vicinities of the substrates 13 and 14 is not passed into an internal portion of the cells of the comparative display element 50. Thus, the molecules 11 in the bulk region cannot be oriented with such a low voltage.

In the comparative display element 50, the molecules 11 in the bulk region are polarized along their molecular minor axial directions even if they are orientationally polarized. Because of this, the major axes of molecules 11 are directed in all directions along the plane of the substrates, thus the directions of the major axes are not fixed to one direction. As a result, despite the orientational polarization of the molecules 11 in the bulk region by the application of the electric field, the bulk region is optically isotropic when viewed from a front (in the normal direction of the substrate 14), and cannot contribute to the optical response.

In the comparative display element 50, therefore, application of a voltage at a practical level causes the optical response only in the vicinities of the substrates 13 and 14. The optical response cannot be attained in the bulk region without applying a driving voltage that is much higher than the practical level.

On the other hand, in the example embodiment of FIG. 1(a) and FIG. 1(b) the voltage which attains the highest transmittance (maximum transmittance) of the molecules 11 of the negative type liquid crystalline mixture (1) is lower than that of the comparative display element 50 in the display element 20. This is because, in the display element 20 according to the present embodiment, small agglomerations of molecules or clusters 12 are formed. Clusters 12 have a twisted structure (twisted chiral structure) having either a rightward twist or a leftward twist (only one twist direction: dextrorotatory or levorotatory), that is, having only one chiral configuration (R configuration or S configuration). In other words, the molecules 11 are oriented in one twisting direction in the twisted structure.

As mentioned above, FIGS. 1(a) and 1(b) are cross sectional views schematically illustrating the orientations of the molecules 11 in the display element 20 according to the present embodiment in the respective events of an electric field being applied (FIG. 1(a)) and no electric field being applied (FIG. 1(b)). As illustrated in FIG. 1(b), the molecules 11 constituting the medium (negative liquid crystalline mixtures (1)), sealed between the substrates 13 and 14 in order to form the dielectric material layer 3, are directed in many directions when no electric field is applied. Thus, the medium is optically isotropic when no electric field is applied thereto.

However, when the electric field is applied between the electrodes 4 and 5 in the display element 20, the clusters 12, having the twisted structure (helical structure), are formed as illustrated in FIG. 1(a). The clusters 12 are formed due to a short-distance intermolecular effect caused by the voltage application. The clusters 12 cause optical activity (optical rotary power). Moreover, in the present embodiment, the chiral agent is added to the medium (negative liquid crystalline mixture (1)). In other words, the dielectric material (dielectric liquid) which the dielectric material layer 3 comprises contains the chiral agent as well as the medium. Because of this, the twisted structure (twisted chiral structure) contains only one chiral configuration (R configuration or S configuration) and has only one of the rightward twist or the leftward twist (only one twist direction: either dextrorotatory or levorotatory). In other words, the twisted chiral structure is such that the molecules 11 are oriented in only one twist direction when the optical anisotropy occurs.

Therefore, the present display element 20 has a certain optical activity regardless of whether or not the clusters 12 (each twisted structure) are directed in many directions without orientational correlativity between themselves. Because of this, the display element 20 can have a large optical activity as a whole. Thus, the voltage to attain the maximum transmittance in the display element 20 is lower than that in the comparative display element 50. Note that the clusters 12 also occur in the comparative display element 50 as illustrated in FIG. 4(a). The clusters 12 cause birefringence in the comparative display element 50. However, the clusters 12 are twisted in many directions without correlativity between themselves (e.g., some of the clusters 12 are twisted rightward and other clusters are twisted leftward). Therefore, the birefringence caused by such clusters 12 essentially is canceled out.

The present embodiment thus makes it possible to reduce the driving voltage to a practical level in the display element and in the display device (specifically the display element 20 and the display device 100) in which the orientational order of the molecules 11 is controlled in order to change the transmittance.

Moreover, the display element 20 according to the present embodiment attains a higher contrast than the comparative display element 50. This is because the lowest transmittance (transmittance when no electric field (voltage) is applied) is higher in the comparative display element 50 than in the display element 20 of the present embodiment. Because the lowest transmittance is higher in the comparative display element 50, light leakage occurs in the comparative display element 50 when no electric field (voltage) is applied. Light leakage causes lower contrast.

There are two causes for light leakage (and resulting lower contrast) in the comparative display element 50 when no electric field is applied. The two causes are:

1. A phase difference caused by the rubbed alignment films 8 and 9; and
2. A phase difference caused by the molecules 11 adhered on the aliment films 8 and 9.

On the other hand, the display element 20 is provided with no alignment film, and no rubbing treatment is done to the display element 20. Thus, the display element 20 is free from such light leakage due to the phase differences. As such, the display element 20 can attain a higher contrast than in the comparative display element 50.

Moreover, any coloring phenomenon which might occur in the display element 20 according to the present embodiment is essentially unnoticeable, while the coloring phenomenon occurring in the comparative display element 50 is quite noticeable. This is because the molecules 11 in the present display element 20 are oriented to form the twisted structure. On the other hand, in the comparative display element 50, the molecules 11 are oriented in the homogeneous structure in which the molecules 11 are oriented in one direction. It is believed that the coloring phenomenon is due to the wavelength dispersion caused by the refractive index of the molecules 11, and that the arrangement in which the molecules 11 are oriented to form the twisted structure as in the present display element 20 is less susceptible to the wavelength dispersion than the homogeneous structure as in the comparative display element 50.

FIG. 7 through FIG. 10 illustrate a second example implementation of the present embodiment. The display element 20 according to the second implementation is designated as display element (H)20 in FIG. 8. It will be understood that a display device 100 such as that of FIGS. 5 and 6 can comprise or incorporate the display element (H)20 as the display element 20.

Figure 8:
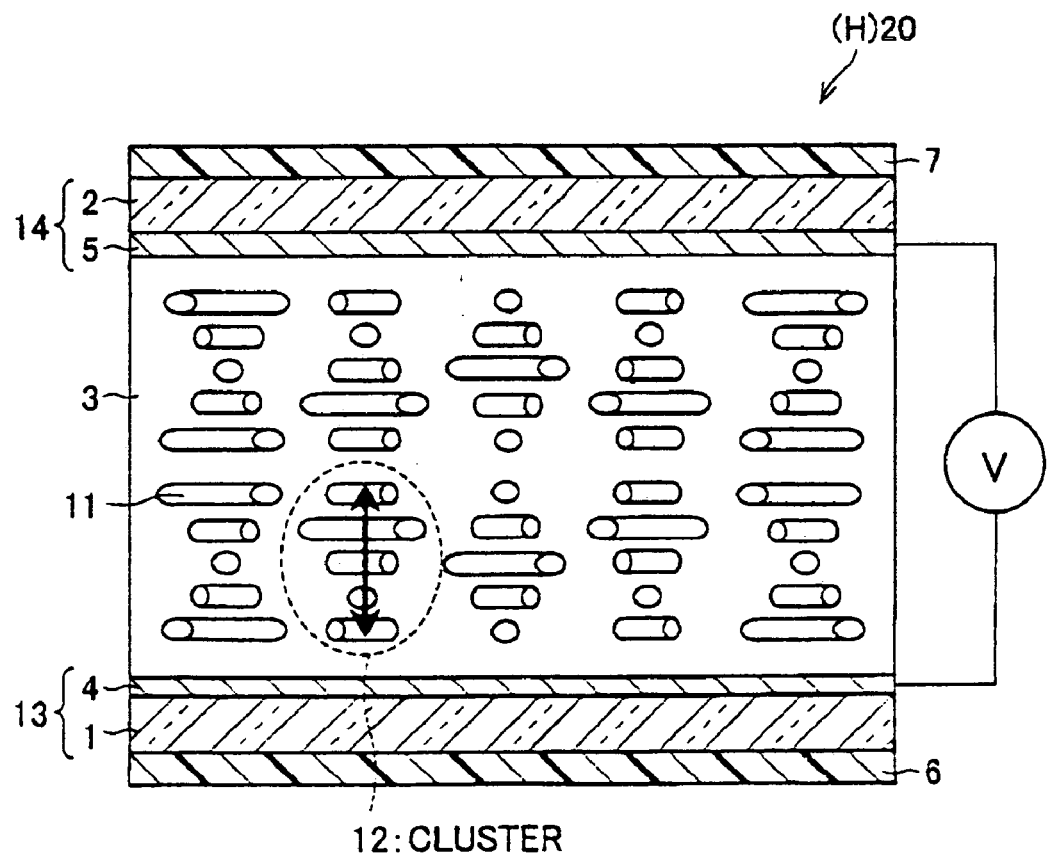
FIG. 8 is a cross sectional view schematically illustrating another example implementation of an arrangement of a display element.

FIG. 8 is a cross sectional view schematically illustrating the example of the schematic arrangement of the display element (H)20 according to the present embodiment. Specifically, FIG. 8 schematically and cross-sectionally depicts the arrangement of the display element (H)20 according to the present example, when the electric field is applied.

The display element (H)20 has a configuration similar to the above-discussed display element 20 illustrated in FIGS. 1(a) and 1(b). As illustrated in FIG. 8, the display element (H)20 is provided with substrates 13 and 14, which include a substrate 1 or 2 on which an electrode 4 or 5 is provided. Between the substrates 13 and 14, a dielectric material layer 3 (e.g., dielectric liquid layer), which is an optical modulation layer, is sandwiched. On external surfaces of the substrates 13 and 14, that is, on surfaces opposite to those surfaces of the substrates 1 and 2 on which the electrode is provided, polarizers 6 and 7 are provided respectively.

The substrates 1 and 2 of the present example are glass substrates. Moreover, the electrodes 4 and 5 are preferably transparent electrodes made of ITO. The polarizers 6 and 7 are so positioned that their absorption axes 6a and 7 cross each other perpendicularly as illustrated in FIG. 7.

In the present example, the display element (H)20 is so arranged that a gap between the substrates 13 and 14, that is, a thickness of the dielectric material layer 3 between the substrates 1 and 2 on which the electrodes 4 and 5 are formed, is 1.3 μm. Further, the display element (H)20 is so arranged that a medium to be sealed between the substrates 13 and 14 in order to form the dielectric material layer 3 is a negative type liquid crystalline mixture 2 (e.g., negative type liquid crystalline mixture) including a compound 2-1, and a compound 2-2, in lieu of the negative type liquid crystalline mixture (1). The compound 2-1 is represented by Structural Formula (4):

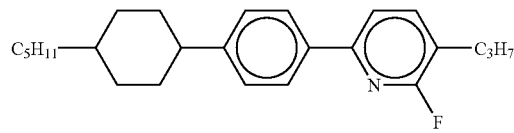

(4)

The compound 2-2 is represented by Structural Formula (5):

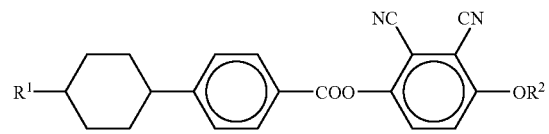

(5)

In Structural Formula (5), $R^1$ and $R^2$ are independently an alkyl group having a carbon number of 1 to 7.

In the present example, refractive index anisotropy Δn of the compound of Formula (4) in a nematic phase is 0.155 (measurement was carried out with wavelength of 550 nm at a temperature of 25° (=0.89 $T_{ni}$)). The dielectric anisotropy Δε of the compound of Formula (4) in a nematic phase is −4.0 (measurement was carried out with frequency of 1 kHz at a temperature of 25° (=0.89 $T_{ni}$)). Under the same conditions, the dielectric anisotropy Δε of the compound of Formula (5) in the nematic phase is −14.0. Under the same conditions, the refractive index anisotropy Δn of the negative type liquid crystalline mixture (2) in a nematic phase is 0.14, and the dielectric anisotropy Δε of thereof in the nematic phase is −14. That is, in the present example, the negative type liquid crystalline mixture (2) is used, the negative type liquid crystalline mixture (2) prepared by mixing the compounds respectively represented by Formulae (4) and (5) in such a manner that the refractive index anisotropy Δn of the negative type liquid crystalline mixture (2) in the nematic phase is 0.14, and the dielectric anisotropy Δε of thereof in the nematic phase is −14. The nematic-isotropic phase transition temperature ($T_{ni}$) of the negative type liquid crystalline mixture (2) is 62° C.

The measurement of the refractive index anisotropy Δn (Δn=ne−no, where "ne" is a refractive index (extraordinary light refractive index) of a molecules along its major axis, and "no" is a refractive index (ordinary light refractive index) of the molecules along its minor axis) was carried out by using an Abbe refractometer (made by ATAGO Co., Ltd. "4T"). Moreover, the dielectric anisotropy Δε (Δε=εe−εo where εe is a dielectric constant of a molecules along its major axis, and εo is a dielectric constant of the molecules along its minor axis) was carried out by using an impedance analyzer (made by Toyo Corporation "SI1260 (product name)").

Moreover, in the present example, chiral agent "S811" (product name; made by MercK Ltd.) is used as a chiral agent in lieu of "ZLI-4572" (product name; made by Merck Ltd.). The chiral agent "S811" is represented by the following structural Formula (6):

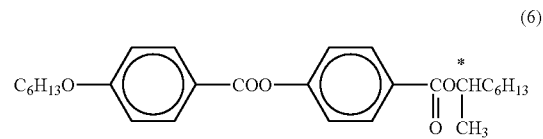

(6)

That is, in the present example, in lieu of the chiral-agent-added liquid crystal material (1), the dielectric material (dielectric liquid) that constitutes the dielectric material layer (3) is a chiral-agent-added liquid crystal material (2) prepared by adding the chiral agent "S811" into the negative type liquid crystalline mixture (2). In Formula (6), "*C" is an asymmetric carbon atom (chiral center).

The present example is illustrated with three differing scenarios, each scenario having a different ratio of the chiral agent utilization. The chiral agent "S811" is added in such an amount that a ratio of the chiral agent "S811" is (for the three respective scenarios) either 8 wt %, 15 wt %, or 30 wt % with respect to a sum of the negative type liquid crystalline mixture (2) and the chiral agent "S811". Hereinafter, the chiral-agent-added liquid crystal materials respectively having chiral agent content of 8 wt %, 15 wt %, and 30 wt % are referred to as chiral-agent-added liquid crystal material (2), chiral-agent-added liquid crystal material (3), and chiral-agent-added liquid crystal material (4).

Measurement showed that the nematic-isotropic phase transition temperatures ($T_{ni}$) of the chiral-agent-added liquid crystal materials (2) to (4) containing the chiral agent "S811" and the negative type liquid crystalline mixture (2) were 55.6° C., 51° C., and 38° C., respectively.

As mentioned above, the nematic-isotropic phase transition temperature ($T_{ni}$) of the negative liquid crystalline mixture (2) was 62° C. Thus, it is hypothesized that the addition of the chiral agent "S811" caused a phenomenon like depression of the freezing point, thereby lowering the nematic-isotropic phase transition temperature ($T_{ni}$).

By a helical twist power of the chiral agent, liquid crystal molecules (molecules 11) together that constitute the liquid crystalline material, are bonded to form a cholesteric phase (cholesteric liquid crystal phase (chiral nematic liquid crystal phase) having a twist (helical) structure in which the liquid crystal molecules (molecules 11) are in a helical orientation, that is, are aligned in such a manner that their angle of molecular major axes are twisted along the normal direction of the substrates.

The display element (H)20 according to the present example is such that the dielectric material layer 3 is in the cholesteric liquid phase at temperatures equal to or less than $T_{ni}$ (38° C.).

As used herein, the terms "twist amount", "twist pitch", "chiral pitch" and "natural chiral twist", and derivatives or variations thereof, are employed interchangeably, and sometimes abbreviated as "(p)". A spontaneous twist amount of the chiral-agent-added liquid crystal materials (2) to (4) were determined by extrapolating or estimating natural chiral pitches (p) of the chiral-agent-added liquid crystal materials (2) to (4) by a so-called wedge cell method. In the wedge cell method, the chiral-agent-added liquid crystal materials (2) to (4) are added into a wedge cell and the natural chiral pitch (p) is found by estimating or extrapolating. In this way, it was determined that p=0.78 μm for the chiral-agent-added liquid crystal material (2), p=0.42 μm for the chiral-agent-added liquid crystal material (3), and p=0.21 μm for the chiral-agent-added liquid crystal material (4). According to CIE (Commission Internationale de l'Eclairage), the established wavelength invisible for human eyes is 380 nm or less. Thus, from the above results, chiral pitches of the chiral-agent-added liquid crystal materials (2) and (3) are within the wavelength of the visible light, whereas a chiral pitch of the chiral-agent-added liquid crystal material (4) is less than the wavelength of the visible light.

It is a general knowledge that the chiral pitch (p) and the chiral concentration (c) the relationship expressed by relational expression (I):

$$P = 1/kc \quad (I),$$

where k is a proportional constant which indicates a HTP (Helical Twist Power) of the chiral agent.

From the relational expression (I), it is clear that the chiral pitch is shorter as the amount of the chiral agent added is increased. The value of k is not only inherent to the chiral agent (e.g., it is different depending on kinds of the chiral agent) but also depends on the liquid crystal material (host liquid crystal material) to which the chiral agent is added.

In order to quantitatively evaluate electro-optical properties of the display element (H)20, voltage-transmittance (Hereinafter, V-Tr) characteristics were measured. The following cells were measured: cell (1) (transparent flat electrode cell) which was a display element (H)20 prepared by using the chiral-agent-added liquid crystal material (4) prepared by adding the chiral agent "S811" into the negative type liquid crystalline mixture (2) in such a manner that a ratio (chiral agent content) of the chiral agent S811 was 30 wt % in the chiral-agent-added liquid crystal material (4); cell (2) which was a display element identical with cell (1) except that the chiral-agent-added liquid crystal material (4) having the chiral agent content of 15 wt % was used; and cell (3) (comparative cell (1)) which was a display element identical with cell (1) except that no chiral agent was added therein.

Figure 9:
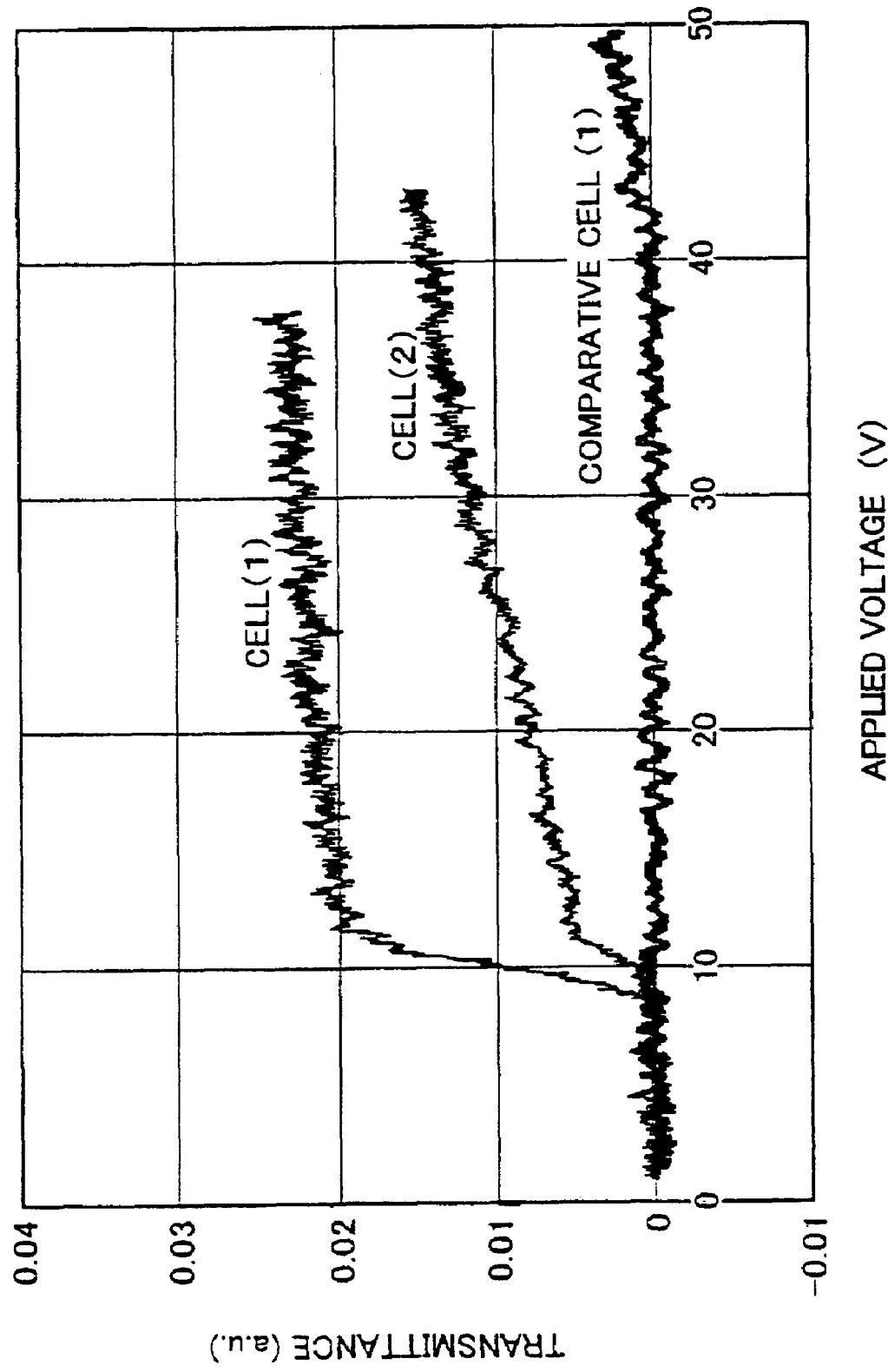
FIG. 9 is a graph illustrating plots of measured voltage-transmittance characteristics of cells (1) and (2) and a comparative cell (1).

The voltage-transmittance characteristics (V-Tr characteristics) of these cells were measured by applying an electric field (voltage) between the electrodes 4 and 5 in the cells kept at a temperature $T_e$ ($T_e=T_{ni}+0.2K$, $\Delta T_e=T_e-T_{ni}=0.2K$) by an externally provided heating device. The temperature $T_e$ was slightly higher than the nematic-isotropic phase transition temperature ($T_{ni}$). Results of the measurement are plotted in FIG. 9. In FIG. 9, the vertical axis is transmittance (arbitrary unit (a.u.)) and the horizontal axis is an applied voltage (V).

For the comparative cell (1) in which no chiral agent was added, FIG. 9 shows by a V-Tr curve (a curve plotted according to the V-Tr characteristic) that transmittance did not increase with applied voltages being less than 40V.

FIG. 9 further shows that for cell (2) (in which the chiral agent content for the chiral agent "S811" was 15 wt %) the transmittance attained was not as high as in the cell (1) (in which the chiral agent content was 30 wt %). However, for cell (2) the V-Tr curve started to raise soon after 10V. In the cell (1), the V-Tr curve started to raise steeply just before 10V, and reached its maximum transmittance around 20V. Thus, high light utilization efficiency and bright display were also attained in the cell (1), which advantageously could be driven with low voltage.

According to relational expression (I) set forth above, the chiral-agent-added liquid crystal material (4) having the chiral agent content of 30 wt % (that is, the chiral agent-added liquid crystal material (4) used for the cell (1)) had the natural chiral pitch (p) of 0.21 μm, which was smaller than the wavelength of visible light. Moreover, the chiral-agent-added liquid crystal material (3) having the chiral agent content of 15 wt % (that is, the chiral agent-added liquid crystal material (3) used for the cell (2)) had the natural chiral pitch (p) of 0.42 μm. In cell (2), the natural chiral pitch was within the wavelength range of visible light (that is, the pitches of the chiral agent-added liquid crystal materials (3) and (4) were in the wavelength range of visible light or smaller than the wavelength of visible light.

On the other hand, the liquid crystal material in which no chiral agent was added (that is, the comparative liquid crystal material used for the comparative cell (1)) had an unlimited natural chiral pitch (p) (=∞), which is larger than the wavelength of visible light.

The above results show that it is preferable, when driving a display element with a lower voltage and for attaining higher transmittance, that the twist amount of the chiral-agent-added liquid crystal material (e.g., the pitch (natural chiral pitch (p)) of the twist) be in the visible light wavelength range, or smaller than the visible light wavelength range.

If the pitch (natural chiral pitch (p)) of the twist is in the visible light wavelength range or less, the incident light is rotated due to the one-direction twist by the spontaneous twist direction, which occurs in the medium due to the chiral agent by the electric field application. The rotation of the incident light makes it possible to output the light efficiently. As a result, it is possible to attain the maximum transmittance with low voltage. Thus, it becomes possible to realize the display element (H)20 which can be driven by a low driving voltage and which is excellent in light utilization efficiency. In order to attain the rotation of polarization planes by using an optically active material such as the chiral-agent-added liquid crystal material, it is preferable that the one-direction chiral twist (natural chiral pitch (p)) satisfy the above conditions.

If the natural chiral pitch (p) of the chiral-agent-added liquid crystal material is in the wavelength range (visible light wavelength range) of visible light or less than the wavelength of visible light, the short-distance intermolecular effect (short-range order) can be caused among the molecules 11 by efficiently working the helical twist power of the chiral agent on the molecules 11 (liquid crystal molecules) in the medium. If so, it is possible to cause a blue phase in the medium, as later described.

Therefore, it is possible to control the twist pitch to be within the visible light wavelength range, or less than the visible light wavelength range, by controlling the ratio of the chiral agent added to the liquid crystalline medium. Further, with this arrangement, the molecules 11 in the medium (that are optically isotropic when no electric field is applied) can be caused to respond as small agglomerations (clusters 12) of the molecules 11 when the electric field is applied. Therefore, with this arrangement, the optical anisotropy can occur in a wider temperature range even though it can occur in a very narrow temperature range conventionally.

In view of the properties of the display element (H)20, it is preferable that the twist pitch be as short as possible. However, as described above, if an excess amount of the chiral agent were added, a problem results in that the liquid crystallinity of dielectric material layer 3 deteriorates as a whole, in the case where the chiral-agent-added liquid crystal material is used as the medium (that is, in the case where the chiral agent is added into the liquid crystalline material). The lack of the liquid crystallinity results in the electric field application causing lower occurrence frequency of magnitude of optical anisotropy. This deteriorates the function of the display element. Therefore, in order to allow the display element to function suitably as a display element, it is necessary that the dielectric material layer 3 have at least the liquid crystalline property. According to this, the upper limit of the chiral agent content is determined. The ratio of the liquid crystalline material in the dielectric material layer 3 is preferably 20 wt % or more. If the ratio of the liquid crystalline material is less than 20 wt %, sufficient electro-optical effect may not be attained. The upper limit of the chiral agent content is about 80 wt %.

The upper limit of the concentration (chiral agent content) of the chiral agent (that is, lower limit of the twist pitch) is applied only in the case where the chiral agent is added to the liquid crystalline medium, as described above. When no additive such as the chiral agent is added and the medium is chiral but contains only one chiral configuration (R configuration or S configuration), the upper limit of the chiral agent content (lower limit of the twist pitch) is not applied.

Figure 10:
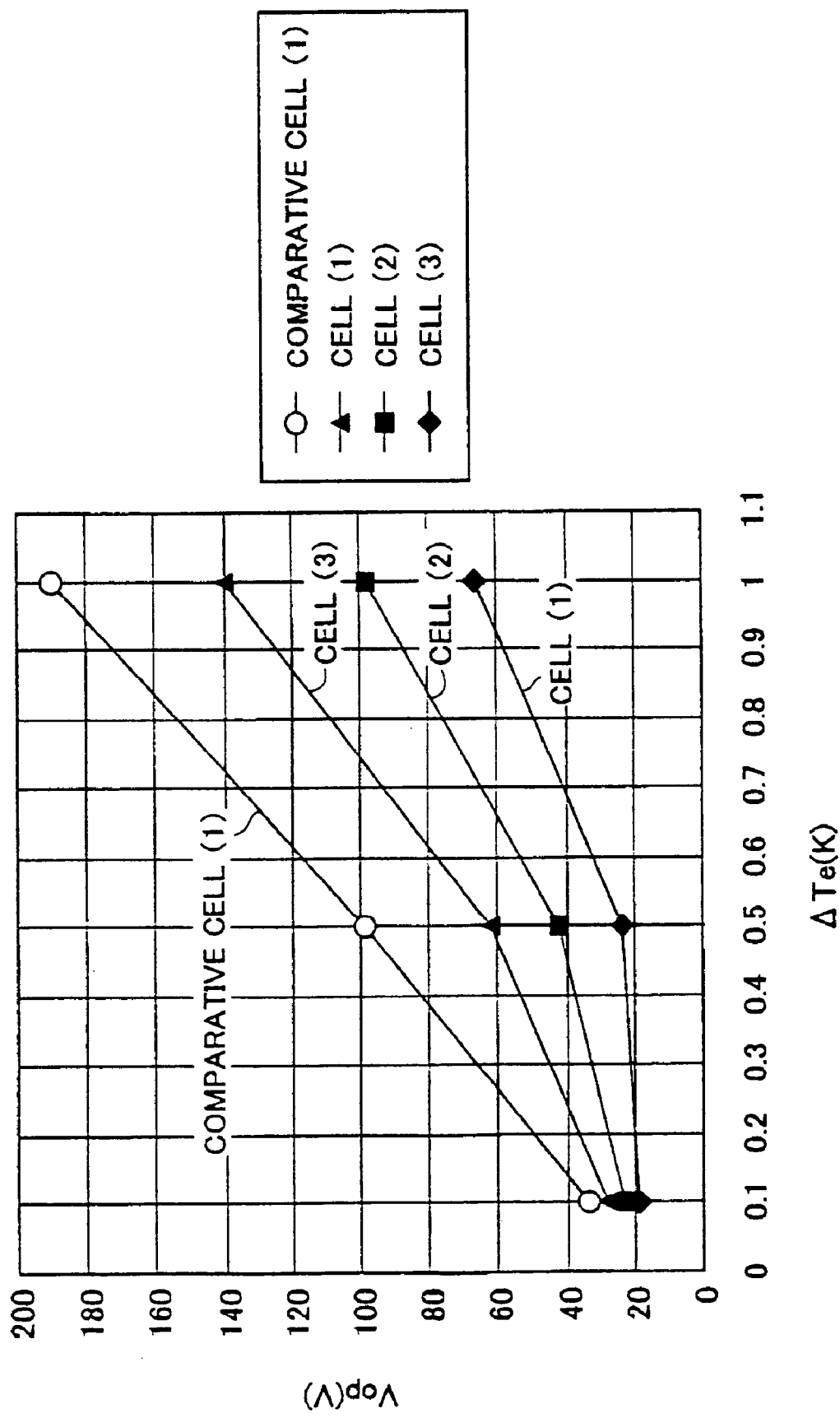
FIG. 10 is a graph illustrating a relationship between temperatures ΔTe and an applied voltage Vop, the temperature ΔTe being temperature changes from a nematic-isotropic phase transition temperature in the cells (1) and (2), and the comparative cell (1), and a cell (3) which is identical with the cells (1) and (2) except its chiral agent content, and the driving voltage estimated from the voltage-transmittance characteristics.

In order to evaluate temperature characteristics of display elements having the chiral addition concentrations, the V-Tr characteristics of the cells (1), (2) and (3), and the comparative cell (1) were measured. The measurements were performed using an externally provided heater and keeping the cells at temperatures $T_e$ ($t_e = T_{ni} + \Delta T$) based on the respective nematic-isotropic phase transition temperatures ($T_{ni}$) of the dielectric materials (liquid crystal materials) sealed in each cell. $T_{ni}$ of Cell (1) was 38° C.; $T_{ni}$ of the cell (2) was 51° C.; $T_{ni}$ of the cell (3) was 55.6° C.; and, $T_{ni}$ of the comparative cell (1) was 62° C. Cell (3) was identical with cells (1) and (2), except that cell (3) was prepared by using the chiral-agent-added liquid crystal material (2) (comprising the chiral agent "S811" by a 8 wt % chiral agent content). From data thus obtained, driving or operating voltages Vop were estimated. The driving voltage Vop is that which attains 90% transmittance with respect to the maximum transmittance. FIG. 10 shows a plot of a relationship between the Vop and $\Delta T_e$ beginning at the $T_{ni}$ point for each cell.

In FIG. 10 the vertical axis is Vop(V) and the horizontal axis is $\Delta T_e$(K). Further, in FIG. 10 the symbol "♦" represents temperature dependency of the driving voltage of cell (1); "■" represents that of cell (2); "▲" represents that of cell (3); and "○" represents that of the comparative cell (1). The temperature dependency of the driving voltage has been estimated respectively from the V-Tr characteristics of each cell.

As clearly seen in the results illustrated in FIG. 10, no temperature range in which the driving voltage was flat existed for comparative cell (1) (the cell in which no chiral agent was added). On the other hand, the driving voltage was substantially flat in the temperature range from $T_{ni}$ (38° C.) to about $T_{ni}$+0.5K in cell (1) (in which the chiral agent content was 30 wt %). In cell (3) (in which the chiral agent content was 8 wt %), there was no temperature range in which the driving voltage was essentially completely flat. However, compared with comparative cell (1), the temperature dependency of the driving voltage is less (the plotted line inclines more gently or is less steep, and thus closer to being flat, with respect to $\Delta T_e$). From this result, it was found that the chiral agent content of at least 8 wt % is necessary to attain a gentle or dampened temperature dependency of the driving voltage. The chiral agent content of 8 wt % corresponds to a 0.78 μm pitch, which is about the upper limit of the wavelength of visible light.

From FIG. 10 (illustrating the relationship between the temperature change $\Delta T_e$ from $T_{ni}$, and the applied voltage Vop), it is preferred that the lower limit of the chiral agent content be 8 wt % in order to attain a smaller temperature dependency of the Vop (the increase of $\Delta T_e$ makes a smaller change of the Vop), and a natural chiral pitch within the wavelength range of visible light (the visible light wavelength range) or less than the wavelength of visible light in the combination use of the host liquid crystal and the chiral agent in the present embodiment. Moreover, the 30 wt % chiral agent content is a concentration at or above which there is a temperature range in which the Vop is substantially constant at the temperature increase $\Delta T_e$ in FIG. 10.

That is, the results in FIGS. 9 and 10 show that (according to the present example) a wider operating temperature range is attained by adding the chiral agent into the medium in a large amount, preferably by 8 wt % or more (e.g., a chiral agent content of 8 wt % or more). In other words, a wider operating temperature range is attained by having the twist pitch (natural chiral pitch (p)) of the medium be equal to or smaller than the wavelength of visible light (e.g., within the visible light wavelength range or less than the visible light wavelength range). It is more preferable that the chiral agent be added into the medium by 30 wt % or more, because chiral agent content of 30 wt % or more attains reduction of the driving voltage and more efficient light utilization as well as the wider operating temperature range, thereby making it possible to change the optical anisotropy efficiently by and according to the electric field application.

This implies that by addition of the chiral agent, a region in which the helical twist power of the chiral agent could be effective (cluster 12) was formed in the optically isotropic medium when the electric field was applied, as in the illustration of FIG. 8. It is hypothesized that the clusters 12 are relatively stable against the temperature increase, and their existence leads to the wider temperature range in which the optical anisotropy can occur. Moreover, it was confirmed that the temperature range in which the driving voltage was flat could be further widened by adding more amount of the chiral agent in the medium.

As described above, in the combination use of the chiral agent "S811" of the present example of the negative type liquid crystalline mixture (2), the chiral agent content is preferably 8 wt % or more, and more preferably 30 wt % or more, in order to attain a smaller temperature dependency of the driving voltage. When expressed in terms of the twist amount of the chiral-agent-added liquid crystal material, the twist pitch need be within the visible light wavelength range or less than the wavelength of visible light, in order to attain a smaller temperature dependency of the driving voltage.

It should be noticed that the chiral agent content is not a compulsory factor, because the types of chiral agent and the types of the host liquid crystal used require different chiral agent content. In order to realize a display element in which the lower-voltage driving, high transmittance, and wider temperature range are attained, a more important factor is how much spontaneous twist amount (chiral pitch) the chiral-agent-added liquid crystal material has. A display element in which the lower-voltage driving, high transmittance, and wider temperature range are attained is realized by providing or having the spontaneous twist amount (chiral pitch) within the visible light wavelength range or less than the wavelength of visible light.

The chiral agent forms the twisted structure of the adjacent liquid crystal molecules (e.g., of the adjacent molecules 11 of the medium of the dielectric material layer 3. This lowers the energy of the intermolecular effect between the molecules 11 in the medium and thus causes the medium to spontaneously take the twisted structure, thereby stabilizing this twisted structure.

Figure 11:
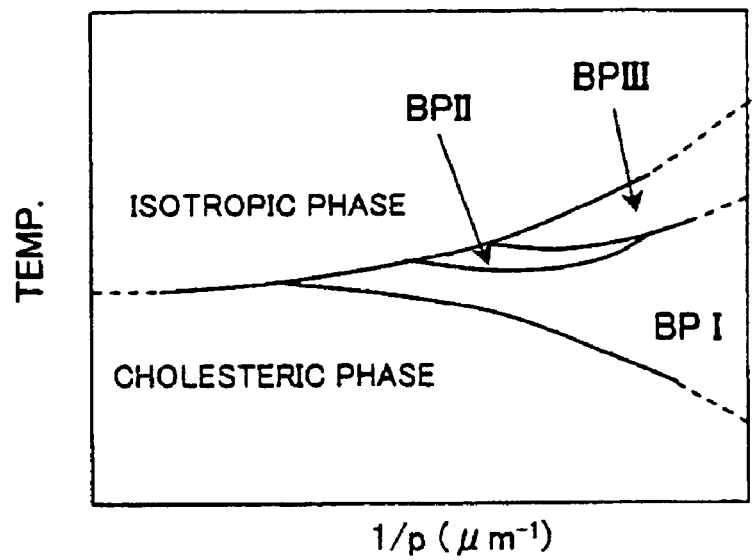
FIG. 11 is a view for explaining blue phase.

Some liquid crystal material in which a large amount of chiral agent is added shows a blue phase (BP phase), as described, e.g., by S. Chandrasekhar, "The Physics of Liquid Crystal", published by YOSHIOKA SHOTEN, 1995, p. 330, 2nd edition, translated by Hatsuo KIMURA and Mamoru YAMASHITA. As illustrated in FIG. 11, the blue phase (BPI, BPII, and BPIII) occurs as a phase between the isotropic phase and the cholesteric phase. The chiral agent significantly contributes to the occurrence of the blue phase. When the natural chiral pitch (p) is reduced to be at or lower than a certain critical pitch, the blue phase occurs. Despite numerous academic studies on the blue phase, much is still unknown about the blue phase. Moreover, it has been pointed out that there are "phases" within the blue phase. The "phases" within the blue phase are referred to as "BPI", "BPII", and "BPIII" (in increasing order of temperature).

Figure 12:
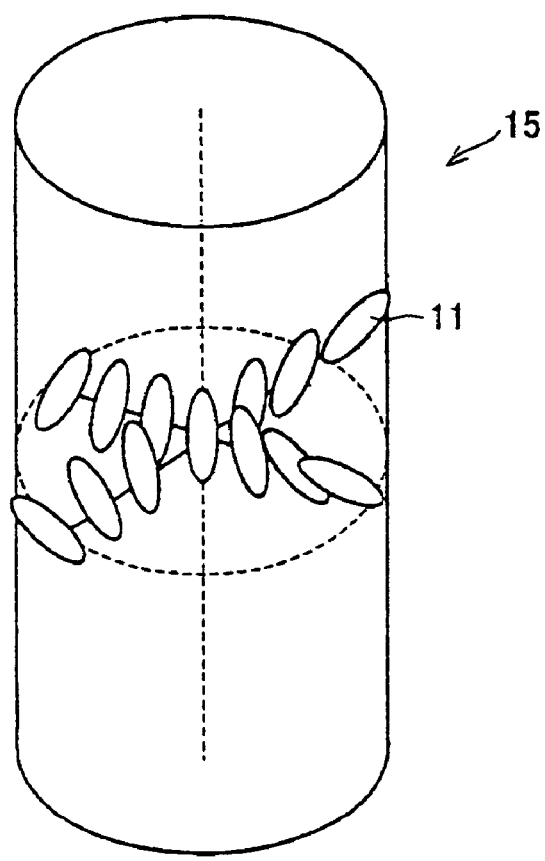
FIG. 12 is a view schematically illustrating a DTC (Double Twist Cylinder) structure of the blue phase.

The blue phase has a cylinder-like structure 15 (cylinder) as illustrated in FIG. 12. This cylinder-like structure 15 is referred to as DTC (Double twist cylinder structure) structure. The helical twist power of the chiral agent works on the molecules 11 (e.g., liquid crystal molecules) in the vicinity thereof, so as to cause the molecules 11 to be in the cylinder-like structure 15 in a region in which the helical twist power can work on the molecules 11. The cylinder-like structure 15 is formed as a result of antagonism or tension between the helical twist power of the chiral agent and the continuous elastic property of the molecules 11 which promotes the molecules 11 to continuously orientate. The cylinder-like structure is comparatively stable against external stimulus such as temperature and the like.

Figure 13:
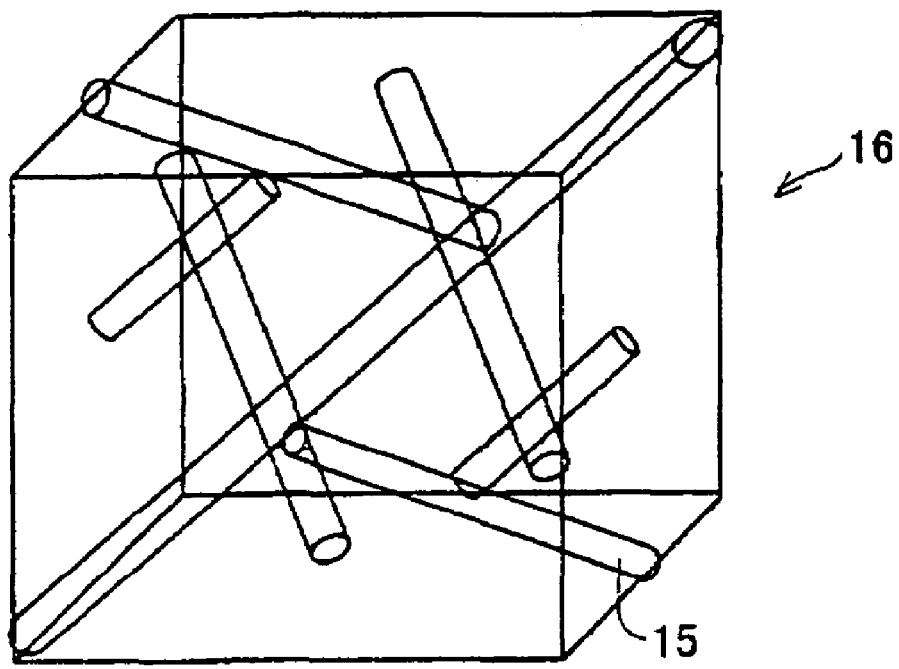
FIG. 13 is a view illustrating a body-centered cubic structure of the blue phase.

The helical twist power of the chiral agent does not extend outside of the cylinder-like structure 15. Outside of the cylinder-like structure and in a space between these cylinders, an orientational defect (disclination) occurs. Moreover, it has been determined by X-ray analysis or the like that the cylinder-like structure 15 (cylinder) forms a body-centered cubic structure 16 as illustrated in FIG. 13, or a 3-dimentional periodical structure such as face-centered cubic structure and the like.

The display element (H)20 according to the present embodiment has not been analyzed in terms of its phase structure. However, there is a possibility that the medium constituting the dielectric material layer 3 in the display element 20 shows the aforementioned blue phase. The blue phase is a phase that occurs in a certain temperature range and that shows a constant optical characteristic in that temperature range (for example, a threshold is constant, a voltage to attain the maximum transmittance is constant, or a similar such property is constant in the temperature range).

In the display element 20 according to the present embodiment, the medium may be in the blue phase as long as the optical characteristics is attained in the wider temperature range. Thus, the blue phase may be the cause to give the medium the wider temperature range in which the medium has the constant optical characteristic. Further, in the present embodiment, the blue phase may be a cholesteric blue phase represented by the chiral nematic phase (cholesteric phase), or a smectic blue phase represented by the smectic blue phase. Further, the constant optical characteristics may be originated by the presence of the clusters 12 caused by the addition of the large amount of chiral agent.

That is, the display element 20 may be so arranged that the dielectric material constituting the dielectric material layer 3 includes a medium that shows a blue phase (for example, the cholesteric blue phase or smectic blue phase), i.e., a medium that shows the blue phase by addition of the chiral agent. In other words, the medium constituting the dielectric material may include a medium that shows the blue phase, or be the medium that shows the blue phase (that is, be constituted of molecules that show the blue phase).

The cholesteric blue phase is a phase that occurs, by temperature increase, in a temperature range higher than a temperature range in which the chiral nematic phase occurs. The cholesteric blue phase is optically isotropic when no electric field is applied thereon, but is optically anisotropic when the electric field is applied.

The cholesteric blue phase occurs, for example, in a material system (dielectric material) containing a liquid crystal material and a chiral agent, the liquid crystal material containing liquid crystal compounds represented by structural formulae (7), (8), (9), (10), and (11) respectively comprising 45 wt %, 16 wt %, 11 wt %, 16 wt %, and 13 wt % of the material system, and the chiral agent being represented by Structural Formula (12) and comprising 42.5 wt % of the material system. In structural Formula (12), "*C" is an asymmetric carbon atom (chiral center). An example of an appropriate liquid crystal material is a nematic liquid crystal product known as "E8" (made by BDH (British Drug House); an example of a suitable chiral agent is a product known as "CB15" which is made by Merck Ltd.

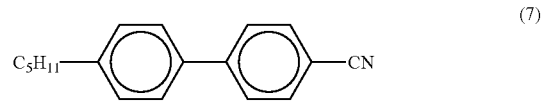

(7)

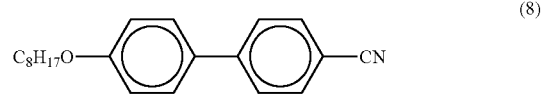

(8)

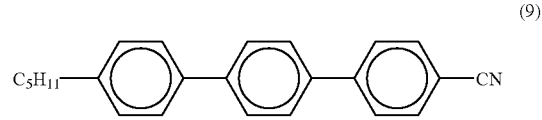

(9)

-continued

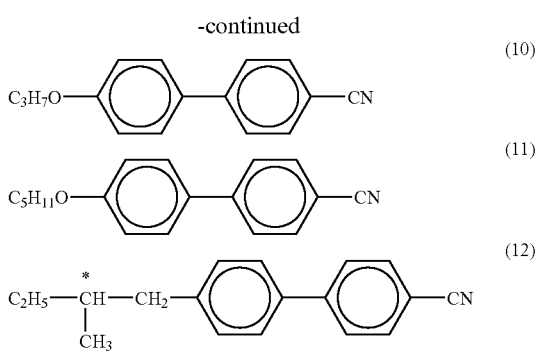

A chiral pitch or twist pitch of the medium that shows the cholesteric blue phase (e.g., "E8" in which the helical structure is introduced by the chiral agent) is 0.5 μm. That is, the chiral pitch or the twist pitch is within the visible light wavelength range.

In investigating why light can be outputted from the display element (H)20 in the manner described herein, the inventors reached the conclusion explained below in conjunction with FIG. 14. In understanding the conclusion, it is helpful to know that the liquid crystal materials or the like (such as the dielectric material (medium) of the display element (H)20) in which the chiral agent is added in a large amount are referred to as "optically active materials" (see, for example, "Dictionary of Physics" published by BAIFU-KAN, 1992, page 631). Examples of the optically active materials include organic compounds containing an asymmetric carbon atom, biopolymers having a helical structure, cholesteric liquid crystals, and the like.

Figure 14:
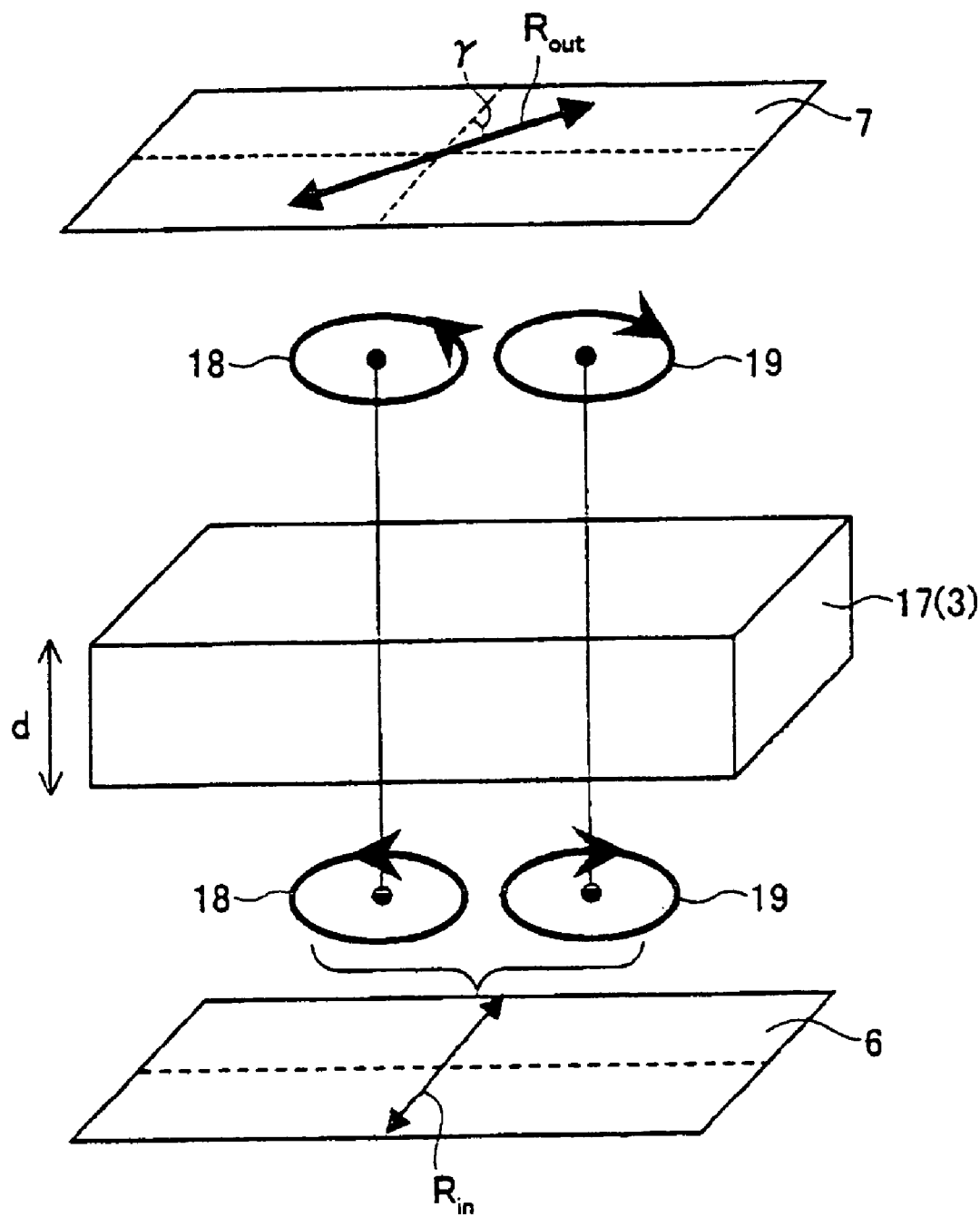
FIG. 14 is a view for explaining mechanism of optical activity.

By way of explanation of the conclusion, consider a case where linearly polarized light is introduced into a material layer having a thickness, e.g., cell thickness, d as illustrated in FIG. 14. The material layer of FIG. 14 comprises an optically active material layer 17 having the thickness d. The optically active material layer 17 comprises an optically active material(s) such as those as mentioned above. The linearly polarized light can be divided into leftward circularly polarized light 18 and rightward circularly polarized light 19. The leftward circularly polarized light 18 and rightward circularly polarized light 19 are identical in phase and amplitude but different in direction of rotation. In FIG. 14, Rin is a direction in which the linearly polarized light enters, and Rout is a direction in which the linearly polarized light is emitted. When the circularly polarized light 18 and 19 enter the optically active material layer 17, the optically active material shows different refractive indexes for the leftward and rightward circularly polarized light 18 and 19 due to its inherent crystalline structure and helical structure. Specifically, the optically active material shows a refractive index n+ for the rightward circularly polarized light 19, and a refractive index n− for the leftward circularly polarized light 18. Because of this, when the circularly polarized light 18 and 19 is emitted out of the optically active material layer 17, the polarization direction is rotated at an angle γ determined by (a) a difference between the refractive index n+ of the rightward circularly polarized light 19 and the refractive index n+ of the leftward circularly polarized light 18, and (b) the thickness (d) of the optically active material layer 17. As a result, the phase of the circularly polarized light 18 and 19 are retarded from each other. By combining the leftward and rightward circularly polarized light 18 and 19 thus emitted, linearly polarized light is emitted whose polarization direction is rotated at the angle γ compared with the polarization direction Rin of the linearly polarized light that enters the optically active material layer 17. This allows the light to pass through the polarizers 6 and 7 arranged in a perpendicular configuration (crossed nicols configuration) as in the display element 20. It is therefore believed that these observations explain why light emission from the display element 20 is as described above.

In the display element (H)20, the application of the electric field between the electrodes 4 and 5 causes the short-distance intermolecular effect, whereby the clusters occur, which has a uniform one-twist direction (either rightward or leftward; i.e., either dextrorotatory or levorotatory) helical structure (e.g., twisted structure) in which only one chiral configuration (R configuration or S configuration) is contained. This causes optical activity, also known as, e.g., optical rotational power. That is, when the optical anisotropy occurs in the display element 20, the molecules 11 are oriented in the helical structure which is either dextrorotatory or levorotatory, that is, in which only one chiral configuration (R configuration or S configuration) is contained.

Therefore, the display element 20 has a constant optical activity even if the clusters 12 have no directional correlation between themselves. Thus, the display element 20 has a large optical activity as a whole. Because of this, the voltage to attain the maximum transmittance is much lower in the present display element 20 than in the conventional display element.

In the case described above, addition of the chiral agent into the medium ensures that the molecules 11 in the medium are oriented in the helical structure which has only one chiral configuration (R configuration or S configuration). In other words, the chiral agent causes the adjacent molecules 11 to form the twisted structure as described above. The twisted structure is spontaneously formed in the medium in which the chiral agent is added. This lowers the intermolecular effect between the molecules 11 and stabilizes the twisted structure.

In the present embodiment, other examples of the chiral agent include the products known as "MLC-6248", "CN", "CB15", all of which are made by Merck Ltd, or any comparable agent, in addition to the "ZLI-4572", "S811", and "CB15" products mentioned above. However, the present invention is not limited to these or any other specific chiral agents.

In the case where the chiral-agent-added liquid crystal material is used as the dielectric material, the concentration of the chiral agent in the chiral-agent-added liquid crystal material is not particularly limited and may be determined according to various factors including: the kind of the chiral agent which is to be used, the arrangement of the display element, designs, and other similar factors, provided that the structure of the medium in the chiral-agent-added liquid crystal material can be stabilized with the chiral agent of that concentration. As described above, however, it is preferable that the twist amount in the chiral-agent-added liquid crystal material (e.g., the twist pitch of the medium in which the chiral agent is added) be within or less than the visible light wavelength range. For example, as described above, it is preferable that the chiral agent content be 30 wt % or more, in order that the display element may be able to be driven with a low voltage and may have a high transmittance. It is thereby possible to realize a display device which can be driven with a low voltage for display, and further it is possible to realize display device which has a wide temperature range.

Even though the above explanation has been provided in the context of a system in which a medium having only one chiral configuration is prepared by adding the chiral agent in the medium that acts as a host, aspects of the explanatory system are not constraining or limiting. For example, the teachings hereof are not limited to the arrangement in which the medium containing the chiral agent is sealed between the substrates to form the dielectric material layer 3, even though the display element 20 discussed above is arranged as such. As long as, when the electric field is applied or when no electric field is applied, the molecules 11 are oriented in the twisted chiral structure having only one chiral configuration, any medium may be adopted. For example, the medium for the dielectric material layer 3 may be a medium that is chiral itself and to which no chiral agent is added. That is, the medium to form the dielectric material layer 3 may have the chirality inherently (be chiral itself) or may acquire the chirality by the addition of the chiral agent. The twisted structure having only one chiral configuration may be induced either way.

In case where the medium used is chiral (e.g., chiral material), the medium is optically active, for example, if the dielectric material is or is comprised of the chiral material, or the dielectric material is made of a medium comprising the chiral material. Therefore, in this case, if the dielectric material is as such, the medium itself spontaneously takes the twisted structure and becomes stable. The chiral material having the chirality should be a compound having an asymmetric carbon atom (chiral center) in its molecule.

Moreover, the medium having only one chiral configuration may be, for example, a medium that has no asymmetric carbon atom but has a molecule that allows the medium to have the chirality as a system by anisotropy and packing structure of the molecule. One of examples of such medium is a banana-like shaped or curved liquid crystal. One example of the banana-like shaped liquid crystal is a compound represented by the following structural Formula (13), one example of which is a compound known as PSPIMB made by Clariant KK.

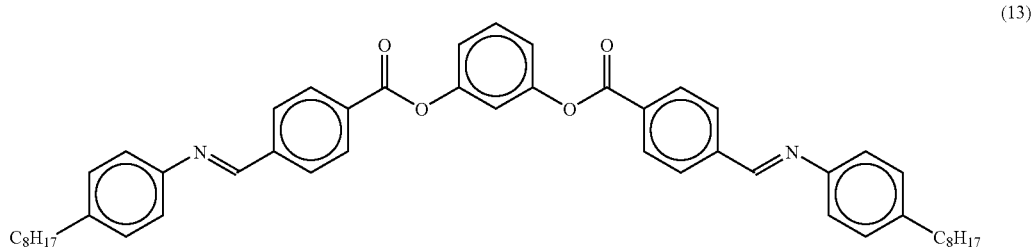

(13)

However, it should be noted that the teachings hereof are not limited to this compound.

In addition, a mixture of "P8PIMB" (15%), a liquid crystal mixture known as "ZLI-2292" made by Merck Ltd. (67.1%), and a chiral dopant (17.9%) (such as a product known as "MLC-6248" by Merck Ltd.) shows a cholesteric blue phase in a temperature range of from 77.2° C. to 82.1° C.

Moreover, the banana-like shaped liquid crystal material may have a curving or binding portion formed from a naphthalene ring, a methylene chain or the like, in lieu of a benzene ring such as phenylene group or the like. Moreover, the curving or binding portion may contain an azo group.

In addition to "P8PIMB", examples of the banana-like shape or curved liquid crystal include three compounds respectively represented by structural Formula (14), structural Formula (15), and structural Formula (16). The compound of structural Formula (14) is also known as a product Azo-80 made by Clariant KK.

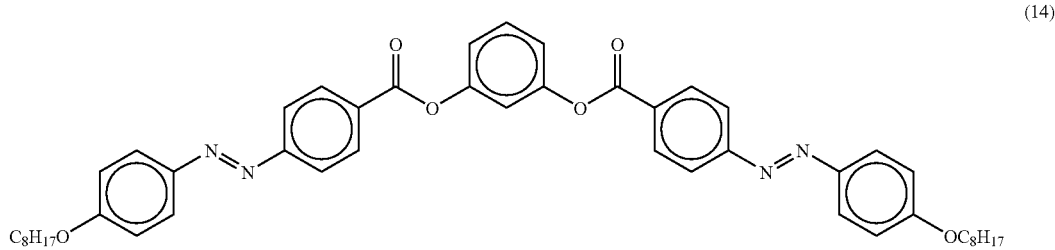

(14)

The structural Formula (15) is also known as a compound "8Am5" made by Clariant KK.

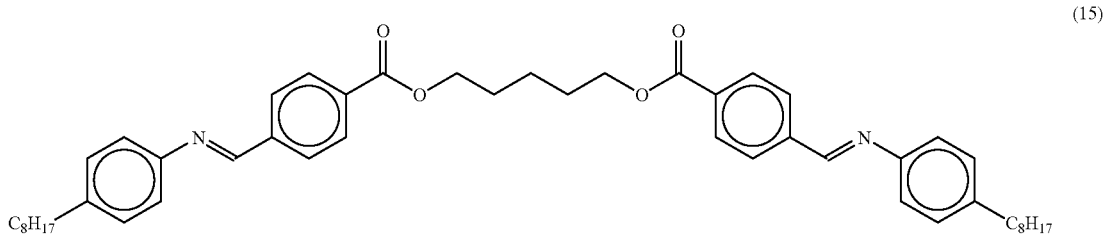

The structural Formula (16) is also known as a compound "14OAm5" made by Clariant KK.

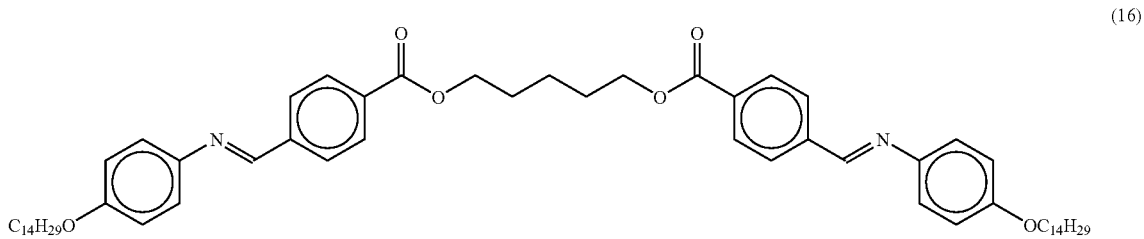

However, it should be noted that the teachings hereof are not limited or confined to any of these particular example compounds.

Moreover, the banana-like or curved shaped liquid crystals are not limited to the compounds (such as those represented by Formulae (13) to (16)) which have symmetrical chemical structures centered at the curving or binding portion. Rather, the banana-like shaped liquid crystals may have an asymmetrical chemical structure at the curving portion. Examples of the banana-like shaped liquid crystals having an asymmetrical structure include a compound represented by the Formula (17) and similar compounds.

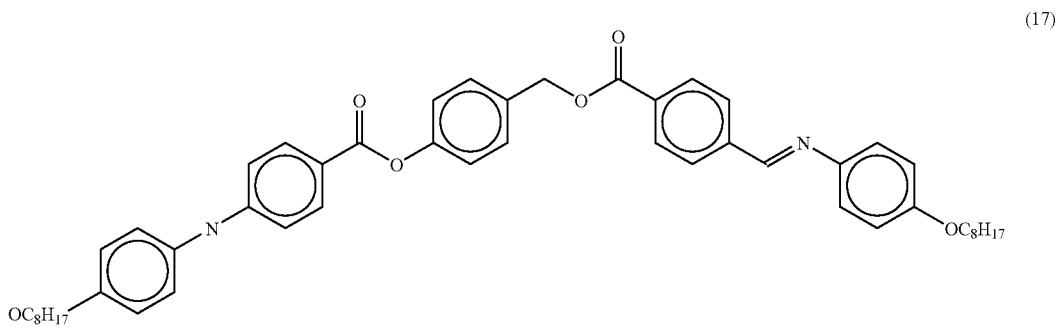

Furthermore, the banana-like or curved shaped liquid crystal is not limited to a compound whose liquid crystal molecule has no asymmetric carbon atom (e.g., chiral carbon), and may have one or more asymmetric carbon atoms. Examples of such banana-like shaped liquid crystal include a compound represented by the Formula (18) and similar compounds.

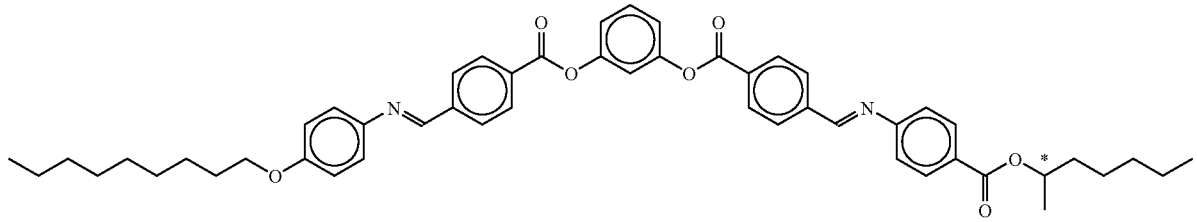

(18)

In Formula (18), "*C" is the asymmetric carbon atom (chiral center).

Moreover, the medium for the dielectric material layer 3 may be a compound (e.g., a liquid crystalline simple substance) that solely shows the liquid crystal property, or a mixture that shows its liquid crystalline property when a plurality of substances are mixed together. Further, the liquid crystalline material may be a mixture of (a) such liquid crystalline simple substance or such liquid crystalline mixture, and (b) a non-liquid crystalline material.

It is preferable that the medium for the dielectric material layer 3 comprise, by 20 wt % or more, the material (medium) that shows the crystalline property. It is more preferable that the medium for the dielectric material layer 3 comprise, by 50 wt % or more, the material (medium) that shows the crystalline property.

Moreover, the medium for the dielectric material layer 3 in the present embodiment is not limited to the medium exemplified above. However, it is preferable that the medium for the dielectric material layer 3 comprise rod-like molecules having a negative dielectric anisotropy. That is, it is preferable that the medium for the dielectric material layer 3 comprise such rod-like molecules that its dielectric constant in the molecular major axial direction is smaller than its dielectric constant in the molecular minor axial direction (e.g., dielectric constant in molecular major axial direction<dielectric constant in molecular minor axial direction). In other words, it is more preferable that the medium for the dielectric material layer 3 be a negative type liquid crystal material (for example, a negative type liquid crystalline compound or a mixture containing a negative type liquid crystalline compound) or be a medium that contains the negative type liquid crystalline compound or the mixture containing the negative type liquid crystalline compound. As used herein, the "negative type liquid crystalline compound" refers to a compound that shows a liquid crystal phase, such as nematic phase, smectic phase, or the like, when kept at low temperatures.

Examples of the medium having the negative dielectric anisotropy includes a mixture of liquid crystalline materials described in Japanese Patent Application publication No. 2001-249363, i.e., 3HPFF, 5HPFF, and 7HPFF. This mixture is referred to herein as negative type liquid crystalline mixture (3)). The "3HPFF" refers to 1,2-difluoro-4-[trans-4-(trans-4-n-propylcyclohexyl) cyclohexyl]benzene. The "5HPFF" refers to 1,2-difluoro-4-[trans-4-(trans-4-n-pentylcyclohexyl) cyclohexyl]benzene. The "7HPFF" refers to 1,2-difluoro-4-[trans-4-(trans-4-n-pentylcyclohexyl) cyclohexyl]benzene.

Moreover, the medium for the dielectric material layer 3 should be a medium in which the magnitude of optical anisotropy thereof is changeable by and according to the electric field application. As long as the magnitude of its optical anisotropy is changeable by and according to the electric field, the medium for the dielectric material layer 3 may be a medium that is substantially optically isotropic when the electric field is applied or when no electric field is applied, and in which optical modulation is induced by electric field application. Moreover, the medium may be a material in which an orientational order parameter of the molecules or the molecular agglomerations (clusters 12) is increased by the electric field application. The orientational order parameter is in the scale equal to or more than the wavelength of visible light, and the increase is with respect to a level of orientational order parameter attained when optical modulation has already occurred, i.e., the orientational order parameter>0 in the scale equal to or more than the wavelength of visible light. Moreover, the medium may be a medium in which the orientational order parameter (e.g., the magnitude of the optical anisotropy) of the molecules 11 is increased in the scale of the wavelength of visible light according to the electric field application, compared with the orientational order parameter (magnitude of the optical anisotropy) attained before the electric field application. For example, the medium may be such a medium that is changed, by the electric field application, from the state in which the medium shows the optical anisotropy (orientational order parameter>0 in the scale equal to or less than the wavelength of visible light), to the state in which the medium shows the optical isotropy (orientational order parameter≈0 in the scale equal to or less than the wavelength of visible light).

The meaning of the wording "be optically isotropic when the electric field is applied or when no electric field is applied" in the present is, as described above, to be optically isotropic at least macroscopically. Specifically, the meaning of the wording as used herein is to be optically isotropic at least in a scale of the wavelength of visible light, or a scale larger than the wavelength of visible light. That is, as used herein, the medium may not have a perfect isotropic phase, as in the cholesteric blue layer, for example. It is known that, when no electric field is applied, the cholesteric blue phase is not a perfect isotropic phase, but has a 3-dimentional periodical structure having a size approximately equivalent to or smaller than the visible light wavelength or smaller.

It is preferable that the display operation be carried out by using a medium (dielectric medium) which becomes optically anisotropic (mainly due to electronic polarization, orientational polarization, or the like) when an electric field is applied. It is especially preferred that the display operation be carried out by using a medium (dielectric medium) whose birefringence is increased by electric field application.

In the display element (H)20 according to the present embodiment, the medium (especially the dielectric medium) may be any material (mixture), provided that the material (mixture) is as follows: (i) the material (mixture) is, for example, optically isotropic when an electric field is applied or when no electric field is applied; (ii) the orientational direction of the molecules 11 in the material (mixture) is changed by the application of the electric field so as to change the magnitude of optical anisotropy of the medium (that is, optical anisotropy of the material (mixture) is changeable by electric field application that changes the orientational direction of the molecules 11 in the medium); and (iii) when the optical anisotropy appears, the molecules 11 are oriented to form the twisted structure having a chiral configuration having only one twist direction. For example, and for the dielectric medium especially, the medium may be a material that shows the Kerr effect, a material that shows the Pockels effect, or other polar molecules.

The change in the refractive index proportionally to the square of the electric field applied is particularly advantageous in that it realizes a fast response speed. In addition to fast response, an essentially unlimited viewing angle is attained in a dielectric material layer 3 made from a medium whose refractive index is changeable proportionally to the square of the electric field (e.g., a medium such as a liquid crystalline medium that shows the Kerr effect). The very fast response speed is attained because the orientational direction of the molecules 11 is changeable by the electric field application, thus the respective molecules 11 (randomly directed) are rotated to change their directions, by controlling localization of electrons in each molecule. The unlimited viewing angle is attained because the molecules 11 which the medium comprises are randomly directed. Thus, according to this arrangement, it is possible to realize a display element capable of high response and having a wide viewing angle. Moreover, in this arrangement, it is possible to attain a significantly lower driving voltage. Thus, this arrangement is highly practical and advantageous.

Moreover, with an arrangement in which the dielectric material layer 3 includes a medium containing polar molecules, the electric field application causes dipolarization of the polar molecules. The dipolarization promotes the orientation of the polar molecules. Thus, it becomes possible to cause the optical anisotropy by using a lower voltage.

The dielectric material is not limited to the medium, but is preferably arranged such that it has an orderly structure (orientational order) equal to or smaller than the wavelength of light when an electric field is applied or when no electric field is applied. With such orderly structure smaller than the wavelength of visible light, the dielectric material is optically isotropic. Thus, by using a dielectric material that has the orderly structure smaller than the wavelength of visible light when the electric field is applied or when no electric field is applied, it is possible to change the display state between when the electric field is applied or when no electric field is applied.

Moreover, the medium for the dielectric material layer 3 may be, for example, a material that has an orderly structure smaller than the wavelength of visible light, and that can have a liquid phase that appears isotropic optically but has a negative dielectric anisotropy. Further, the medium may be a system in which the molecules 11 form agglomerations (molecular agglomerations, clusters 12) in which they are oriented radiately in a size smaller than wavelength of visible light so that the system seems to be optically isotropic. By applying the electric field on such medium (material, system, or the like), micro structures of the molecules 11 or the molecular agglomerations (clusters 12) are distorted thereby inducing the optical modulation.

In general types of, liquid crystal display devices (for example, liquid crystal display devices of TN mode), molecules are initially oriented in one direction and the molecules are rotated (changed in their orientational direction) essentially uniformly by electric field application. On the other hand, in the display element and the display device in which such medium is used, the medium is optically isotropic because the molecules have an order (orderly structure, orientational order) smaller than the scale of the wavelength of visible light in the medium in this state. When the medium is in this state, it can be considered that the molecules are directed in any directions macroscopically, specifically, in a scale of the wavelength of visible light, or in a scale larger than the wavelength of visible light. That is, in the scale of the wavelength of visible light or in the scale larger than the wavelength of visible light, the configuration (orientational conditions) in which the medium is used is equivalent to a state in which the molecules are directed in any direction. The configuration becomes optically anisotropic by the change in the electric field. The change in the electric field distorts the orderly structure smaller than the wavelength scale of visible light. The orientational direction of each molecule is changed by the change in the electric field. That is, the arrangement according to the present embodiment and the general liquid crystal device are different in the initial orientation (orientation at which the optical isotropy is shown) and in the way the magnitude of the optical anisotropy changes according to the orientation, even though in the arrangement according to the present embodiment the orientational direction of each molecule is also changed when the optical anisotropy appears.

The medium may be, for example, a mixture system of 3HPFF, 5HPFF, and 7HPFF. That is, the medium may be, for example, the negative type liquid crystalline mixture (3). This mixture system (the negative type liquid crystalline mixture (3)) has a negative dielectric anisotropy.

As described above, the mixture system of 3HPFF, 5HPFF, and 7HPFF (that is, the negative type liquid crystalline mixture (3)) is transparent because it has an orderly structure smaller than the optical wavelength. That is, the mixture system is optically isotropic when no electric field is applied. Therefore, by arranged the display element 20 according to the present embodiment to adopt this mixture system (negative type liquid crystalline mixture (3)) therein, the display element 20 becomes possible to perform good black display with crossed nicols configuration.

On the other hand, by applying an electric field (voltage) between the electrodes 4 and 5 while keeping the temperature of the mixture system (e.g., negative type liquid crystalline mixture (3)) within the temperature range in which the mixture system shows optical isotropy when no electric field is applied, the structure that shows the optical isotropy is distorted thereby causing the optical anisotropy. That is, the mixture system is optically isotropic when no electric field is applied, but becomes optically anisotropic by electric field application.

The display element having this arrangement, and the display device provided with the display element are capable of performing a good white display because the structure that shows the optical isotropy is distorted by the electric field application, thereby causing birefringence. The birefringence occurs in a constant direction and its magnitude is changeable according to the electric field application. Moreover, a voltage-transmittance curve that represents the relationship between the voltage applied between the electrodes 4 and 5, and the transmittance becomes a stable curve. That is, in the display element having this arrangement, and the display device provided with the display element, it is possible to attain a stable voltage-transmittance curve within the temperature range at which the mixture system is optically isotropic when no electric field (voltage) is applied.

Thus, in the display element having this arrangement, and the display device provided with the display element, temperature control is very easy.

The following explains the difference in terms of display principle between the liquid crystal display elements of conventional display modes and the display element (H)20 according to the present embodiment in which the medium is such that the magnitude of the optical anisotropy of the molecules is changeable by the electric field application (e.g, a medium such as the negative type liquid crystalline mixture (3)).

The following explanation is mainly based on an example in which the display element is a transmissive type of display element and the medium is a medium that is substantially optically isotropic, or preferably optically isotropic when no electric field is applied, and becomes optically anisotropic when the electric field is applied. However, the present invention is not limited to this example.

FIGS. 15(a) to 15(h) are views for explaining the difference in the display principle between the liquid crystal elements of the conventional display modes and the display element (H)20 according to the present embodiment in which the mixture system is used. FIGS. 15(a) to 15(h) schematically illustrate shapes and directions of refractive index ellipsoids under differing field conditions (i.e., when the electric field is applied and when no electric field is applied). FIGS. 15(a) to 15(f) depict the display principles of the TN (Twisted Nematic) mode, VA (Vertical Alignment) mode, IPS (In Plane Switching) mode as the conventional display modes. On the other hand, FIGS. 15(g) and 15(h) depict the display principle of the display element (H)20 according to the present embodiment in which the dielectric material layer 3 includes the negative type liquid crystalline mixture (3) for example. That is, FIGS. 15(a) to 15(h) are cross sectional views for explaining the difference between the display element 20 of the present embodiment and conventional liquid crystal display elements in terms of display principle, by schematically illustrating an average shape and a major axial direction of refractive index ellipsoid in the medium (the shape of the refractive index ellipsoid is indicated by a shape of cross section when no electric field is applied (OFF state) and when the electric field is applied (ON state)). FIGS. 15(a) to 15(h) are respectively a cross sectional view of the display element of the present embodiment when no electric field is applied (OFF state), a cross sectional view of the display element when the electric field is applied (ON state), a cross sectional view of a conventional liquid crystal display element of TN (Twisted Nematic) mode when no electric field is applied, a cross sectional view of the conventional liquid crystal display element of TN mode when the electric field is applied, a cross sectional view of a conventional liquid crystal display element of VA (Vertical Alignment) mode when no electric field is applied, a cross sectional view of the conventional liquid crystal display element of VA mode when the electric field is applied, a cross sectional view of a conventional liquid crystal display element of IPS (In Plane Switching) mode when no electric field is applied, and a cross sectional view of the conventional liquid crystal display element of IPS mode when the electric field is applied.

Refractive index in a material is generally not isotropic and differs directionally (that is, it is anisotropic). The anisotropy of the refractive index is indicated by an ellipsoid (refractive index ellipsoid) represented in an arbitrary orthogonal coordinate system $(X_1, X_2, X_3)$ by the following Equation (II):

$$\sum_{ij}\left(\frac{1}{n_{ij}^2}\right)X_i X_j = 1 \quad (II)$$

$(n_{ji} = n_{ij}, i, j = 1, 2, 3),$ where x is a direction parallel to the surfaces of the substrates (substrate in-plane direction) and rightward/leftward directions of FIGS. 15(a) to 15(h), y is a direction perpendicular to the surface of the substrates, and z is a direction parallel to the surfaces of the substrates and perpendicular to the horizontal direction of FIGS. 15(a) to 15(h) (for example, see YAMAMOTO, Ryoichi, "Organic electro-optical material", National Technical Report, December 1979, vol. 22, No. 6, p 826-834). Equation (II) is rewritten by using the coordinate system $(Y_1, Y_2, Y_3)$ of the major axial direction of the ellipsoid, thereby giving Equation (III):

$$\frac{Y_1^2}{n_1^2} + \frac{Y_2^2}{n_2^2} + \frac{Y_3^3}{n_3^3} = 1 \quad (III)$$

where $n_1$, $n_2$, $n_3$ (hereinafter referred to as nx, ny, nz) are called principal refractive indexes and respectively correspond to half lengths of three axes of the ellipsoid. Assume a light wave traveling from an original or orgin point in a direction perpendicular to a surface of $Y_3=0$. The light wave has polarization components in directions of $Y_1$ and $Y_2$. The respective polarization components have refractive indexes of nx and ny. In general, a plane passing through the original point and perpendicular to the traveling direction of the light wave is the cross section of the refractive index ellipsoid with respect to the light traveling in a certain direction. The major axial direction of the ellipsoid is the polarization component direction of the polarized light of the light wave. The half length of the major axis corresponds to the refractive index of that polarization component direction.

There are differences between the display element (H)20 according to the present embodiment and the conventional liquid crystal display elements in terms of their display principles. The conventional liquid crystal display elements discussed here are TN mode, VA mode, and IPS mode.

As illustrated in FIGS. 15(a) and 15(b), the conventional liquid crystal display element of the TN mode is arranged as follows: a liquid crystal layer 205 is sandwiched between a pair of substrates 201 and 202 that face each other. On the substrates 201 and 202, transparent electrodes (electrodes) 203 and 204 are respectively provided. When no electric field is applied, major axial directions of liquid crystal molecules are in a helical orientation in the liquid crystal layer 205. When the electric field is applied, the major axial directions of the liquid crystal molecules are oriented along an electric field direction. In this case, when no electric field is applied an average refractive index ellipsoid 205a is oriented in such a manner that its major axial direction is parallel to the substrate surface (substrate in-plane direction), as illustrated in FIG. 15(a). When the electric field is applied, the major axial direction is oriented along the substrate normal direction, as illustrated in FIG. 15(b). That is, the refractive index ellipsoid 205a has an ellipsoidal shape regardless of whether the electric field is applied or not. However, the refractive index ellipsoid 205a changes its major axial direction (e.g., its principal axial direction, or the direction in which the refractive index ellipsoid 205a is headed) depending on whether the electric field is applied or not. That is, the refractive index ellipsoid 205a is rotated depending on whether the electric field (voltage) is applied or not. The shape and size of the refractive index ellipsoid 205a is not changed substantially regardless of whether or not the electric field is applied.

As illustrated in FIGS. 15(c) and 15(d), the conventional liquid crystal display element of the VA mode is arranged as follows: a liquid crystal layer 255 is sandwiched between a pair of substrates 251 and 252 that face each other. On the substrates 251 and 252, transparent electrodes (electrodes) 253 and 254 are sandwiched respectively. When no electric field is applied, major axial directions of liquid crystal molecules are oriented substantially perpendicular to a substrate surface. When an electric field is applied, the major axial directions of the liquid crystals' directions are oriented along a direction perpendicular to an electric field. In this case, when no electric field is applied an average refractive index ellipsoid 255a is oriented in such a manner that its major axial direction is along a substrate normal direction, as illustrated in FIG. 15(c). When the electric field is applied, the refractive index ellipsoid 255a is oriented in such a manner that its major axial direction is parallel to the substrate surface (substrate in-plane direction). That is, again in the case of the liquid crystal display element of the VA mode as in the liquid crystal display element of the TN mode, the refractive index ellipsoid 255a has an ellipsoidal shape regardless of whether the electric field is applied or not. However, the refractive index ellipsoid 255a changes its major axial direction depending on whether the electric field is applied or not. That is, the refractive index ellipsoid 255a is rotated depending on whether the electric field is applied or not. The shape and size of the refractive index ellipsoid 255a is not changed substantially regardless of whether or not the electric field is applied.

Moreover, as illustrated in FIGS. 15(e) and 15(f), the liquid crystal display element of the IPS mode is arranged as follows: On a substrate 301, a pair of electrodes 302 and 303 are provided in such a manner that they face each other. A liquid crystal layer is sandwiched between the substrate 301 and a substrate that is not illustrated here. An electric field (voltage) is applied across the liquid crystal layer by using the electrodes 302 and 303, thereby changing orientational directions of liquid crystal molecules (major axial direction of a refractive index ellipsoid 305a) in the liquid crystal layer. In this way, display state is changed between when no electric field is applied and when the electric field is applied. That is, again in the case of the liquid crystal display element of the IPS mode as in the liquid crystal display elements of the TN mode and the VA mode, the refractive index ellipsoid 305a does not change its shape and size (that is, the refractive index ellipsoid 305a is kept as an ellipsoidal shape) depending on whether the electric field is applied (as illustrated in FIG. 5(e)) or not (as illustrated in FIG. 5(f)), whereas the refractive index ellipsoid 305a changes its major axial direction (the refractive index ellipsoid 305a is rotated) depending on whether the electric field is applied or not.

As described above, the conventional liquid crystal display elements are arranged such that the liquid crystal molecules are oriented along a certain direction (typically in one direction) even when no electric field is applied, and that display operation (modulation in transmittance) is carried out by changing the orientational directions of the aligned molecules together at once by applying the voltage. That is, in the conventional liquid crystal display element, display operation is carried out by utilizing rotation (change) of the major axial direction (principal axial direction) of the refractive index ellipsoid, the rotation being caused by electric field application. Even though the major axial direction is changed (rotated), the shape and size of the refractive index ellipsoid are not changed (that is, the refractive index ellipsoid keeps its ellipsoidal shape). Hence, the major axial direction of the refractive index ellipsoid is not limited to perpendicular or parallel direction with respect to the electric field application direction. In other words, the conventional liquid crystal display element is so arranged that the orientational order parameter of the liquid crystal molecules is substantially constant, and that the display operation (modulation in transmittance) is carried out by changing the orientational direction. That is, in the conventional liquid crystal display element, a direction of orientation easy axis is changed by the electric field application, even though the orientational order parameter is substantially kept constant under the electric field application.

In contrast to these conventional display modes, the molecules 11 of the embodiments described herein are directed in many directions when no electric field is applied (the embodiments described herein having, e.g., the display element 20 in which the negative type liquid crystalline mixture (3) (a mixture system of 3HPFF, 5HPFF, and 7HPFF) is used. However, these molecules are of an order smaller than the scale of wavelength of visible light and thus do not cause the optical anisotropy (orientational order parameter≈0 (substantially 0)). Thus, as illustrated in FIG. 15(g), when no electric field is applied, the refractive index ellipsoid has a spherical shape which does not cause the optical anisotropy.

However, as illustrated in FIG. 15(h), when the electric field is applied, the respective molecules (molecules 11) that have negative dielectric anisotropy are oriented along in-plane directions of the substrates (directions parallel to the substrates), thereby changing the orientation state of the molecules. Moreover, at the same time, the orderly structure smaller than the wavelength of visible light is distorted, thereby causing the optical anisotropy (the orientational order parameter>0 in the scale equal to or larger than the wavelength of visible light). In FIG. 15(h), the refractive index ellipsoid 11a becomes ellipsoidal (thereby showing the optical anisotropy). Moreover, the major axial direction of the refractive index ellipsoid 11a becomes perpendicular to the direction of the electric field (electric field direction), at the occurrence of the optical anisotropy. In the case where the dielectric anisotropy of the dielectric materials is negative (that is, in case of the negative type liquid crystal), the major axial directions of the refractive index ellipsoid 11a are perpendicular to the electric field direction) at any voltages (that is, the refractive index ellipsoid 11a is in perpendicular state), whereas in the case where the dielectric anisotropy of the dielectric materials is positive (that is, in case of the positive type liquid crystal), the major axial directions of the refractive index ellipsoid 11a is parallel to the electric field direction) at any voltages. The electric field direction is parallel or perpendicular to at least one of the major axial directions of the refractive index ellipsoid 11a. The orientational order parameter≈0 in the scale not less than the wavelength of visible light indicates that the orientational order parameter is such a state as follows. That is, when the orientational order parameter≈0 in the scale not less than the wavelength of visible light, a majority of the liquid crystal molecules or the like are oriented in a certain direction (there is an orientational order) when observed in a scale smaller than the wavelength of visible light.

Whereas, in the scale larger than the wavelength of visible light, the orientational directions of the molecules are averaged (that is, random) and there is no orientational order. Therefore, when the orientational order parameter>0 in the scale not less than the wavelength of visible light, the orientational order parameter is so small that it causes no effect on the light in the wavelength range of visible light and the light larger than the wavelength of visible light. For example, when the orientational order parameter>0 in the scale equal to or greater than the wavelength of visible light, the black display is realized under crossed nicols. Furthermore, "the orientational order parameter>0 in the scale equal to or greater than the wavelength of visible light" indicates that the orientational order parameter in the scale equal to or greater than the wavelength of visible light is greater than the orientational order parameter of substantially 0. For example, when the orientational order parameter>0 in the scale equal to or greater than the wavelength of visible light, the white display (and/or gray display, which is a gradation display) is realized under crossed nicols. The major axial direction of the refractive index ellipsoid 11a is directed along the direction perpendicular to the substrates, and is arranged helically (in a twist arrangement) from one of the substrates 1 and 2 to the other.

In other words, in the present display element 20 in which the mixture system is used, the molecules 11 are directed in many directions when no electric field is applied. The molecules 11, which have their order (e.g., orderly structure or orientational order) on a scale smaller than the wavelength of visible light, cause no optical anisotropy (the orientational orderly parameter≈0 in the scale equal to or larger than the wavelength of visible light). The shape of the refractive index ellipsoid 11a is spherical as illustrated in FIG. 15(g). However, as illustrated in FIG. 15(h), the individual molecules 11 are oriented along the in-plane direction of the substrates (in the direction parallel to the substrates) due to the negative dielectric anisotropy thereof when the electric field is applied. Moreover, this causes distortions in the orderly structure smaller than the wavelength of visible light, thereby causing the optical anisotropy (the orientational orderly parameter>0 in the scale equal to or larger than the wavelength of visible light).

Hence, in the present display element 20 in which the mixture system is used, the shape of the refractive index ellipsoid 11a is isotropic (nx=ny=nz) when no electric field is applied. The anisotropy appears in the shape of the refractive index ellipsoid 11a (nx>ny in the vicinity of the surface of the substrate 1 located lower in FIG. 15(h); ny>nx in the vicinity of the surface of the substrate 1 located upper in FIG. 15(h)) by electric field application. For example, in the display element 20 according to the present embodiment, the shape and size of the refractive index ellipsoid 11a are changed by the electric field application. Here, nx is a refractive index (main refractive index) of a direction parallel to the surfaces of the substrates and rightward/leftward directions in FIGS. 15(a) to 15(h), and ny is a refractive index (main refractive index) of a direction parallel to the surfaces of the substrates (that is, to the in-plane direction of the substrates) and along a viewing direction (a direction perpendicular to the horizontal directions of FIGS. 15(a) to (h)), and nz is a refractive index (main refractive index) of a direction perpendicular to the surfaces of the substrates (that is, along the normal direction of the substrates).

Figure 17:
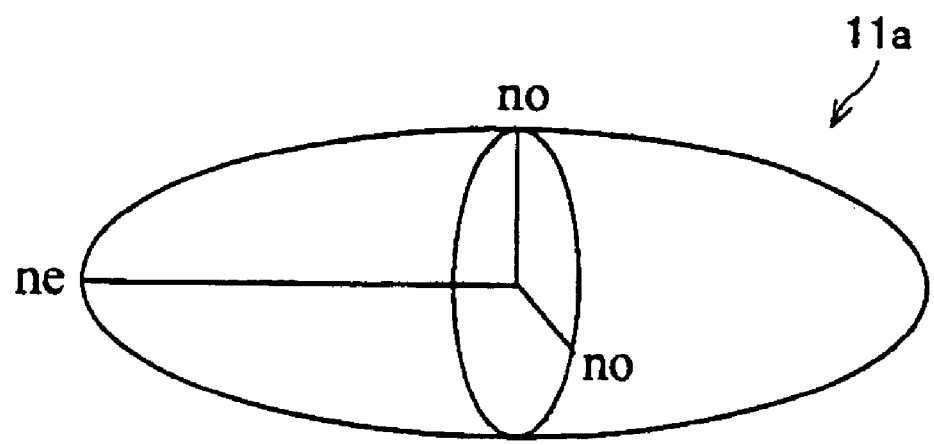
FIG. 17 is a view schematically illustrating a shape of a refractive index ellipsoid of one molecule when the electric field is applied, in the display element according to an example embodiment.

FIG. 17 is a schematic view illustrating the shape of the refractive index ellipsoid 11a of one molecule (molecule 11) in the medium when the electric field is applied, in the display element 70 illustrated in FIG. 1. As illustrated in FIG. 17, the shape of the refractive index ellipsoid 11a is indicated as a cross section of the refractive index ellipsoid (ellipsoid) taken along a plane passing through an original point and perpendicular to a propagation (traveling) direction of light wave. As described above, the major axial direction of the ellipsoid is a component direction of the polarized light of the light wave, and a half of the length of the major axis corresponds to a refractive index along that direction.

The medium according to the present embodiment is optically isotropic (in isotropic phase) when no electric field is applied, and becomes optically anisotropic when the electric field is applied thereon.

Where ne is the refractive index along the major axial direction of the refractive index ellipsoid 11a of the molecule 11 (that is, the component direction of the polarized light of the light wave) due to the occurrence of the optical anisotropy when the electric field is applied (i.e., the refractive index (extraordinary light refractive index) along the major axial direction of the refractive index ellipsoid 11a), and no is the refractive index along the direction perpendicular to the major axial direction of the refractive index ellipsoid 11a (i.e., the refractive index (ordinary light refractive index) along the minor axial direction of the refractive index ellipsoid 11a), the refractive index anisotropy (Δn) (change in birefringence) is expressed as follows:

$$\Delta n = ne - no.$$

For the inventive embodiments herein described, the refractive index anisotropy (Δn) indicates the change in the birefringence expressed as $\Delta n = ne - no$. The quantities ne and no are changed in the inventive embodiments described herein, but not in the conventional liquid crystal display element/device.

The major axial direction of the refractive index ellipsoid 11a is parallel to the electric field application direction when the electric field is applied (in case of the medium having the positive dielectric anisotropy), or the major axial direction of the refractive index ellipsoid 11a is perpendicular to the electric field application direction when the electric field is applied (in case of the medium having the negative dielectric anisotropy).

On the other hand, in the conventional liquid crystal display element, the display operation is carried out by utilizing the rotation of the major axial direction of the refractive index ellipsoid by the electric field application. Thus, in the conventional liquid crystal display element the major axial direction of the refractive index ellipsoid is not limited to parallel or perpendicular to the electric field application direction.

As described above, the direction of the optical anisotropy is constant (for the electric field application whose direction is constant) in the present display element 20 in which the negative type liquid crystalline mixture (3) (mixture system of 3HPFF, 5HPFF, and 7HPFF) is used. The display operation is carried out by modulating the orientational order parameter in the scale equal to or larger than the wavelength of visible light, in the present display element. That is, in the present display element 20 in which the mixture system (e.g., the negative type liquid crystalline mixture (3)) is used, the magnitude of the anisotropy (or the orientational order, for example, in the scale equal to or larger than the wavelength of visible light) of the medium itself is changed to perform the display operation. Therefore, the display principle of the present display element 20 in which the mixture system is used is largely different from other liquid crystal display elements.

As described above, the display element according to the present embodiment performs the display operation by modulating, for example, the orientational order parameter in the scale equal to or more than wavelength of visible light, even though the direction of the optical anisotropy is constant (here, the direction of the electric field application direction is not changed). That is, the display element according to the present embodiment performs the display operation by modulating the modulation of the optical anisotropy of the medium (for example, the orientational order parameter in the scale equal to or more than wavelength of visible light). Therefore, the display element according to the present embodiment is significantly different from the conventional liquid crystal display element in terms of the display principle.

The medium sealed between the substrates 1 and 2 (to form the material layer 3, or dielectric material layer 3) may be any medium provided that the magnitude of the optical anisotropy thereof is changeable by and according to the electric field applied thereon. For example, the medium may be such a medium that is substantially optically isotropic when the electric field is applied or when no electric field is applied, and in which optical modulation is induced by the electric field application (that is, the medium becomes optically anisotropic or isotropic by the electric field application). Moreover, the medium may be a material in which the orientational order parameter in the scale not smaller than the wavelength of visible light is increased among the molecules 11 or molecular agglomerations (clusters 12) by and according to the application of the electric field. It is further increased from a value of the orientational order parameter in a state where the optical modulation is already induced (the orientational order parameter in the scale not smaller than the wavelength of visible light>0)). Moreover, the medium may be a medium in which the orientational order parameter (in the scale not smaller than the wavelength of visible light (magnitude of the optical anisotropy)) is decreased among the molecules 11 or the molecular agglomerations by and according to the application of electric field, compared with the orientational order parameter before the application of the electric field. For example, the medium may be a medium which is changed from an optical anisotropic state (where the orientational order parameter in the scale not smaller than the wavelength of visible light>0) to an optical isotropic state (where the orientational order parameter in the scale not smaller than the wavelength of visible light≈0).

For the inventive embodiments, to change the magnitude of the optical anisotropy of the medium by and according to electric field applied on the medium is, as described above, to change the refractive index ellipsoid 11*a* by and according to the electric field applied on the medium. In the aforementioned arrangement in which the medium is optically isotropic when no electric field is applied and the magnitude of its optical anisotropy is changeable by and according to the electric field applied thereon (i.e., in the arrangement in which the optical anisotropy of the medium is generated when the electric field is applied), the shape of the refractive index ellipsoid 11*a* is changed from the spherical shape to the ellipsoidal shape by and according to the electric field applied thereon. On the other hand, in the arrangement in which the medium is optically isotropic when no electric field is applied thereon, but becomes optically isotropic when the electric field is applied, the shape of the refractive index ellipsoid 11*a* is changed from the ellipsoidal shape to the spherical shape by and according to the electric field applied thereon. Moreover, in the arrangement in which the medium is optical anisotropic when no electric field is applied and the magnitude of its optical anisotropy becomes higher or lower by and according to the electric field application, compared with the magnitude of its optical anisotropy attained when no electric field is applied, a major axial length or a minor axial length of the refractive index ellipsoid is changed (extended or shortened) whereby a ratio between the major axial length and the minor axial length of the refractive index ellipsoid is changed between before and after the electric field application (as a result, for example, curvature is changed). For example, in case where the magnitude of the optical anisotropy becomes higher when the electric field is applied, the electric field application causes the ellipsoid to have a larger ratio of its major axial length over its minor axial direction compared with the ratio attained when no electric field is applied. In the case where the magnitude of the optical anisotropy becomes lower when the electric field is applied, the electric field application causes the ellipsoid to have a smaller ratio of its major axial length over its minor axial direction compared with the ratio attained when no electric field is applied (that is, the ratio gets closer to 1; the ratio in this case may be such a ratio with which the ellipsoid becomes substantially spherical).

Moreover, in the present display element 20 in which the mixture system (the negative type liquid crystalline mixture (3)) is used, the distortion caused in the structure that shows the optical anisotropy (i.e., the change in the magnitude of the optical anisotropy in the medium) is utilized to perform the display operation. Therefore, a wider viewing angle property is realized in the present display element 20 than in the conventional display modes in which the display operation is carried out by changing the orientational directions of the liquid crystal molecules. Further, in the present display element 20 in which the mixture system (the negative type liquid crystalline mixture (3)) is used, the birefringence occurs in one constant direction, and the optical axial direction is not changed. Thus, a wider viewing angle property is realized in the present display element 20 than in the conventional liquid crystal display element in which the display operation is performed by changing the orientational direction of the liquid crystal molecules.

Moreover, in the present display element 20 in which the mixture system (the negative type liquid crystalline mixture (3)) is used, the display operation is carried out by utilizing the anisotropy that is caused by distorting the structure (lattice that is like a crystal) of micro regions. Because of this, the present display element 20 is free from a problem associated with the display principle of the conventional display modes that inherent viscosity of the liquid crystal largely affects the response speed. It is possible to realize high-speed response of about 1 ms in the present display element 20. Specifically speaking, because the display principle of the conventional modes utilizes only the change in the orientational direction of the liquid crystal molecules caused by rotation thereof according to the electric field application and the aligned liquid crystal molecules are rotated together in one direction, the inherent viscosity of the liquid crystal largely affects the response speed. On the contrary, in the present display element 20 in which the mixture system (the negative type liquid crystalline mixture (3)) is used, the distortion of the structures in the micro regions is utilized. Therefore, the effect given by the inherent viscosity of the liquid crystal is small and it is possible to attain the high-speed response in the present display element 20.

The present display element 20, in which the above display mode is applied, attains high-speed response. The high-speed response allows the display element to be used, for example, in a display device of the field sequential color mode.

Moreover, the conventional liquid crystal display element has such a problem that its driving temperature range is limited to temperatures near a phase transition point of a liquid crystal phase, and thus it requires a highly accurate temperature control. On the other hand, the present invention is only required that the medium be kept at temperatures at which the magnitude of the optical anisotropy is changeable by the application of the electric field. Thus, it is possible to easily perform the temperature control.

Furthermore, the present display element 20 may be expressed as a display element basically arranged such that (i) the electric field is applied along the normal direction of the surfaces of the substrates (vertical electric field application), (ii) the medium for the dielectric material layer 3 is a negative type liquid crystal (use of negative type liquid crystal), and (iii) a chiral agent is added in the medium for the dielectric material layer 3 (addition of chiral agent).

Moreover, by forming a display device 100 according to the present embodiment by using the present display element 20, it is possible to improve the contrast and suppress the coloring phenomenon in the display device in which the display element utilizes that change of the magnitude of the optical anisotropy of a material which is caused by the electric field application, for example, that change of the refractive index of a material which is caused by an electric field applied externally (electro-optical effect). Moreover, the present display element 20 is free from a problem that the transmittance is low on a boundary between domains in case where there are plural domains which respectively have, for example, leftward twisted structure and rightward twisted structure. Thus, according to the present display element 20, it is possible to improve the transmittance.

Moreover, by applying the present invention to a display device 100 in which the Kerr effect is utilized, significant improvement in the contrast and suppression in the coloring phenomenon can be attained as well as high-speed response. Thus, the present display element 20 is quite significant practically.

Moreover, the present embodiments may be expressed such that they relate to a display element that has such a display performance that high speed response and wide viewing angle are attained.

The present invention is not limited to the display element 20 in which the substrates 1 and 2 are glass substrates. The present invention only requires that at least one of the substrates 1 and 2 be transparent. Moreover, in terms of the gap between the substrates 13 and 14 (that is, the gap between the substrates 1 and 2 on which the electrodes 4 and 5 are respectively provided) in the display element 20, the gap is 5 μm or 1.3 μm in one example, non-limiting embodiment. The present invention, however, does not limit the gap to 5 μm or 1.3 μm. The gap may be arbitrarily set as appropriate. Moreover, the electrodes 4 and 5 are made of ITO in the embodiment. The present invention, however, is not limited to electrodes of ITO, provided that at least one of the substrates is made of a transparent electrode material.

Moreover, the materials of the polarizers 6 and 7 are not particularly limited and may be materials conventionally well known. Moreover, the polarizers 6 and 7 are not requisite components that must be provided in the present invention.

In Table 1, results of the measurements of refractive index anisotropy Δn and dielectric anisotropy Δε are shown. In the measurements, the display element (H)20 illustrated in FIG. 8 was used as a cell (4) which was according to the present embodiment. Further, comparative cells (2) and (3) were also prepared which were identical with the cell (4) except that later-mentioned negative type liquid crystal materials were respectively used as the medium (host liquid material) sealed between the substrates 1 and 2 in order to form the dielectric material layer 3, in lieu of the negative type liquid crystalline mixture (2). The refractive index anisotropy Δn and dielectric anisotropy Δε measured were: refractive index anisotropy Δn and dielectric anisotropy Δε of a medium in the nematic phase in the cell (4) (display element (H)20); and refractive index anisotropy Δn and dielectric anisotropy Δε of a medium in the nematic phase in the cells (2) and (3). In Table 1, products Δn×|Δε| of these measured refractive index anisotropy Δn and dielectric anisotropy Δε of the media in the cells (2) to (4) are also shown.

The cells (2) to (4) has a cell thickness d of 1.3 μm. A chiral agent to be added in the medium (host liquid crystal material) was "S811" mentioned above. Moreover, chiral agent content was 30 wt % in each cell.

The medium (host liquid crystal material) used in the comparative cell (2) was a compound (negative type liquid crystal material (i) represented by Formula (19):

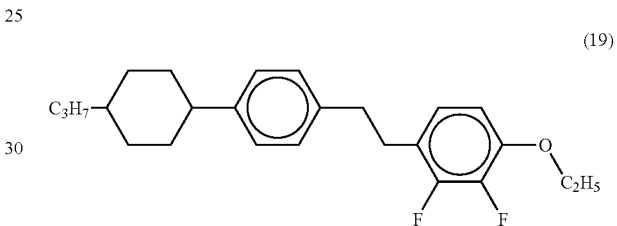

(19)

The medium (host liquid crystal material) used in the comparative cell (3) was a compound (negative type liquid crystal material (ii) represented by Formula (20):

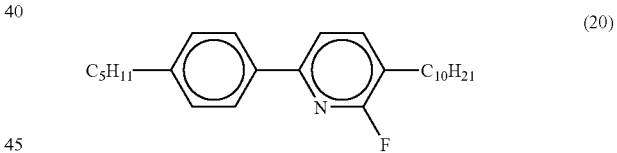

(20)

The measurements of the refractive index anisotropy Δn and dielectric anisotropy Δε of the negative type liquid crystalline mixture (2) and the negative type liquid crystal materials (i) and (ii) were carried out under the aforementioned conditions. The refractive index anisotropy Δn was measured by using an Abbe refractometer (made by ATAGO Co., Ltd. "4T (product name)") and with wavelength of 550 nm and at a temperature of 25° C. (=0.89$_{ni}$). The dielectric anisotropy Δε was measured by an impedance analyzer (made by Toyo Corporation "SI1260 (product name)"), with frequency of 1 kHz, and at a temperature of 25° C. (=0.89$_{ni}$).

Again in the present example, the negative type liquid crystalline mixture (2) were a negative type liquid crystalline mixture prepared by mixing the compounds 2-1 and 2-2 at such a ratio that the negative type liquid crystalline mixture had a refractive index anisotropy Δn of 0.14 and a dielectric anisotropy Δε of −14, the compounds 2-1 and 2-2 represented by Formulae (4) and (5) respectively.

The measurements carried out under the above conditions showed that the negative type liquid crystal material (i) in the nematic phase had a refractive index anisotropy Δn of 0.1280 and a dielectric anisotropy Δε of −4.9, and that the negative type liquid crystal material (i) in the nematic phase had a refractive index anisotropy Δn of 0.1107 and a dielectric anisotropy Δε of −4.3.

TABLE 1

|  | MEDIUM | Δn | Δε | Δn×|Δε| |
|---|---|---|---|---|
| CELL (4) | Negative type Liquid Crystalline Mixture (2) | 0.14 | −14 | 1.96 |
| COMPARATIVE CELL (2) | Negative type Liquid Crystal Material (i) | 0.1280 | −4.9 | 0.63 |
| COMPARATIVE CELL (3) | Negative type Liquid Crystal Material (ii) | 0.1107 | −4.3 | 0.48 |

For the cell (4), the nematic-isotropy phase transition temperature ($T_{ni}$) of the chiral-agent-added liquid crystal material (2) containing the chiral agent "S811" and the negative type liquid crystalline mixture (2) was 38° C. For the cells (2) and (3), the nematic-isotropy phase transition temperature ($T_{ni}$) of the chiral-agent-added liquid crystal materials containing the chiral agent "S811" and the negative type liquid crystalline mixtures were 43° C. for the comparative cell (2) and 50° C. for the comparative cell (3).

Next, voltage-transmittance characteristics (V-Tr characteristics) of the cell (4) and the comparative cells (2) and (3) were measured. The measurement of voltage-transmittance characteristics was carried out by applying an electric field (Voltage) between the electrodes 4 and 5 with the cells kept at temperature $T_e$ ($T_e=T_{ni}+\Delta T_e$) by using a heater externally provided. The temperature $T_e$ started from the nematic-isotropic phase transition temperature ($T_{ni}$).

Figure 16:
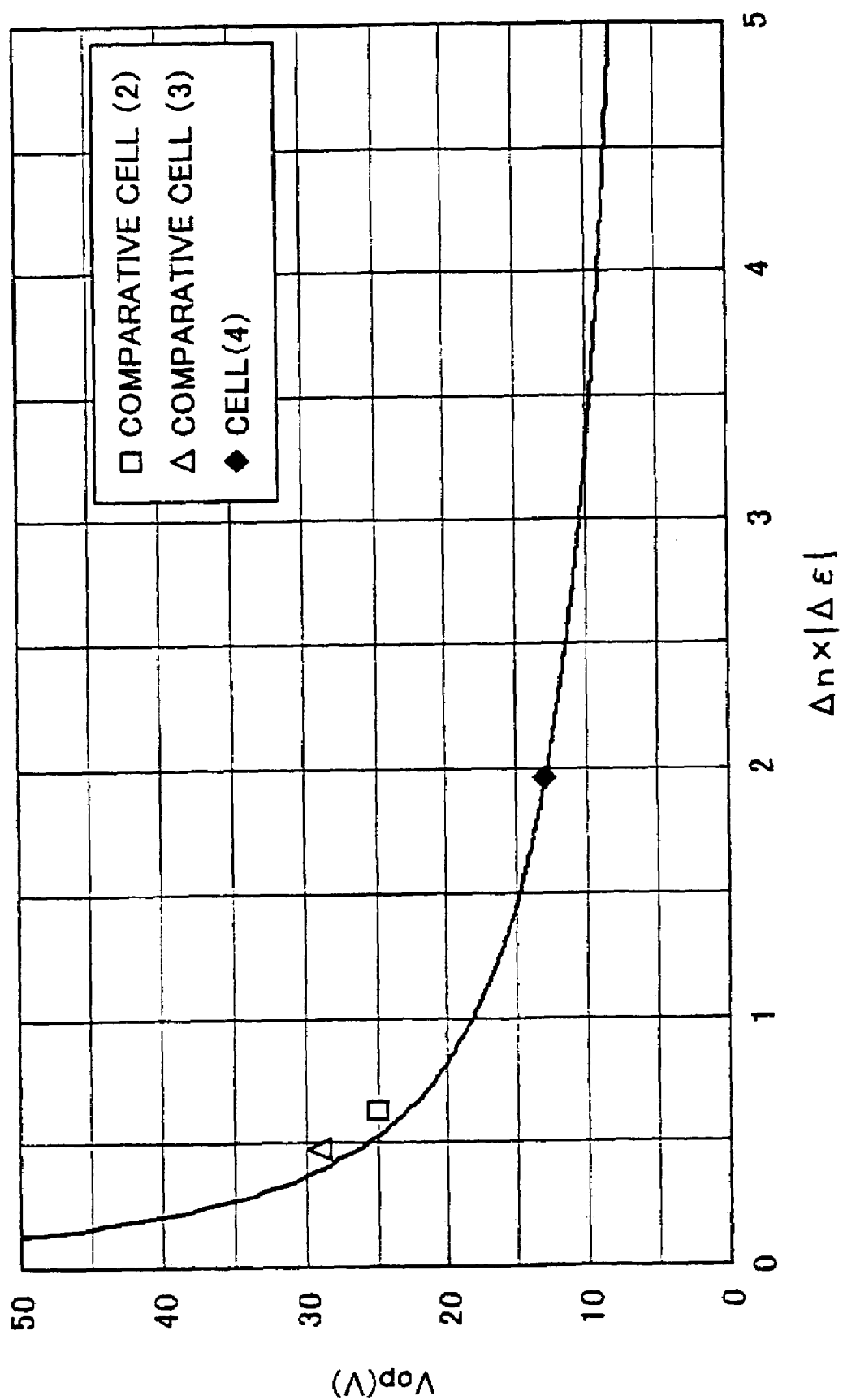
FIG. 16 is a graph illustrating relationship between applied voltages Vop of a cell (4) according to an example embodiment, and of comparative cells (2) and (3), and products ($\Delta n \times |\Delta \epsilon|$) of refractive index anisotropy $\Delta n$ and an absolute value of dielectric anisotropy $|\Delta \epsilon|$.

From the thus obtained data (V-Tr characteristics), a relationship between the driving voltage Vop (voltage applied to attain a 90% transmittance with respect to the maximum transmittance) and the product Δn×|Δε| of the measured refractive index anisotropy Δn and the dielectric anisotropy Δε of the media (e.g., the host liquid crystal material) respectively used in the cells is plotted in FIG. 16. In FIG. 16 the vertical axis is Vop (V) and the horizontal axis is Δn×|Δε|, and "♦" represents the cell (4), "□" represents the comparative cell (2), and "Δ" represents the comparative cell (3).

The curve illustrated in FIG. 16 is an ideal curve (fitting curve). For the ideal curve, it is supposed that the applied voltage Vop is in inverse proportion with the square root of Δn×|Δε|{$\sqrt{(\Delta n \times |\Delta \varepsilon|)}$}. The ideal curve is expressed by the following Equation (IV):

$$Vop \propto \frac{1}{\sqrt{\Delta n |\Delta \varepsilon|}} \tag{IV}$$

The reason is as follows:

Firstly, an order parameter Q (E), which appears when an electric field is applied on an isotropic liquid crystal, is obtained from the following Equation (V), according to statistical Landau theory:

$$Q(E) = \frac{\rho \Delta \varepsilon \cdot E^2}{12\pi\alpha(T-T^*)} \tag{V}$$

where ρ is molecular number density (unit: infinity), is coefficient (unit: $V^2/K \cdot \mu m^2$) for Landau expansion, E is intensity of the electric field (unit V/μm), T is (absolute) temperature (K), T* is a critical temperature (K), and Δε is dielectric anisotropy (unit: infinity). The critical temperature T* is slightly lower than the phase transition temperature $T_{ni}$, with the assumption that the nematic-isotropic phase transition is second-order phase transition.

Moreover, the Kerr effect (which generally states that Δn(E) is proportional to square of the intensity of the electric field) is expressed by the following Equation (VI):

$$\Delta n(E) = \lambda B E^2 \tag{VI}$$

where Δn(E) is birefringence (unit: infinity) which occurs when the electric field is applied, λ is the observed wavelength of light (unit: μm), B is the Kerr constant (unit: $\mu m/V^2$), and E is the intensity of the electric field (unit: V/μm).

Further, by using the inherent refractive index anisotropy Δn of the liquid crystal molecules, the Δn(E) is expressed by the following Equation (VII):

$$\Delta n(E) = \Delta n \cdot Q(E) \tag{VII}$$

From Equations (V) to (VII), the Kerr constant B is expressed by the following Equation (VIII):

$$B = \frac{\Delta n(E)}{\lambda E^2} = \frac{\Delta n Q(E)}{\lambda E^2} = \frac{\rho \Delta n \Delta \varepsilon}{12\lambda\pi\alpha(T-T^*)} \tag{VIII}$$

The transmittance Tr (unit: infinity) is expressed by the following Equation (IX):

$$Tr = \sin^2\left(\frac{\pi}{\lambda}\Delta n(E)d\right) = \sin^2\left(\pi B \frac{V^2}{d}\right) \tag{IX}$$

where V is a half wavelength voltage (unit: V), d is the cell thickness, e.g., a gap between the electrodes 4 and 5 (unit: μm), Δn(E) is birefringence occurring when the electric field is applied, λ is the observed wavelength of light, and B is the Kerr constant. For example, where the applied voltage Vop under the half wavelength condition is $V_{op}$, d is the cell thickness, and B is the Kerr constant, Vop is expressed by the following Equation (X):

$$\pi B \frac{Vop^2}{d} = \frac{\pi}{2} \tag{X}$$

Thus, from Equations (VIII) to (X), the applied voltage Vop under this condition can be expressed as the following Equation (XI):

$$Vop = \sqrt{\frac{d}{2B}} \propto \sqrt{\frac{d \Delta T}{\Delta n \Delta \varepsilon}} \tag{XI}$$

From this, Equation (IV) is obtained.

As can be noticed in FIG. 16, Δn×|Δε| should be larger than 0.63 in order to attain a driving voltage of 24V or less. The reason why the driving voltage of 24V or less was considered as a first target by the inventors is explained below.

A maximum voltage applicable to the gate electrode of a TFT element as the switching element 21 with optimal film thickness and film material of the gate electrode was measured. The maximum voltage applicable to the gate electrode was 63V. Here, a maximum voltage applicable to the dielectric material layer 3 is found by subtracting, from 63V, a voltage (10V) attained when a potential of the gate electrode is High (that is, the gate electrode is ON), and a voltage (−5V) attained when a potential of the gate electrode is Low (that is, the gate electrode is OFF). That is, a maximum voltage applicable to the dielectric material layer 3 is 48 Vpp (63−10−5=18 Vpp (peak-to-peak)). This voltage value is ±24V in terms of rms value (root-mean-square). This voltage value is the first target aimed for by the inventors.

Moreover, a driving voltage of 10V or less is more preferable because the driving voltage of 10V or less makes it possible to use a multi-purpose TFT in order to drive the display element. According to the ideal curve in FIG. 16, the driving voltage of 10V or less can be attained when $\Delta n \times |\Delta \epsilon| \geq 3.3$.

Moreover, in general, it is said that it is very difficult to increase only the refractive index anisotropy $\Delta n$, or to increase only the dielectric anisotropy $\Delta \epsilon$. As a result of intensive studies, the inventors found that, in order to attain $\Delta n \times |\Delta \epsilon| > 0.63$ with a good balance between the refractive index anisotropy $\Delta n$ and the dielectric anisotropy $\Delta \epsilon$, it is preferable that $\Delta n > 0.128$ and $|\Delta \epsilon| > 4.9$. Further, the inventors found that, in order to attain $\Delta n \times |\Delta \epsilon| \geq 3.3$ with a good balance between the refractive index anisotropy $\Delta n$ and the dielectric anisotropy $\Delta \epsilon$, it is preferable that $\Delta n \geq 0.183$ and $|\Delta \epsilon| \geq 18$.

As illustrated in FIG. 16, the applied voltage Vop is largely correlated with the parameter $\Delta n \times |\Delta \epsilon|$. It is deduced that the applied voltage Vop (V) follows the curve expressed as Equation (IV). Larger refractive index anisotropy $\Delta n$ is preferable for attaining a display element that can be driven with a lower voltage. Further, a larger dielectric anisotropy $\Delta \epsilon$ is also preferable for attaining a display element that can be driven with a lower voltage.

In the above explanation, the cell thickness (d) is fixed to 1.3 μm in setting the numerical ranges of the parameters of the liquid crystal material. If the cell thickness (d) is thicker than 1.3 μm, a higher driving voltage will be required. Thus, if the cell thickness (d) is thicker than 1.3 μm, a larger $\Delta n \times |\Delta \epsilon|$ is necessary. Thus, the parameters will be within the numerical ranges consequently.

Next, a case of the cell thickness (d) thinner than 1.3 μm will be discussed. Current production processes cannot produce cell thicknesses of about 1 μm or thinner. Therefore, it is expected that no problem will arise if the calculation is based on the cell thickness (d) of 1.3 μm. However, it cannot be said that a cell thickness less than 1 μm will not be realized as a result of future improvements of the production processes. Even if a cell thickness (d) of 1 μm or thinner is realized, the above-mentioned values will be the lower limit value for the parameters that the liquid crystal material should satisfy in order to realize a display element with no increase in cost by using the multi-purpose TFT element and driver.

As described above, the temperature ($T_e$) at which the refractive index anisotropy $\Delta n$ and dielectric anisotropy $\Delta \epsilon$ are measured is not particularly limited, provided that the liquid crystal material (e.g., the liquid crystalline medium) shows the nematic liquid crystal phase at the $T_e$ temperature. However, it is preferable that $T_e$ be in a range of 0.5 $T_{ni}$ to 0.95 $T_{ni}$ where unit of $T_e$ is absolute temperature K (Kelvin). That is, in the present embodiment, the liquid crystal material should be such that $\Delta n \times |\Delta \epsilon|$ is greater than 0.63, where $\Delta n \times |\Delta \epsilon|$ is the product of the refractive index $\Delta n$ measured with 550 nm and the absolute value $|\Delta \epsilon|$ of the dielectric anisotropy measured with 1 kHz when the material is in the nematic phase. It is more preferable that $\Delta n \times |\Delta \epsilon|$ be greater than 0.63, where $\Delta n \times |\Delta \epsilon|$ is the product of the refractive index $\Delta n$ measured with 550 nm and at a temperature in the range of 0.5 $T_{ni}$ to 0.95 $T_{ni}$, and the absolute value $|\Delta \epsilon|$ of the dielectric anisotropy at 1 kHz and at a temperature in the range of 0.5 $T_{ni}$ to 0.95 $T_{ni}$ when the material is in the nematic phase.

In the present embodiment, the larger parameter $\Delta n \times |\Delta \epsilon|$ is preferable for attaining the low-voltage driving. However, the multi-purpose TFT elements, driving circuits, and ICs (integrated circuits) are uneven (has dispersion) in terms of voltage value. Thus, if the driving voltage was as small as the dispersion of the voltage value, there would be a case that the gray level display cannot be performed sufficiently. The dispersion of the voltage value is estimated as about 0.2V at maximum. Although the larger parameter $\Delta n \times |\Delta \epsilon|$ is preferable, in order to realize a display element with no cost increase by using the multi-purpose TFT element, driving circuit, and IC, it is preferable that the applied voltage Vop be larger than the dispersion of the voltage value. It is expected that stable gray level display can be attained by setting the applied voltage Vop (V) larger than the maximum dispersion of the voltage value, that is, 0.2V. Extrapolation from the curve of FIG. 16 where the cell thickness (d) is fixed to 1.3 μm, tells that it is preferable that the parameter $\Delta n \times |\Delta \epsilon|$ be 24 or less (that is $0.63 < \Delta n \times |\Delta \epsilon| \leq 24$, especially $3.3 \leq \Delta n \times |\Delta \epsilon| \leq 24$), and it is more preferable that that the parameter $\Delta n \times |\Delta \epsilon|$ be 20 or less (that is $0.63 < \Delta n \times |\Delta \epsilon| \leq 20$, especially $3.3 \leq \Delta n \times |\Delta \epsilon| \leq 20$).

Next, the material to be sealed between the substrates 1 and 2 to form the dielectric material layer 3 in the display element 20 illustrated in FIG. 1 was prepared by using a mixture-type medium prepared by mixing a transparent dielectric material (e.g., "ANBC-22", a 4'-n-alkoxy-3'-nitro-biphenyl-4-carboxylic acid) with the chiral agent "S811" so that the chiral agent content of 30 wt % was obtained. The transparent dielectric material used here is represented by the following Formula (21):

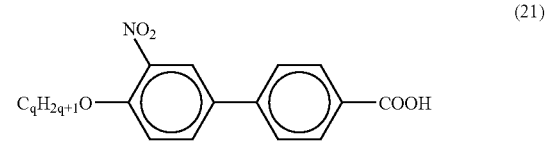

(21)

where q is an arbitral integer, typically q=22. The display element thus prepared had the same configuration as the display element 20 illustrated in FIG. 1, except that its cell thickness d was 4 μm. An electric field was applied on the thus prepared display element kept at a temperature near a smectic C* phase—cubic phase transition point by using a heater externally provided. The electric field was an alternative electric field greater than 0 V but not more than 50V (the frequency is greater than 0 Hz, and up to several hundred KHz). The temperature was kept to be within the temperature range between the smectic C phase-cubic phase transition point and a temperature lower than the transition point by 10K. As a result of the electric field application, the transmittance could be changed.

More specifically, the mixture-type medium of the display element becomes either dextrorotatory or levorotatory (that is, it shows only one configuration (R or S configuration) of chirality) when no electric field is applied. When no electric field is applied, the mixture-type medium shows the smectic C* phase. Thus, at temperatures lower than the smectic C* phase—cubic phase transition point, the display element shows the smectic C* phase. The smectic C* phase shows one configuration (R or S configuration) of chirality, and optical anisotropy when no electric field is applied thereon. In the present example, the phase of the medium can be changed by applying an electric field thereon, that is, from the smectic C* phase showing the optical anisotropy (bright state) when no electric field is applied, to a cubic phase showing optical isotropy (dark state) when the electric field is applied.

In the cubic phase appeared when the electric field is applied, the lattice constant is several nm or less at its largest (e.g., 11 to 18 nm). In the cubic phase which appeared when the electric field is applied, there is an orientational order less than the wavelength of visible light. Therefore, the mixture-type medium is optically isotropic in the wavelength range of visible light.

As described above, the medium to be sealed between the substrates 1 and 2 in order to form the dielectric material layer 3 in the display element 20 according to the present embodiment may be a medium that is optically anisotropic when no electric field is applied but becomes optical isotropic when the electric field is applied.

It is not required that the field applied to change the magnitude of the optical anisotropy of the medium A be an electric field, as non-electric field embodiments are included herein. For example, in lieu of electric field application, a magnetic field application may be used in order to change the magnitude of the optical anisotropy depending on whether or the magnetic field is applied.

That is, a magnetic field as well as an electric field can be the applied field. In order to change the magnitude of the optical anisotropy of the medium A by the magnetic field application, magnetic anisotropy of the medium A is utilized. Therefore, in this case, a material having a larger anisotropy in terms of the magnetic susceptibility is preferable as the medium A. In the case of organic molecules, the magnetic susceptibility is mainly due to diamagnetism. Thus, in case where the p electrons can be moved along a ring in a molecules according to the change in the magnetic field, an absolute value of the magnetic susceptibility becomes largest. Therefore, for example, in case where the molecule has an aromatic ring, the absolute value of the magnetic susceptibility becomes largest when the aromatic ring (e.g., a sequence of the aromatic ring, or a chain containing aromatic rings) is directed perpendicular to a direction along which the magnetic field is applied. In this case, the magnetic susceptibility observed along a direction to which the aromatic ring is parallel, is relatively smaller in absolute value than along a direction to which the aromatic ring is perpendicular. Thus, the anisotropy of the magnetic susceptibility is larger along the direction to which the aromatic ring is parallel. Therefore, a material having a ring structure such as a six-membered ring (for example, a benzene ring) is preferable as the medium A. Moreover, in order to increase the anisotropy of the magnetic susceptibility, it is also preferable to orient electron spin in the medium A. By introducing an electron spin in a free radical (radical) of N, O, NO, or the like, it is possible to give the molecules a stable spin. In this case, for example, it is possible to orient the spin parallel by piling conjugate molecules on the plane. In this case, for example, a discotic liquid crystal is preferable as the medium A. In the discotic liquid crystal, core portions located at a center of the molecules are piled into columns.

In this case where the magnetic field is applied, the display element may have such an arrangement, for example, that a magnetic field generating member (such as an electromagnet or the like) or the like is provided outside of the cell, for example, on an outer side of the display element 70, in lieu of the electric field applying members such as the electrodes 4 and 5, or the like. By applying the magnetic field, in lieu of the electric field, on the medium, it is possible to perform the same driving (addressing) as above.

Moreover, rather than electric or magnetic, the applied field may be light. There is no particular limit in terms of the wavelength of the light. For example, the magnitude of the optical anisotropy can be changed by and according to radiating, on the medium A, light of 532 nm generated by an Nd (Neodymium): YAG (Yttrium Aluminum Garnet) laser.

The medium A to be used in this arrangement is not particularly limited. In this arrangement, a medium in which the magnitude of the optical anisotropy is changeable by and according to the light radiation, because the Kerr effect due to light is utilized in this arrangement. The medium A in this arrangement may be media similar to the media used in the arrangement in which the electric field is used, more specifically, the media mentioned in the first implementation.

Note that it is preferable that the medium A contain a little amount of dye in the case where the light is used as the applied field. By this arrangement in which the medium A contains a little amount of dye, the magnitude of the optical anisotropy becomes more changeable than without the dye. The dye content in the medium A is preferably 0.01 wt % or more, and less than 5 wt %. If the dye content were less than 0.01 wt %, the amount of the dye would be too little to attain a sufficient effect. On the other hand, if the dye content were 5 wt % or more, the dye absorbs exitation light.

In this arrangement, the medium A may be, for example, the compound (e.g., liquid crystalline material) represented by Formula (7). The liquid crystalline material itself may be used as the medium A, or a mixture of the liquid crystalline material and a dye may be used as the medium A.

There is no particular limit for the dye, but preferably the dye has an absorption band within the wavelength of the exitation light. For example, the dye may be a compound such as 1-amino-anthraquinone (hereinafter, referred to as "1AAQ") represented by the following formula (22). One example 1AAQ is made by Aldrich.

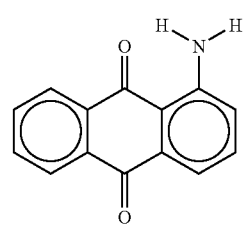

(22)

When adding "1AAQ" in a compound (e.g., "5CB" (pentylcyanobiphenyl)) represented by Formula (7) so that the content of "1AAQ" in the medium A comprised of 5CB and 1AAQ is 0.03 wt %, the medium A becomes about 10 times more changeable in terms of the magnitude of the optical anisotropy, as compared with the medium containing no "1AAQ".

More specifically, a display element is so arranged as to include a pair of substrates, at least one of which is transparent; and a material layer between the substrates, the display element performing a display operation by applying a field between the substrates, and the material layer including a medium whose optical anisotropy magnitude is changeable by and according to the field, and in which a twisted chiral structure is formed when optical anisotropy occurs, the twisted structure having only one chiral configuration and being structured with molecules of the medium oriented only in one twisting direction. The medium is preferably an optical modulation layer, for example, dielectric material layer (e.g., an optically active material layer).

It is possible to attain a display element having a wide driving (operating) temperature range, wide viewing angle property, and high-speed response property, because the material layer includes the medium, a magnitude of whose optical anisotropy is changeable by and according to a field application so that the display element performs the display operation by applying the field between the substrate.

Moreover, in this arrangement, the molecules in the medium of the material layer (e.g., a dielectric material layer) are oriented only in one twist direction, so that a twisted structure having only one twist direction is formed. As a result, in the material layer as a whole, a large optical activity can be caused, so that the driving voltage can be reduced to a practical level.

Moreover, because this arrangement needs no alignment film, the display element of this arrangement is free from the phase difference caused between the rubbed alignment films, and the light leakage due to phase difference caused by molecules adsorbed on the alignment films. Thus, the display element of this arrangement attains high contrast.

Moreover, because the molecules are oriented into the twisted structure, influence of the wavelength dispersion becomes smaller. This alleviates the coloring phenomenon.

Further, the material which comprises the material layer may be a medium that is optically isotropic when no electric field is applied, and becomes optically anisotropic when the field is applied. In this case, the shape of the refractive index ellipsoid is spherical when no field is applied, and becomes ellipsoidal when the field is applied. Moreover, the medium maybe such a medium that is optically anisotropic when no field is applied, and becomes optically isotropic when the field is applied. In this case, the shape of the refractive index ellipsoid is ellipsoidal when no field is applied, and becomes spherical when the field is applied. Furthermore, the medium may be such a medium that is optical anisotropic when no field is applied thereon, and that the magnitude of its optical anisotropy, which has been already existed, is changed by and according to the field applied thereon. In this case the ratio of the major axial length over the minor axial length of the refractive index ellipsoid is changed between before and after the field application (the shape of the refractive index ellipsoid may be substantially spherical).

With any of these arrangements, it is possible to change the shape of the refractive index ellipsoid depending on whether or not the field is applied. Thus, it is possible to perform the display operation by changing the magnitude of the optical anisotropy (orientational order parameter, refractive index, and/or the like), even though the direction of the optical anisotropy is constant. Therefore, with any of these arrangements, it is possible to realize a display element whose display state is changeable between when the field is applied and when no field is applied, and which has a wide driving (operable) temperature range, a wide viewing angle, and high-response capability.

It is preferable that the twisted structure has a twist pitch that is within a wavelength range of visible light, or smaller than a wavelength of visible light.

With the arrangement in which the twisted structure has the twist pitch that is within a wavelength range of visible light, or smaller than a wavelength of visible light, incident light travels along the one-direction twist (e.g., twisted structure having one twist direction) caused in the medium of the dielectric material layer by the field applied thereon. This allows the light to pass through the medium efficiently. Hence, this arrangement makes it possible to attain the maximum transmittance with a low voltage. Therefore, with this arrangement, it is possible to realize a display element in which the driving voltage is low and light is highly efficiently utilized.

In examples described herein in which a chiral agent is added in the medium in order to realize the twisted structure having the twist pitch that is within a wavelength range of visible light (, or smaller than a wavelength of visible light), the optical anisotropy can be caused, by the field application, within a wide temperature range without using orientation auxiliary material such an alignment film or the like. For example, a display element may be arranged such that the medium contains a chiral agent.

With any of these arrangements, it is possible to orient the molecules into the twisted structure having only one chiral configuration (R or S configuration).

In the arrangement in which the medium contains a chiral agent, it is preferable that a ratio of the chiral agent to a sum of the medium and the chiral agent be not less than 8 wt % and not more than 80 wt %, and it is more preferable that a ratio of the chiral agent to a sum of the medium and the chiral agent be not less than 30 wt % and not more than 80 wt %.

If the chiral agent content is 8 wt % or higher, the temperature dependency of the driving voltage is lower. As a result, the driving or operation temperature range is widened. Moreover, the chiral agent content of 8 wt % corresponds to a twist pitch of 0.78 μm, which substantially corresponds to the upper limit of the wavelength range of visible light. Therefore, the arrangement in which the chiral agent content is 8 wt % or more gives the medium the twist pitch equal to or smaller than the wavelength of visible light, that is, within the wavelength range of visible light or smaller than the wavelength of visible light.

Moreover, when the chiral agent content is 30 wt % or more, a helical twist power of the chiral agent effectively affects the molecules in the medium. This causes short-range intermolecular interaction (e.g., short range order), or causes blue phase in the medium. Therefore, by controlling the ratio of the chiral agent in the medium as such, it is possible to control the twist pitch to be equal to or smaller than the wavelength of visible light, that is, within the wavelength range of visible light or smaller than the wavelength of visible light. Further, with this arrangement, the molecules of the medium can respond to the field application as molecular agglomerations (e.g., clusters), the medium being optically isotropic when no field is applied. Thus, it is possible to cause the optical anisotropy in a wider temperature range than in the conventional arrangement in which the optical anisotropy can occur in very narrow temperature range. That is, with this arrangement, it is possible to cause the optical anisotropy in a wider temperature range by the field application.

Moreover, in view of the property of the display element, it is preferable that a lower limit of the twist pitch be shorter (e.g., lower). However, if an excess amount of the chiral agent is added in the medium, the liquid crystal property of the material layer is lowered as a whole (that is, a ratio of the liquid crystal molecules in the material layer becomes lower). The lack of the liquid crystal property makes it more difficult to cause the optical anisotropy by the field application. When it becomes more difficult to cause the optical anisotropy, the function of the display element as an element for displaying is deteriorated. Therefore, in order to allow the display element to function as an element for displaying, the material layer should have at least the liquid crystal property. The upper limit of the chiral agent content is determined according to whether the material layer can have the liquid crystal property with the chiral agent content. According to the study conducted by the inventors, it was found that the upper limit of the chiral agent content is 80 wt %.

Moreover, a display element according to the present embodiment may be arranged such that the medium is a chiral material that is chiral itself. With this arrangement, a freedom for material is improved, because there is no limit in terms of content of an additive, such as, the chiral agent.

Moreover, a display element may be arranged such that the medium contains a rod-like molecule that shows negative dielectric anisotropy. The rod-like molecule is a molecule that has anisotropy due to its molecular structure and whose major axial direction and minor axial direction are different in length.

Further, a display element may be arranged such that the medium contains a negative type liquid crystalline compound. The negative type liquid crystalline compound is a compound of liquid crystal molecules that satisfies $\Delta n=n_e-n_o>0$ and $\Delta\epsilon=\epsilon_e-\epsilon_o<0$, where $n_e$ is a refractive index along a major axial direction of the liquid crystal molecules, $\epsilon_e$ is a dielectric constant along the major axial direction of the liquid crystal molecules, $n_o$ is an ordinary light refractive index along a minor axial direction of the liquid crystal molecules, and $\epsilon_o$ is a dielectric constant along the minor axial direction of the liquid crystal molecules. Especially, when an electric field is applied on a negative type liquid crystalline medium which has a negative $\Delta\epsilon$ (i.e., whose dielectric constant along the major axial direction of the molecules is smaller than that along the minor axial direction of the molecules, the orientation state is changed so that the individual molecules are oriented along the in-plane direction of the substrates (e.g., along a direction parallel to the substrates). This change in the orientation state induces optical modulation. This makes it possible to cause the optical anisotropy more efficiently.

Where $\Delta n$ is the refractive index anisotropy, measured at 550 nm, of the negative type liquid crystalline compound in the nematic phase and $|\Delta\epsilon|$ is the absolute value of the dielectric anisotropy, measured at 1 kHz, of the negative type liquid crystalline compound in the nematic phase, it is preferable that $\Delta n \times |\Delta\epsilon|>0.63$. In this case, it is more preferable that $\Delta n>0.128$ and $|\Delta\epsilon|>4.9$.

It is preferable that $\Delta n \times |\Delta\epsilon| \geq 3.3$. In this case, it is more preferable that $\Delta n \geq 0.183$ and $|\Delta\epsilon| \geq 18$.

By using such a negative type liquid crystalline compound that $\Delta n \times |\Delta\epsilon|>0.63$, the driving voltage for the display element can be a maximum root-means-square value of voltage applicable to the medium.

Moreover, by using such a negative type liquid crystalline compound that $\Delta n \times |\Delta\epsilon| \geq 3.3$, it becomes possible to cause the optical anisotropy efficiently by the field application performed with a lower voltage Thus, this enables the display element to be driven with such a low voltage to allow the multi-purpose TFT element to be used for driving (addressing) the display element. Therefore, this arrangement puts the display element to practical use without cost increase for drivers and the like.

In each of the above cases, by satisfying that $\Delta n>0.128$ and $|\Delta\epsilon|>4.9$, more preferably, $\Delta n \geq 0.183$ and $|\Delta\epsilon| \geq 18$, it is possible to attain the low-voltage driving while avoiding either $\Delta n$ or $|\Delta\epsilon|$ being extremely large. This gives a large freedom to liquid crystal material development.

Therefore, with any of these arrangements, it is possible to realize a display element which can be driven in fast response speed, with low driving voltage, and within a wider temperature range. Thus, with any of these arrangements, the practical use of such a display element having high-speed response property and wide viewing angle property can be realized concretely.

Moreover, in the arrangement in which the dielectric material layer includes the medium containing polar molecules, the polarization (or depolarization, as the case may be) of the molecules is caused by the field application, thereby facilitating orientation of the polar molecules. Thus, it becomes possible to cause the optical anisotropy with a lower voltage.

Moreover, as described above, the medium may be a medium that is optically isotropy when no field is applied but becomes optically anisotropy when the field is applied, or conversely may be a medium that is optically isotropy when the field is applied but becomes optically anisotropy when no field is applied. When, for example, a field such as an electric field (voltage) is changed, the change in the field distorts the orderly structure of the molecules which the medium comprises. This distortion of the orderly structure changes the magnitude of the optical anisotropy of the medium. Therefore, the display element is arranged such that the change in the field changes the orientation of the molecules from optical isotropy to optical anisotropy due to the change in the field. Hence, according to the display element, it becomes possible to display different display states between when the field is applied and when no field is applied.

In any of these arrangements, the display state is changed depending on whether or not the field is applied, and it is possible to realize a display element which has a wide driving or operation temperature range, a wide viewing angle property, and high-speed response property.

Moreover, it is preferable that the molecules which the medium comprises have or form an orderly structure when the field is applied thereon (or, in other cases, when no field is applied thereon), the orderly structure being smaller than the wavelength of visible light and changeable by and according to field application. The wording "the orderly structure less than the wavelength of visible light" indicates that, for example in case of a cubic phase or a blue phase, a unit structure thereof has a unit lattice length (lattice constant) that is smaller than the wavelength of visible light. It is preferable that, in the scale smaller than the wavelength of visible light, the medium is not in an isotropic phase like liquid, but has an order orientational order microscopically. When the orderly structure is smaller than the wavelength of visible light, the medium is optically isotropic. Therefore, the use of the medium which has an orderly structure smaller than the wavelength of visible light when the field is applied (or when no field is applied) makes it possible to change the display state.

The conventional liquid crystal display devices, for example the conventional liquid crystal display devices of the TN mode, are arranged such that the molecules are aligned in one direction in advance, and the orientational directions of the aligned molecules are changed (e.g., the aligned molecules are rotated) together. On the other hand, in the arrangements of embodiments and implementations described herein, when the optical isotropy occurs, there the orderly structure or orientational order is smaller than the scale of the wavelength of visible light. Here, however, in the scale equal to or larger than the wavelength of visible light, this state is equivalent to a state where the molecules are randomly directed. When the field is changed, the orderly structure smaller than the scale of the wavelength of visible light is distorted by the change of field. The distortion causes the optical anisotropy. When this occurs, the orientational directions of the individual molecules are also changed. That is, the above arrangement and the conventional liquid crystal display element differ in the orientation state in the optical isotropy state and the change of the optical anisotropy due to the orientation. However, also in the above arrangement, the orientational directions of the individual molecules are changed when the optical anisotropy occurs.

Moreover, in the above arrangements, the display operation is carried out by utilizing the change in the magnitude of the optical anisotropy of the molecules constituting the medium, more specifically, the distortion of the orderly structure which the molecules have or form, the molecules which the medium comprises. Hence, the inherent viscosity of the liquid crystal will not give a large effect on the response speed. Thus, it is possible to attain fast response. Moreover, the distortion of the orderly structure of the molecules caused by the field application is not largely affected by temperatures. Thus, with this arrangement, it is easy to perform the temperature control. Moreover, in the above arrangement, the display operation is carried out by utilizing the change in the magnitude of the optical anisotropy of the molecules of the medium. Thus, this arrangement attains a wider viewing angle property than in the arrangement in which the display operation is carried out by changing only the orientational directions of the liquid crystal molecules.

Moreover, the medium may be a material that shows a cholesteric blue phase, or a material that shows a smectic blue phase.

In the arrangement in which the medium may be a material that shows a cholesteric blue phase, or a material that shows a smectic blue phase, it is possible to form a 3-dimentional orderly structure in the dielectric material layer (e.g., the medium that is optically isotropic when no field is applied). This formation of 3-dimentional orderly structure is due to the one-direction twist caused by the chiral agent. Compared with an arrangement in which such orderly structure is not formed in advance, the optical anisotropy can be caused with a lower voltage because the orderly structure has been already formed. The orderly structure in this arrangement is relatively stable against temperature. Thus, with this arrangement, it is possible to realize a display element that can be operable within a wider temperature range.

Moreover, present display element comprises the means for applying the field between the substrates, preferably substantially perpendicularly, more preferably perpendicularly, or such that the means for applying the field to the display element is provided in addition to the display element, whereby the magnitude of the optical anisotropy of the medium is changed by the field applied and the molecules of the medium are oriented only in one twisting direction so as to form a twisted structure having only one chiral configuration and only one twisting direction.

As mentioned above, the field or means for generating the optical anisotropy in the display element is not particularly limited. Thus, use of electric field, magnetic field, light or the like, or the like may be adopted, for example. The use of the electric field is generally deemed preferable for the sake of easy design and driving control of the display element.

Therefore, the display element may be provided with, for example, electric field applying means (such as an electrode or the like), magnetic field applying means (such as an electromagnet or the like), or the like as means for applying a field. For the sake of easy design and driving control of the display element, the electric field applying means is preferable. In other words, the display element may be preferably provided with an electrode on each substrate, for applying an electric field between the substrates.

With the arrangement in which an electrode on each substrate, it is possible to generate an electric field along the normal direction of the substrates. In this arrangement in which the electric field is generated along the normal direction of the substrates, the whole area of a top surface of the substrate can be utilized as the display region. This improves aperture ratio and transmittance, and allows the display element to be driven with a lower voltage. Further, with this arrangement, it is possible to promote the occurrence of the optical anisotropy not only in that part of the medium which is in the vicinity of the substrates, but also in that part of the medium which is far from the substrates. Moreover, in terms of a gap across which the driving voltage is applied, it is possible to attain a narrower gap compared with an arrangement in which the driving voltage is applied between tooth portions of interleave electrodes.

Moreover, the medium may be such that a refractive index of the medium is changeable proportionally to square of an electric field.

In the material layer including the medium whose refractive index is changeable proportionally to the square of the electric filed, the orientational directions are changed by the electric field application. By controlling the polarization in the molecules, the randomly-directed individual molecules are rotated individually. Thus, as described above, the fast response speed is attained. Further, because the molecules are oriented randomly, there is no limit in viewing angle. Thus, with this arrangement, it is possible to realize an excellent display element having high-speed response property and the wide viewing angle.

Therefore, a display element may be so arranged as to include a pair of substrates, at least one of which is transparent; and a material layer (e.g., a dielectric material layer) between the substrates, the display element performing a display operation by applying a field (e.g., electric field) on the material layer between the substrates, and the material layer including a medium (a) which is isotropic when the field is applied or when no field is applied, (b) and whose optical anisotropy magnitude is changeable by and according to the field, and (c) in which a twisted chiral structure is formed when optical anisotropy occurs, the twisted structure having only one chiral configuration and being structured with molecules of the medium oriented only in one twisting direction.

Further, a display device includes a display element having any one of these arrangements discussed above. Therefore, the display device has a wide driving or operating temperature range, a wider viewing angle property, and a high-speed (fast) response property. Further, because the transmittance can be changed by controlling the orientational order of the molecules, it is possible to realize a display device which can be driven with a driving voltage as low as a practical level and operate within a wide temperature range. Further, it is possible to realize a display device in which contrast is improved and the coloring phenomenon is alleviated.

Nothing herein is to be construed as limiting the means for applying the field, provided that the means for applying the field is capable of changing the magnitude of the optical anisotropy of the medium depending on whether or not the field is applied (and by and according to the field applied thereby). Besides the electric field applying means (such as an electrode or the like) and magnetic field applying means (such as an electromagnet or the like), a laser device, light radiating means (excitation light generating means) such as the above-mentioned Nd: YAG laser and the like are applicable as the means for applying the field.

Therefore, one or more embodiments or implementations hereof may be arranged to comprise the means for applying the field, or such that the means for applying the field is provided in addition to the display element.

That is, a display device may be so arranged as to comprise the display element including the means for applying the field, or to comprise the display element and the means for applying the field. In other words, the display device may be arranged such that it comprises the display element, and means (section) for applying a field on the medium in the display element.

In the above description, it is stated that "the present display element 20 may be expressed as a display element basically arranged such that (i) the electric field is applied along the normal direction of the surfaces of the substrates (vertical electric field application), (ii) the medium for the dielectric material layer 3 is a negative type liquid crystal (use of negative type liquid crystal), and (iii) a chiral agent is added in the medium for the dielectric material layer 3 (addition of chiral agent)". However, in addition to the above arrangement, the display element 20 may be stabilized in advance by using a polymer network, in order to highly efficiently attain the one chiral configuration of the molecules 11 in the medium, for example, when the optical anisotropy occurs. The following explains an example in which the display element 20 (hereinafter, referred to as a display element L for the sake of easy explanation) is employed in which the polymer network is used.

The display element 20 (display element L) according to the present example is arranged such that a dielectric material layer 3 contains a negative type liquid crystalline mixture, as the medium interposed between the substrates 1 and 2. In the negative type liquid crystalline mixture, a chiral agent has been added. That is, the negative type liquid crystalline mixture contains a chiral-agent-added-liquid crystal material, a monomer having crystallinity (liquid crystalline monomer), a cross-linker, and a photo-initiator. Further, the dielectric material layer 3 contains a cross-linker (e.g., cross-linking agent) and a photo-initiator.

More specifically, in the present example, the material sandwiched between the substrates 1 and 2, that is, the material which the dielectric material layer 3 comprises is a chiral-agent-added liquid crystal material (5), which is prepared by adding, to have a chiral content of 10 wt %, the chiral agent "S811" in the negative type liquid crystalline mixture (1) containing the compound 1-1 (30 wt %), the compound 1-2 (40 wt %), and the compound 1-3 (30 wt %). In the chiral-agent-added liquid crystal material (5), a liquid crystalline monomers is added. The liquid crystalline monomers is an equi-amount (equi-weight) mixture containing 50 wt % of a compound represented by Formula (23) and 50 wt % of a compound represented by Formula (24), and is commercially available as product "UCL001" from DIC (Dainippon Ink and Chemicals, Incorporated).

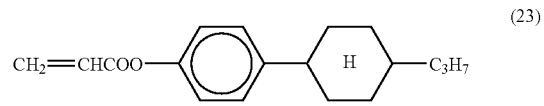

(23)

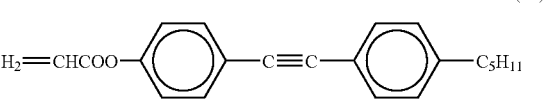

(24)

Further, the chiral-agent-added liquid crystal material (5) also comprises, for example, a diacrylate monomer as the cross linker (such as a product "RM257" made by Merck Ltd.), and 2,2-dimethoxy-2-penthylacetophenon as a photo-initiator (such as a product "DMPAP" made by Aldrich) "RM257" is represented by Formula (25):

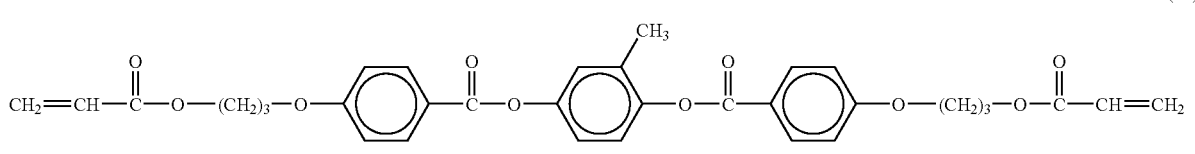

(25)

(26)

"DMPAP" is represented by Formula (26):

TABLE 2

| Chiral-Agent-Added Liquid Crystal Material (5) | 95.8 wt % |
|---|---|
| UCL001 | 3.0 wt % |
| RM257 | 1.0 wt % |
| DMPAP | 0.2 wt % |

This material, that is, the mixture system prepared by mixing the liquid crystal material, monomer, and the like was injected into a cell that is similar to the cells discussed in the present embodiment. The cell had a cell thickness of 5 μm. The chiral-agent-added liquid crystal material (5) had $T_{ni}$ (Nematic-isotropic phase transition temperature) of 103° C., which is lower than the $T_{ni}$ of liquid crystal (113° C.). Even after adding the liquid crystalline monomer, the cross linker, and the photo-initiator were added, the $T_{ni}$ (Nematic-Isotropic phase transition temperature) of the mixture system was not changed substantially, and stayed at 103° C. At temperatures below 103° C., the dielectric material layer showed a chiral nematic phase (cholesteric phase) in which only one chiral configuration was observed due to the spontaneous twisting power of the chiral agent "S811".

Ultraviolet rays were radiated on the mixture system in the chiral nematic phase (cholesteric phase), more specifically, for example, the dielectric material layer 3 kept at 93° C. (T=$T_{ni}$−10(K)). The radiation of the ultraviolet rays was carried out with a wavelength of 365 nm and at 1.0 mW/cm² for 20 minutes.

After that, the temperature of the display element L was increased to a temperature in a temperature range of isotropic phase, which is higher than 103° C. Then, electro-optical property of the display element L was measured. As a result, transmittance change was observed up to about 1K from 103° C. in the display element 20 without the stabilization by the polymer network, whereas transmittance change was observed up to about 5K from 103° C. in the display element L with the stabilization by the polymer network. This indicated that the polymer network establishes environment in which the optical anisotropy (one chiral configuration) is easy to occur when the electric field is applied.

Note that the types of the liquid materials, monomers, and the like, a mixing ratio thereof in the mixture system, discussed in the present embodiment are merely examples. There is no limitation intended with regard to the numerical values mentioned above. The mixing ratio may be arbitrarily set to be appropriate the materials to be used, and is not limited to the above ratio.

For instance, considering a display element in which the medium is optically isotropic when no electric field is applied and becomes optically anisotropic (by having only one chiral configuration) when the electric field is applied, thereby switching the display state, the amount of the liquid crystalline monomer to add is preferably set such that the resultant polymer network will not affect visible light. Thus, the amount of the liquid crystalline monomer to add is set considering whether or not the resultant polymer network will not affect visible light.

The present invention is not limited to the embodiments discussed above and may be modified in various ways within the scope of the claims. Modifications attained by appropriate combination of technical means disclosed respectively in the different embodiments also fall into the scope of the present invention.

Further, the invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A display element, comprising:
   a pair of substrates, at least one of which is transparent; and
   a material layer between the substrates,
   the display element performing a display operation by applying a field between the substrates, and
   the material layer including a medium whose optical anisotropy magnitude is changeable by and according to the field, and in which a twisted chiral structure is formed when optical anisotropy occurs, the twisted structure having only one chiral configuration and being structured with molecules of the medium oriented only in one twisting direction.

2. A display element as set forth in claim 1, wherein:
   the twisted structure has a twist pitch that is within a wavelength range of visible light, or smaller than the wavelength of visible light.

3. A display element as set forth in claim 1, wherein:
   the medium comprises a chiral agent.

4. A display element as set forth in claim 3, wherein:
   a ratio of the chiral agent to a sum of the medium and the chiral agent is not less than 8 wt % and not more than 80 wt %.

5. A display element as set forth in claim 3, wherein:
   a ratio of the chiral agent to a sum of the medium and the chiral agent is not less than 30 wt % and not more than 80 wt %.

6. A display element as set forth in claim 1, wherein:
   the medium is a chiral material that is chiral itself.

7. A display element as set forth in claim 1, wherein:
   the medium contains a rod-like molecule that shows negative dielectric anisotropy.

8. A display element as set forth in claim 1, wherein:
   the medium contains a negative type liquid crystalline compound.

9. A display element a set forth in claim 8, wherein:

$\Delta n \times |\Delta \epsilon| > 0.63$, where $\Delta n$ is a refractive index anisotropy at 550 nm in a nematic phase of the negative type liquid crystalline compound, and $|\Delta \epsilon|$ is an absolute value of a dielectric anisotropy at 1 kHz in the nematic phase of the negative type liquid crystalline compound.

10. A display element a set forth in claim 9, wherein:
    $\Delta n > 0.128$ and $|\Delta \epsilon| > 4.9$.

11. A display element a set forth in claim 9, wherein:
    $\Delta n \times |\Delta \epsilon|$ is 3.3 or more.

12. A display element a set forth in claim 9, wherein:
    $\Delta n \geq 0.183$ and $|\Delta \epsilon| \geq 18$.

13. A display element as set forth in claim 1, wherein:
    the medium contains a polar molecule.

14. A display element as set forth in claim 1, wherein:
    the medium is optically isotropic when no field is applied thereon, and becomes optically anisotropic when the field is applied thereon.

15. A display element as set forth in claim 1, wherein:
    the medium is optically anisotropic when no field is applied thereon, and becomes optically isotropic when a field is applied thereon.

16. A display element as set forth in claim 1, wherein:
the molecules comprising the medium have or form an orderly structure when the field is applied thereon or when no field is applied thereon, the orderly structure being smaller than a visible light wavelength and changeable by and according to field application.

17. A display element as set forth in claim 1, wherein:
the medium is a material that shows a cholesteric blue phase.

18. A display element as set forth in claim 1, wherein:
the medium is a material that shows a smectic blue phase.

19. A display element as set forth in claim 1, wherein:
the material layer is a dielectric material layer containing a dielectric material.

20. A display element as set forth in claim 1, comprising:
a section for applying the field between the substrates.

21. A display element as set forth in claim 1, wherein:
the field is an electric field; and
an electrode is provided on each substrate, the electrode for applying the electric field between the substrates.

22. A display element as set forth in claim 21, wherein:
the display element shows optical isotropy when an electric field is applied or when no electric field is applied.

23. A display element as set forth in claim 22, wherein:
the material layer is a dielectric material layer containing a dielectric material.

24. A display element as set forth in claim 23, wherein:
the twisted structure has a twist pitch that is within a wavelength range of visible light, or smaller than a wavelength of the visible light.

25. A display element as set forth in claim 23, wherein:
the medium contains a chiral agent.

26. A display element as set forth in claim 25, wherein:
a ratio of the chiral agent to a sum of the medium and the chiral agent is not less than 8 wt % and not more than 80 wt %.

27. A display element as set forth in claim 25, wherein:
a ratio of the chiral agent to a sum of the medium and the chiral agent is not less than 30 wt % and not more than 80 wt %.

28. A display element as set forth in claim 23, wherein:
the medium is a chiral material that is chiral itself.

29. A display element as set forth in claim 23, wherein:
the medium contains a rod-like molecule that shows negative dielectric anisotropy.

30. A display element as set forth in claim 23, wherein:
the medium contains a negative type liquid crystalline compound.

31. A display element a set forth in claim 30, wherein:
$\Delta n \times |\Delta \epsilon| > 0.63$,
where $\Delta n$ is a refractive index anisotropy at 550 nm in a nematic phase of the negative type liquid crystalline compound, and $|\Delta \epsilon|$ is an absolute value of a dielectric anisotropy at 1 kHz in the nematic phase of the negative type liquid crystalline compound.

32. A display element a set forth in claim 31, wherein:
$\Delta n > 0.128$ and $|\Delta \epsilon| > 4.9$.

33. A display element a set forth in claim 31, wherein:
$\Delta n \times |\Delta \epsilon|$ is 3.3 or more.

34. A display element a set forth in claim 33, wherein:
$\Delta n \geq 0.183$ and $|\epsilon \Delta| \geq 18$.

35. A display element as set forth in claim 23, wherein:
a refractive index of the medium is changeable proportionally to square of an electric field.

36. A display element as set forth in claim 23, wherein:
the medium contains a polar molecule.

37. A display element as set forth in claim 23, wherein:
the medium is optically isotropic when no electric field is applied thereon, and becomes optically anisotropic when an electric field is applied thereon.

38. A display element as set forth in claim 23, wherein:
the medium is optically anisotropic when no electric field is applied thereon, and becomes optically isotropic when an electric field is applied thereon.

39. A display element as set forth in claim 23, wherein:
the molecules comprising the medium have or form an orderly structure when an voltage is applied thereon or when no electric field is applied thereon, the orderly structure being smaller than a visible light wavelength and changeable by and according to voltage application.

40. A display element as set forth in claim 23, wherein:
the medium is a material that shows a cholesteric blue phase.

41. A display element as set forth in claim 23, wherein:
the medium is a material that shows a smectic blue phase.

42. A display device, comprising:
the display element as set forth in claim 23.

43. A display device, comprising:
the display element as set forth in claim 1.

\* \* \* \* \*